(12) United States Patent
Ohgaru et al.

(10) Patent No.: US 8,227,053 B2
(45) Date of Patent: Jul. 24, 2012

(54) OPTICALLY COMPENSATORY FILM, POLARIZING PLATE AND LIQUID-CRYSTAL DISPLAY

(75) Inventors: Ikuko Ohgaru, Minami-Ashigara (JP); Sumio Ohtani, Minami-Ashigara (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 1367 days.

(21) Appl. No.: 11/792,713

(22) PCT Filed: Jan. 13, 2006

(86) PCT No.: PCT/JP2006/300785
§ 371 (c)(1),
(2), (4) Date: Jun. 11, 2007

(87) PCT Pub. No.: WO2006/075793
PCT Pub. Date: Jul. 20, 2006

(65) Prior Publication Data
US 2008/0158489 A1    Jul. 3, 2008

(30) Foreign Application Priority Data

Jan. 13, 2005    (JP) ................................. 2005-006314

(51) Int. Cl.
*G02F 1/13363*    (2006.01)
(52) U.S. Cl. ............ 428/1.3; 428/1.31; 349/96; 349/118
(58) Field of Classification Search .......... 428/1.3–1.33; 349/96, 117–121
See application file for complete search history.

(56) References Cited

U.S. PATENT DOCUMENTS

| 7,671,947 | B2* | 3/2010 | Nimura et al. ................. 349/117 |
| 2002/0162483 | A1* | 11/2002 | Shimizu et al. ........... 106/170.28 |
| 2004/0001175 | A1* | 1/2004 | Ito ................................. 349/117 |
| 2004/0141121 | A1* | 7/2004 | Tanaka et al. ................. 349/117 |
| 2005/0208231 | A1* | 9/2005 | Nimura et al. ................. 428/1.3 |

FOREIGN PATENT DOCUMENTS

| JP | 06-059121 A | 3/1994 |
| JP | 8-050206 A | 2/1996 |
| JP | 2001-247717 A | 9/2001 |
| JP | 2002-187960 A | 7/2002 |

(Continued)

OTHER PUBLICATIONS

JPO Website Machine English Translation of JP 2002-174729, Matsumoto et al., Jun. 21, 2002.*

(Continued)

*Primary Examiner* — Sophie Hon
(74) *Attorney, Agent, or Firm* — Buchanan Ingersoll & Rooney PC

(57) ABSTRACT

An optically-compensatory film comprising: a cyclic polyolefin film satisfying expression (I); and a cellulose acylate film satisfying expressions (II) and (III), or a liquid-crystal display device comprising at least one cyclic polyolefin film satisfying expression (I) and at least one cellulose acylate film satisfying expressions (II) and (III):

$$35 \leq Re_{(630)} \leq 350 \text{ and } 70 \leq Rth_{(630)} \leq 400, \quad (I)$$

$$0 \leq Re_{(630)} \leq 10 \text{ and } |Rth_{(630)}| \leq 25, \text{ and} \quad (II)$$

$$|Re_{(400)} - Re_{(700)}| \leq 10 \text{ and } |Rth_{(400)} - Rth_{(700)}| \leq 35, \quad (III)$$

wherein $Re(\lambda)$ represents an in-plane retardation value (unit: nm) at a wavelength of $\lambda$ nm; and $Rth(\lambda)$ represents a thickness-direction retardation value at a wavelength of $\lambda$ nm.

19 Claims, 2 Drawing Sheets

FOREIGN PATENT DOCUMENTS

| | | |
|---|---|---|
| JP | 2003-059121 A | 2/2003 |
| JP | 2003-114330 A | 4/2003 |
| JP | 2003-322722 A | 11/2003 |
| JP | 2004-212863 A | 7/2004 |
| JP | 2004-309598 A | 11/2004 |
| JP | 2004-309979 A | 11/2004 |
| JP | 2004-315613 A | 11/2004 |
| JP | 2004-315756 A | 11/2004 |
| JP | 2005-004096 A | 1/2005 |

OTHER PUBLICATIONS

JPO Website Machine English Translation of JP 2004-309979, Sekiguchi et al., Nov. 4, 2004.*

JPO Website Machine English Translation of JP 2004-315613, Oya et al., Nov. 11, 2004.*

JPO Website Machine English Translation of JP 2003-053882, Murakami et al., Feb. 26, 2003.*

JPO Website Machine English Translation of JP 2003-090914, Ikeda et al., Mar. 28, 2003.*

International Search Report dated Apr. 4, 2006.

Written Opinion of the International Searching Authority dated Apr. 4, 2006.

Korean Office Action (Notification for Requesting the Submission of Argument) issued May 31, 2012, in corresponding Korean Patent Application No. 2007-7015773, and an English translation thereof.

* cited by examiner

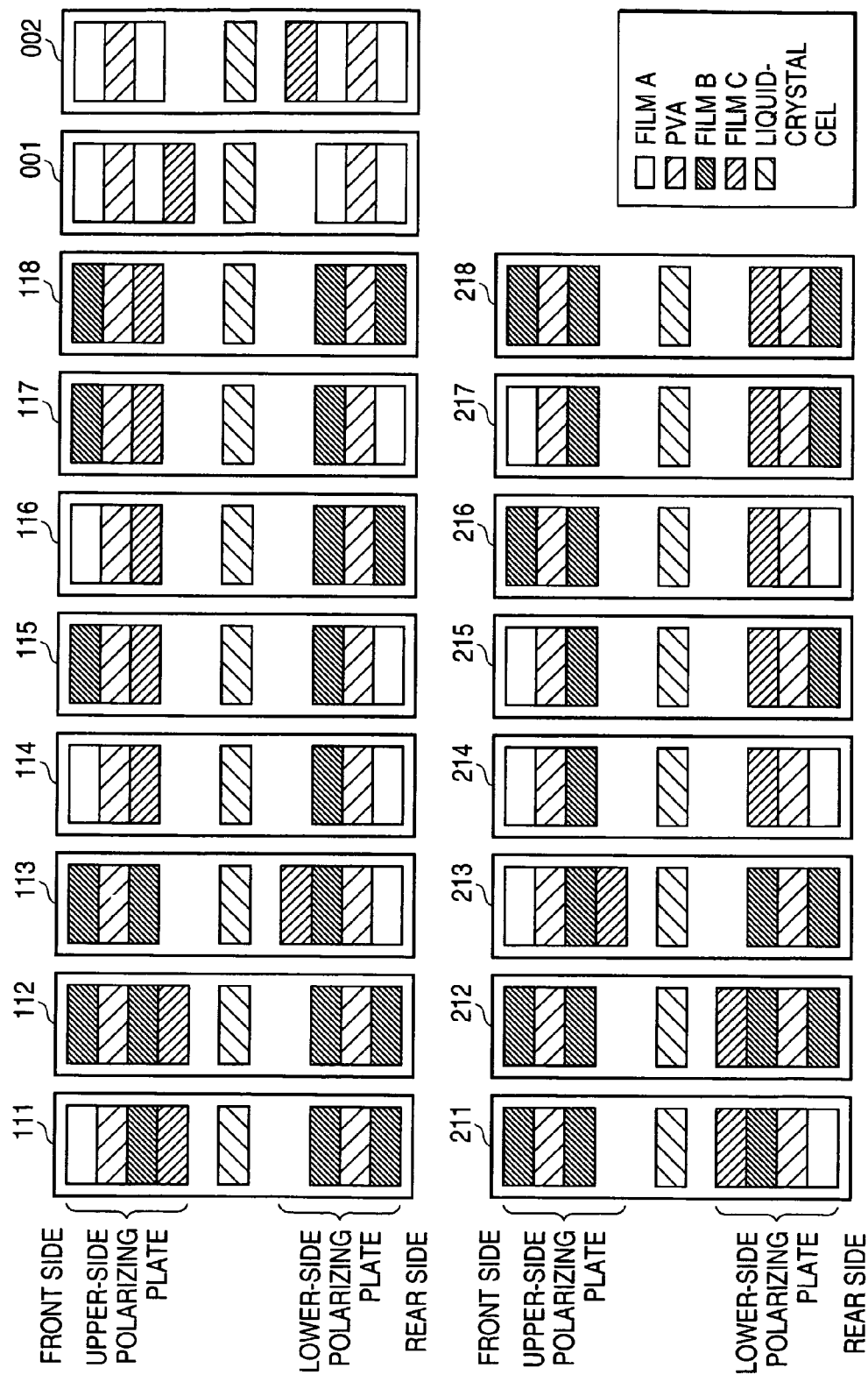

OPTICALLY COMPENSATORY FILM, POLARIZING PLATE AND LIQUID-CRYSTAL DISPLAY

This application is a 371 national stage of PCT/JP2006/300785 filed Jan. 13, 2006.

TECHNICAL FIELD

The present invention relates to an optically-compensatory film, a polarizing plate, and a liquid-crystal display device. Specifically, the present invention relates to a cyclic polyolefin optical biaxial phase retardation film used therefor and a cellulose acylate film useful for a liquid-crystal display device, and also optical members using the same, such as an optically-compensatory film, a polarizing plate, and the like, and a liquid-crystal display device using the same.

BACKGROUND ART

A polarizing plate is typically produced by attaching a film mainly formed of cellulose triacetate as a protective film on both sides of a polarization film which is formed of iodine or a dichroic dye aligned and adsorbed to polyvinyl alcohol. Cellulose triacetate has features of being high in rigidity, frame resistance, and optical isotropy (low retardation value), and is widely used for the above-described polarizing plate protective film. A liquid-crystal display device is formed of a polarizing plate and a liquid-crystal cell. Today, TN-mode TFT liquid-crystal display devices, which are the main stream of the liquid-crystal display devices, realize high display visibility by inserting an optically-compensatory sheet (phase retardation film) between a polarizing plate and a liquid-crystal cell as described in JP-A 8-50206.

A cyclic polyolefin film is a center of attention as a film which is high in optical isotropy but can be improved in anisotropy, moisture absorbability, or moisture permeability by designing the molecular structure thereof, and is used for development of films to be used for polarizing plates and liquid-crystal display devices using heat fusion film formation or solution film formation. However, the heat fusion film formation has the problem that the optical characteristics in the width direction and the length direction (the retardation direction and the optical axis direction) change. It is generally known that the solution film formation provides a film having a better surface state. The optical anisotropy can be freely controlled during the solution film formation, by stretching the film in the width direction using a tenter, by stretching the film in the length direction between rolls, or by a combination thereof. The optical anisotropy is exhibited far more highly than when cellulose acylate film is used singly (in the state with no functional additives).

Recently, on the other hand, the liquid-crystal display devices are more strongly desired to have improved viewing angle characteristics. Optical transparent films, such as polarizer protective films, supports of optically-compensatory films, and the like, are desired to be more optically isotropic. For optical isotropy, it is important that a retardation value, which is represented by a product of the birefringence and the thickness of the optical film, be small. Especially in order to improve the display visibility when viewed in an oblique direction, it is necessary to reduce the thickness-direction retardation (Rth) as well as the in-plane retardation (Re). Specifically, it is necessary that, when the optical characteristics of the optical transparent film are evaluated, Re measured in the in-plane direction of the film is small and does not change even when measured at different angles.

Cellulose acylate films with a reduced in-plane Re are conventionally available, but it has been difficult to form a cellulose acylate film having a small Re change depending on the angle, i.e., having a small Rth.

As one solution, it is strongly desired to improve a cellulose acylate film which has an excellent level of adhesiveness to PVA, by further reducing the optical anisotropy thereof. Specifically, an optically isotropic, optical transparent cellulose acylate film which has an in-plane Re of almost zero and has a small retardation change depending on the angle, i.e., has an Rth of almost zero, is desired.

In production of a cellulose acylate film, a compound called a plasticizer is generally added in order to improve the film formation performance. As plasticizers, phosphoric acid triesters, such as triphenyl phosphate and biphenyldiphenyl phosphate, phthalates, and the like are disclosed (see, for example, Lecture of Plastic Materials, Vol. 17, "Cellulose Resins", The Nikkan Kogyo Shimbun Ltd. (1970), page 121). Some of these plasticizers are known to have an effect of lowering the optical anisotropy of cellulose acylate films. For example, specific fatty acid esters are disclosed (for example, JP-A 2001-247717). However, these conventionally known compounds are not considered to have a sufficient effect of lowering the optical anisotropy of cellulose acylate films.

Recently, the liquid-crystal display devices are desired to have an improved level of displayed hue. In order to achieve this, the optical transparent films, such as protective films for polarizers, supports for optically-compensatory films, and the like, need to be reduced in Re and Rth in the visible light range having a wavelength of 400 to 800 nm, and also need to have small Re and Rth changes depending on the wavelength, i.e., a small wavelength-dependent Re and Rth distribution.

The liquid-crystal display devices are further desired to have no change in display performance, such as hue, contrast, viewing angle dependency, and the like, against a change in the environmental factors, such as humidity and the like, and thus provide high quality images.

DISCLOSURE OF THE INVENTION

A first object of the present invention is to provide a liquid-crystal display device having a small change in the display characteristics against changes in ambient temperature and humidity. A second object of the present invention is to provide a cellulose acylate film which has a small optical anisotropy (Re, Rth) (i.e., is substantially optically isotropic) and has a low level of wavelength-dependent distribution of optical anisotropy (Re, Rth). A third object of the present invention is to provide an optically-compensatory film, a polarizing plate, and a liquid-crystal display device including a cyclic polyolefin film which can exhibit optical anisotropy and a cellulose acylate film which has a low level of optical anisotropy (Re, Rth) (i.e., is substantially optically isotropic).

A fourth object of the present invention is to demonstrate that an optical member, such as an optically-compensatory film, a polarizing plate, or the like, which is formed of a cellulose acylate film having a low level of optical anisotropy and a low level of wavelength-dependent distribution, has excellent viewing angle characteristics, and to provide a liquid-crystal display device using the same.

By using a cellulose acylate film having a low level of optical anisotropy and a low level of wavelength-dependent distribution as a protective film for a polarizing plate, the optical characteristics of the polarizing plate can be improved. In the case where such a cellulose acylate film is used for a support for an optically-compensatory film, the optical performance of the optically-compensatory film itself can be exploited. By using such a polarizing plate or optically-compensatory film for a liquid-crystal display device, the contrast and the hue can be improved.

As an optically-compensatory layer, a cyclic polyolefin film having freely controllable optical anisotropy is used. As a polarizing plate protective film which serves as a support for the optically-compensatory layer, the above-described cellulose acylate film having a low level of optical anisotropy (Re, Rth) (i.e., being substantially optically isotropic) and also having a low level of wavelength-dependent distribution of optical anisotropy (Re, Rth) is used instead of a commercially available cellulose acylate film, such as generally known Fujitac or the like. Thus, the functions are more clearly separated.

Specifically, a film having a high level of optical anisotropy is formed of the cycle polyolefin film, so that the optical characteristics are unlikely to change against changes in ambient temperature and humidity, and a film for protecting the polarizer is formed of the above-described cellulose acylate film, which has a considerably suppressed level of optical anisotropy and a high level of adhesiveness with polyvinyl alcohol of the polarizer and has a smaller change in display performance against changes in ambient temperature and humidity than that of a plain tack film. By using such a combination of films for a liquid-crystal display device, the contrast and the hue can be improved.

In other words, the above-described objects have been achieved by the following means.

(1) An optically-compensatory film comprising:
a cyclic polyolefin film satisfying expression (I); and
a cellulose acylate film satisfying expressions (II) and (III):

$$35 \leq Re_{(630)} \leq 350 \text{ and } 70 \leq Rth_{(630)} \leq 400, \quad (I)$$

$$0 \leq Re_{(630)} \leq 10 \text{ and } |Rth_{(630)}| \leq 25, \text{ and} \quad (II)$$

$$|Re_{(400)} - Re_{(700)}| \leq 10 \text{ and } |Rth_{(400)} - Rth_{(700)}| \leq 35, \quad (III)$$

wherein $Re(\lambda)$ represents an in-plane retardation value (unit: nm) at a wavelength of $\lambda$ nm; and
$Rth(\lambda)$ represents a thickness-direction retardation value (unit: nm) at a wavelength of $\lambda$ nm.

(2) A liquid-crystal display device comprising:
at least two polarization films;
at least one cyclic polyolefin film satisfying expression (I) between the at least two polarization films; and
at least one cellulose acylate film satisfying expressions (II) and (III) between the at least two polarization films:

$$35 \leq Re_{(630)} \leq 350 \text{ and } 70 \leq Rth_{(630)} \leq 400, \quad (I)$$

$$0 \leq Re_{(630)} \leq 10 \text{ and } |Rth_{(630)}| \leq 25, \text{ and} \quad (II)$$

$$|Re_{(400)} - Re_{(700)}| \leq 10 \text{ and } |Rth_{(400)} - Rth_{(700)}| \leq 35, \quad (III)$$

wherein $Re(\lambda)$ represents an in-plane retardation value (unit: nm) at a wavelength of $\lambda$ nm; and
$Rth(\lambda)$ represents a thickness-direction retardation value (unit: nm) at a wavelength of $\lambda$ nm.

(3) The optically-compensatory film as described in (1) above or the liquid-crystal display device as described in (2) above,
wherein the cyclic polyolefin film comprises a copolymer comprising at least one repeating unit represented by Formula (A) and at least one repeating unit represented by Formula (B):

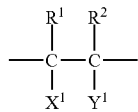
Formula (A)

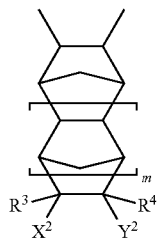
Formula (B)

wherein m represents an integer of 0 to 4;
$R^1$ to $R^4$ each independently represents a hydrogen atom or a hydrocarbon group having 1 to 10 carbon atoms;
$X^1$, $X^2$, $Y^1$ and $Y^2$ each independently represents a hydrogen atom, a hydrocarbon group having 1 to 10 carbon atoms, a halogen atom, a hydrocarbon group having 1 to 10 carbon atoms substituted with a halogen atom, $-(CH_2)_nCOOR^{11}$, $-(CH_2)_nOOCR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOCOZ$, $-(CH_2)_nOZ$, $-(CH_2)_nW$, or $(-CO)_2O$ or $(-CO)_2NR^{15}$ formed of $X^1$ and $Y^1$ or $X^2$ and $Y^2$;
$R^{11}$, $R^{12}$, $R^{13}$, $R^{14}$ and $R^{15}$ each independently represents a hydrocarbon group having 1 to 20 carbon atoms;
Z represents a hydrocarbon group or a hydrocarbon group substituted with a halogen;
W represents $SiR^{16}{}_pD_{3-p}$, provided that $R^{16}$ represents a hydrocarbon group having 1 to 10 carbon atoms; D represents a halogen atom, $-OCOR^{16}$ or $-OR^{16}$; and p represents an integer of 0 to 3; and
n represents an integer of 0 to 10.

(4) The optically-compensatory film as described in (1) above or the liquid-crystal display device as described in (2) above,
wherein the cyclic polyolefin film comprises a polymer comprising a cyclic repeating unit represented by Formula (B) or (C) or a copolymer comprising at least two cyclic repeating units represented by Formula (B) and (C),

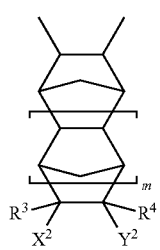
Formula (B)

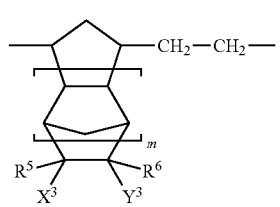
Formula (C)

where m represents an integer of 0 to 4;

$R^3$ to $R^6$ each independently represents a hydrogen atom or a hydrocarbon group having 1 to 10 carbon atoms;

$X^2$, $X^3$, $Y^2$ and $Y^3$ each independently represents a hydrogen atom, a hydrocarbon group having 1 to 10 carbon atoms, a halogen atom, a hydrocarbon group having 1 to 10 carbon atoms substituted with a halogen atom, $-(CH_2)_nCOOR^{11}$, $-(CH_2)_nOOCR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOCOZ$, $-(CH_2)_nOZ$, $-(CH_2)_nW$, or $(-CO)_2O$ or $(-CO)_2NR^{15}$ formed of $X^2$ and $Y^3$ or $X^3$ and $Y^3$;

$R^{11}$, $R^{12}$, $R^{13}$, $R^{14}$ and $R^{15}$ each independently represents a hydrocarbon group having 1 to 20 carbon atoms;

Z represents a hydrocarbon group or a hydrocarbon group substituted with halogen;

W represents $SiR^{16}_pD_{3-p}$, provided that $R^{16}$ represents a hydrocarbon group having 1 to 10 carbon atoms; D represents a halogen atom, $-OCOR^{16}$ or $-OR^{16}$; and p represents an integer of 0 to 3; and n represents an integer of 0 to 10.

(5) The optically-compensatory film as described in (3) or (4) above or the liquid-crystal display device as described in (3) or (4) above, wherein the cyclic polyolefin film is obtained by a method comprising:

casting an organic solvent solution containing 10% by mass to 35% by mass of the polymer or the copolymer onto an endless metal support, and drying, so as to form a dried film;

peeling the dried film off from the metal support, so as to form a peeled film;

stretching the peeled film in at least one of a width direction and a length direction, and further drying and winding up.

(6) The optically-compensatory film as described in any of (1) and (3) to (5) above or the liquid-crystal display device as described in any of (2) to (5) above, wherein the cellulose acylate film contains at least one compound for lowering the thickness-direction retardation Rth in a range satisfying expressions (IV) and (V), $$(Rth(A)-Rth(0))/A \leq -1.0, \text{ and} \quad \text{(IV)}$$

$$0.01 \leq A \leq 30, \quad \text{(V)}$$

wherein Rth(A) represents Rth (nm) of a film containing a compound for lowering Rth at A %;

Rth(0) represents Rth (nm) of a film which does not contain any compound for lowering Rth (nm); and A represents a mass (%) of a compound for lowering Rth when a mass of the polymer as a material for the film is 100.

(7) The optically-compensatory film as described in any of (1) and (3) to (6) above or the liquid-crystal display device as described in any of (2) to (6) above, wherein the cellulose acylate film comprises a cellulose acylate having a degree of acyl substitution of 2.85 to 3.00.

(8) The optically-compensatory film as described in any of (1) and (3) to (7) above or the liquid-crystal display device as described in any of (2) to (7) above, wherein the cellulose acylate film comprises at least one compound for lowering $|Rth_{(400)}-Rth_{(700)}|$ in an amount of from 0.01 to 30% by mass based on a solid content of the cellulose acylate.

(9) The optically-compensatory film as described in any of (1) and (3) to (8) above or the liquid-crystal display device as described in any of (2) to (8) above, wherein the cellulose acylate film has a thickness of 10 to 120 μm.

(10) A polarizing plate comprising:

a polarizer; and at least one optically-compensatory film as described in any of (1) and (3) to (9) above as a protective film of the polarizer.

(11) The polarizing plate as described in (10) above, wherein at least one of a hard-coat layer, an antiglare layer and an antireflection layer is provided on a surface of the polarizing plate.

(12) A liquid-crystal display device comprising at least one of an optically-compensatory film as described in any of (1) and (3) to (9) above and a polarizing plate as described in (10) or (11) above.

(13) A VA-mode liquid-crystal display device or an IPS-mode liquid-crystal display device comprising at least one of an optically-compensatory film according to any of claims 1 and 3 to 9 and a polarizing plate according to claim 10 or 11.

BRIEF DESCRIPTION OF THE DRAWING

FIG. 2 is a view showing exemplary structures of liquid-crystal display devices according to the present invention and the comparative examples.

BEST MODE FOR CARRYING OUT THE INVENTION

Figure 1:
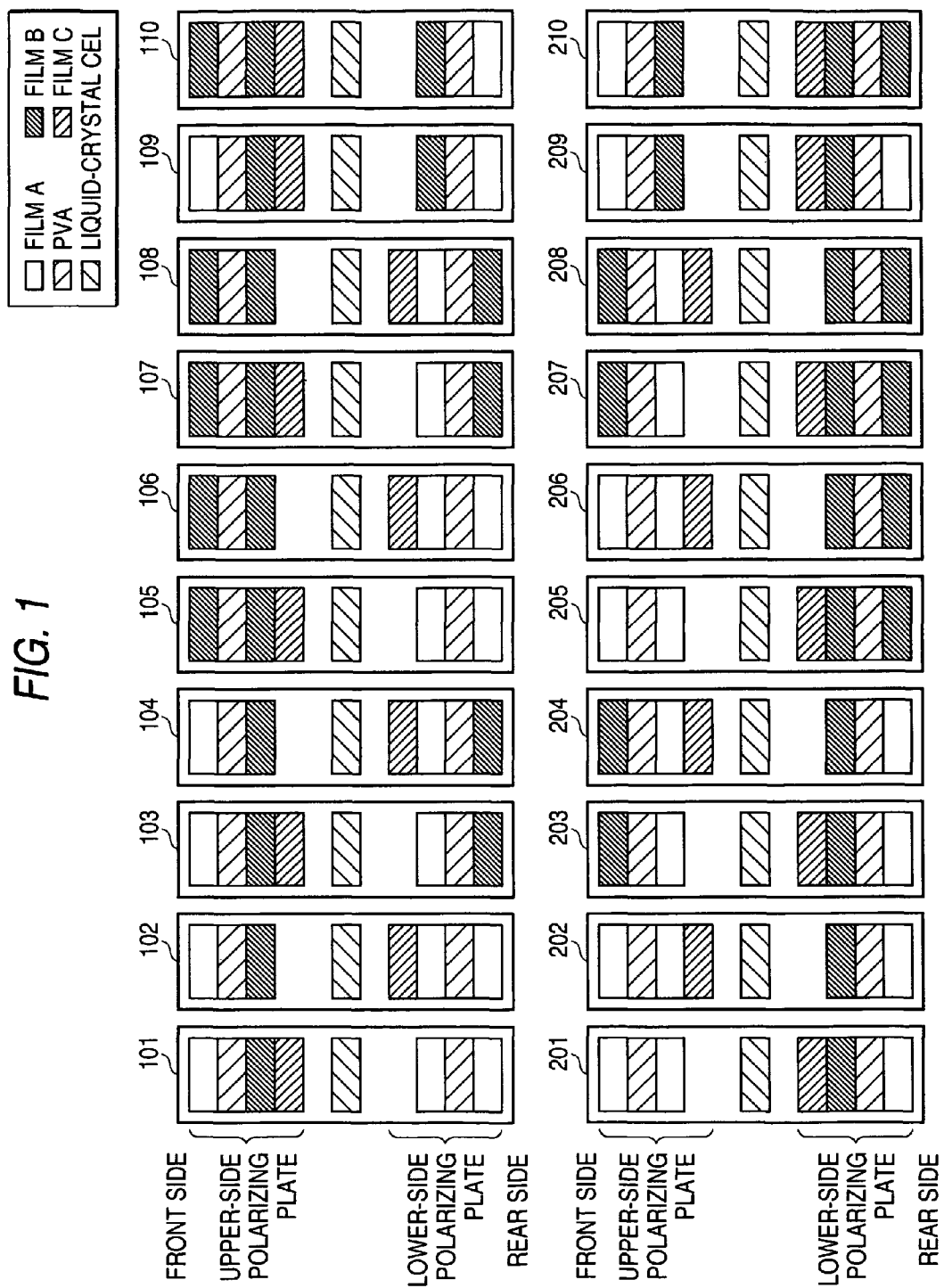
FIG. 1 is a view showing exemplary structures of liquid-crystal display devices according to the present invention.

Hereinafter, the present invention will be described in detail.

1. First, a cyclic polyolefin film for the present invention will be described.

A cyclic polyolefin film for the present invention satisfies the following expression (I).

$$35 \leq Re_{(630)} \leq 350 \text{ and } 70 \leq Rth_{(630)} \leq 400. \quad \text{(I)}$$

Regarding expression (I), it is preferable that:

$$35 \leq Re_{(63)} \leq 300 \text{ and } 100 \leq Rth_{(630)} \leq 350; \text{ and} \quad \text{(I)}$$

it is more preferable that:

$$35 \leq Re_{(630)} \leq 250 \text{ and } 100 \leq Rth_{(630)} \leq 300. \quad \text{(I)}$$

A cyclic polyolefin film for the present invention can be formed as follows.

(Cyclic Polyolefin)

Examples of a thermoplastic polymer resin having a cyclic polyolefin structure include: (1) norbornene-based polymers; (2) polymers of a monocyclic olefin; (3) polymers of a cyclic conjugate diene; (4) vinyl alicyclic hydrocarbon polymers; hydrides of (1) to (4); and the like. Among them, norbornene-based polymers and hydrides thereof, and vinyl alicyclic hydrocarbon polymers and hydrides thereof, are preferable from the viewpoint of optical characteristics, heat resistance, mechanical strength and the like.

A polymer preferable for the present invention is a copolymer cyclic polyolefin containing at least one type of repeating unit represented by the following general formula (A) and at least one type of repeating unit represented by the following general formula (B), or an open cyclic (co)polymer or addition (co)polymer containing at least one type of repeating unit represented by the following general formula (B) or (C).

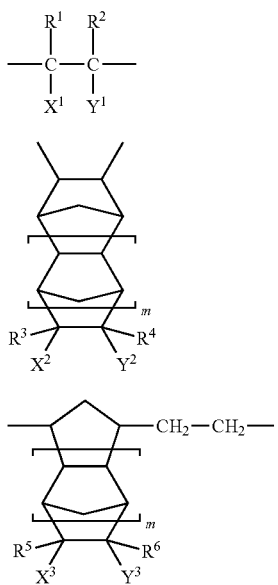

Formula (A)

Formula (B)

Formula (C)

In the formulas, m represents an integer of 0 to 4. $R^1$ to $R^6$ each independently represents a hydrogen atom or a hydrocarbon group having 1 to 10 carbon atoms. $X^1$ to $X^3$ and $Y^1$ to $Y^3$ each independently represents a hydrogen atom, a hydrocarbon group having 1 to 10 carbon atoms, a halogen atom, a hydrocarbon group having 1 to 10 carbon atoms substituted with a halogen atom, —$(CH_2)_n COOR^{11}$, —$(CH_2)_n OOCR^{12}$—$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$—$(CH_2) OCOZ$, —$(CH_2)_n OZ$, —$(CH_2)_n W$, or $(-CO)_2 O$ or $(-CO)_2 NR^{15}$ formed of $X^1$ and $Y^1$, $X^2$ and $Y^2$ or $X^3$ and $Y^3$, $R^{11}$, $R^{12}$, $R^{13}$, $R^{14}$ and $R^{15}$ each independently represents a hydrocarbon group having 1 to 20 carbon atoms. Z represents a hydrocarbon group or a hydrocarbon group substituted with halogen. W represents $SiR^{16}{}_p D_{3-p}$ ($R^6$ represents a hydrocarbon group having 1 to 10 carbon atoms; D represents a halogen atom-$OCOR^{16}$— or —$OR^{16}$; and p represents an integer of 0 to 3). In represents an integer of 0 to 10.

As disclosed in JP-A 1-240517, 7-196736, 60-26024, and 62-19801, pamphlet of International Laid-Open No. 04/070463, and the like, a hydride of a norbornene-based polymer is produced by addition polymerization or ring-opening metathesis polymerization of a polycyclic unsaturated compound followed by addition of hydrogen. In a norbornene-based polymer used for the present invention, $R^9$ to $R^{12}$ are each preferably a hydrogen atom or —$CH_3$; $X^3$, $X^4$, $Y^3$ and $Y^4$ are each preferably a hydrogen atom, Cl, or —$COOCH_3$; and the other groups are selected as appropriate. Such a norbornene-based resin is commercially available from JSR Corporation under the trade name of Arton G or Arton F, and from Zeon Corporation under the trade name of Zeonor ZF14, Zeonor ZF16, Zeonex 250 or Zeonex 280. These products can be used.

A vinyl alicyclic hydrocarbon polymer is disclosed in JP-A 10-87752 and JP-A 2001-272534. A vinyl alicyclic hydrocarbon polymer can be produced by a polymerization method, such as a radical polymerization method, a coordinate anion polymerization method, a cation polymerization method, or the like, being applied to a cyclic compound, such as a compound having a structure in which a vinyl group or an α-alkyl-substituted vinyl group is bonded with a monocyclic cycloalkyl group, an alkyl-substituted cycloalkyl group, a cycloalkenyl group, or an alkyl-substituted cycloalkenyl group, a compound formed of a vinyl group or an α-alkyl-substituted vinyl group bonded with an aromatic hydrocarbon substituent, or the like; and a linear diene compound, such as ethylene, propylene, butane, a conjugate diene (e.g., butadiene, isopulene), a non-conjugate diene (e.g., ethylidene norbornene), acrylonitrile, acrylic acid, methacrylic acid, maleic anhydride, acrylate, methacrylate, maleimide, vinyl acetate, vinyl chloride, or the like. Such a vinyl alicyclic hydrocarbon polymer is marketed by Mitsui Chemicals Inc. under the trade name of Apel, and is available with grades of different glass transition temperatures (Tg), such as APL8008T (Tg: 70° C.), APL6013T (Tg: 125° C.), APL6015T (Tg: 145° C.), and the like.

(Additives)

To the cyclic polyolefin solution of the present invention, various additives can be added in respective preparation steps for respective uses (for example, an antideteriorant, a UV protector, a retardation (optical anisotropy) adjusting agent, a microparticle, a peeling promoter, an infrared absorber, etc.). These additives may be solid or oil-like. In other words, there is no specific limitation in terms of the melting point or boiling point. For example, a UV absorbing material having a temperature of 20° C. or lower may be mixed with a UV absorbing material having a temperature of 20° C. or higher. Similarly, different antideteriorants may be mixed together. Further, usable infrared absorbing dyes are described in, for example, JP-A 2001-194522. The additives may be added at any time during the dope production process, or a step of adding an additive may be provided after the final step of the dope preparation process. The added amount of each material is not particularly limited as long as a function thereof is provided. When the cyclic polyolefin is formed of a plurality of layers, the type or added amount of the additives may vary among the layers.

(Antideteriorant)

To the cyclic polyolefin film of the present invention, a known antideteriorant (antioxidant) can be added, including, for example, a phenol or hydrokinenone antioxidant, such as 2,6-di-t-butyl, 4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), 2,5-di-t-butylhydrokinone, or pentaerythrityl-tetrakis[3-(3,5-di-t-butyl-4-hydroxyphenyl)propionate, and the like. It is preferable to further add a phosphate antioxidant, such as tris(4-methxy-3, 5-diphenyl)phosphite, tris(nonylphenyl)phosphite, tris(2,4-di-t-butylphenyl)phosphite, bis(2,6-di-t-butyl-4-methylphenyl)pentaerythritoldiphosphite, bis(2,4-di-t-butylphenyl) pentaerythritoldiphosphite, and the like. The added amount of the antioxidant is 0.05 to 5.0 parts by mass with respect to 100 parts by mass of cyclic polyolefin.

(UV Absorber)

For the cyclic polyolefin film of the present invention, a UV absorber is preferably used for prevention of the deterioration of the polarizing plate, liquid crystal, or the like. A UV absorber which has an excellent ability of absorbing UV light having a wavelength of 370 nm or shorter and absorbs a small amount of visible light having a wavelength of 400 nm or longer for the purpose of providing satisfactory liquid-crystal display is preferably used. Specific examples of the UV absorber preferably used in the present invention include hindered phenol compounds, oxybenzophenone compounds, benzotriazol compounds, salicylate compounds, benzophenone compounds, cyanoacrylate compounds, nickel complex salt compounds, and the like. Examples of the hindered phenol-based compounds include 2,6-di-tert-butyl-p-cresol, pentaerythrityl-tetrakis[3-(3,5-di-tert-butyl-4-hydroxyphenyl)propionate], N,N'-hexamethylenebis(3,5-di-tert-butyl-4-hydroxy-hydrocineamide), 1,3,5-trimethyl-2,4-6-tris(3,5-di-tert-butyl-4-hydroxybenzyl)benzene, tris-(3,5-di-tert-butyl-4-hydroxy benzyl)-isocyanurate, and the like. Examples of the benzotriazol-based compounds include 2-(2'-hydroxy-5'-methylphenyl)benzotriazol, 2,2-methylenebis(4-(1,1,3,3-tetramethylbutyl)-6-(2H-benzotriazol-2-il)phenol), (2,4-bis(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocineamide), 1,3,5-trimethyl-2,4,6-tris(3,5-di-tert-butyl-4-hydroxybenzyl)benzene, 2(2'-hydroxy-3',5'-di-tert-butylphenyl)-5-chlorbenzothiazol, (2(2'-hydroxy-3',5'-di-tert-amylphenyl)-5-chlorbenzotriazol, 2,6-di-tert-butyl-p-cresol, pentaerythrityl-tetrakis[3-(3,5-di-tert-butyl-4-hydroxyphenyl)propionate], and the like. The added amount of these additives is preferably 1 ppm to 1.0% by mass, more preferably 10 to 1000 ppm by mass, with respect to cellulose acylate. (In this specification, % by mass and parts by mass are equal to % by weight and parts by weight, respectively.)

(Mat Agent)

In the present invention, it is preferable to add a microparticle in order to prevent the produced cyclic polyolefin film from being damaged while being handled or to prevent the conveyability of the formed cyclic polyolefin film from being lowered. Specific examples of the preferable mat agent include inorganic compounds, such as silicon-containing compounds, silicon dioxide, titanium oxide, zinc oxide, aluminum oxide, barium oxide, zirconium oxide, strongtium oxide, antimony oxide, tin oxide, tin oxide/antimony, calcium carbonate, talc, clay, sintered kaoline, sintered calcium silicate, calcium silicate hydrate, aluminum silicate, magnesium silicate, calcium phosphate, and the like. Inorganic compounds containing silicon and zirconium oxide are more preferable. Silicon dioxide is particularly preferably used since it can reduce the turbidity of the film. As the microparticle agent of silicate dioxide, for example, commercially available products having the trade names of Aerozyl R972, R974, R812, 200, 300, R202, OX50 TT600 (all are produced by Nippon Aerozyl Co., Ltd.), and the like can be used. As the microparticle agent of zirconium oxide, for example, commercially available products having the trade names of Aerozyl R976, R811 (all are produced by Nippon Aerozyl Co., Ltd.), and the like can be used.

The primary average particle diameter of such microparticles is preferably 0.001 to 20 μm, more preferably 0.001 to 10 μm, even more preferably 0.002 to 1 μm, and particularly preferably 0.005 to 0.5 μm in order to suppress the haze to a low level. The primary average particle diameter of the microparticles can be measured using a transmission electron microscope. Purchased microparticles are often aggregated, and it is preferable to diffuse such purchased microparticles by a known method before use. The microparticles are diffused so that the secondary average particle diameter is preferably 0.2 to 1.5 μm, more preferably 0.3 to 1.0 μm. The added amount of the microparticle agent is preferably 0.01 to 0.3 parts by mass, more preferably 0.05 to 0.2 parts by mass, and most preferably 0.08 to 0.12 parts by mass, with respect to 100 parts by mass of cyclic polyolefin.

Next, an organic solvent for dissolving the cyclic polyolefin of the present invention will be described.

(Chlorine-Based Solvent)

In production of a solution of the cyclic polyolefin of the present invention, a chlorine-based organic solvent is preferably used as a main solvent. In the present invention, the type of the chlorine-based organic solvent is not particularly limited as long as the cyclic polyolefin is dissolved and cast to form a film and thus the object can be achieved. The chlorine-based organic solvent is preferably dichloromethane or chloroform. Dichloromethane is particularly preferable. Organic solvents other than the chlorine-based organic solvent can be mixed with no particular problem. In this case, at least 50% by mass of dichloromethane needs to be used. Non-chlorine-based organic solvents which are used in combination with the chlorine-based organic solvent for the present invention will be hereinafter described. A preferable non-chlorine-based organic solvent is selected from ester, ketone, ether, alcohol, hydrocarbon, and the like having 3 to 12 carbon atoms. The ester, ketone, ether, and alcohol may have a ring structure. A compound having at least two functional groups of ester, ketone, and ether (i.e., —O—, —CO— or —COO—) can be used as a solvent. Such a compound may simultaneously have another functional group, such as, for example, an alcoholic hydroxy group. In the case of a solvent having two or more types of functional groups, the carbon atom number thereof can be within the defined range of a compound having either functional group. Examples of ester having 3 to 12 carbon atoms include ethyl formate, propyl formate, pentyl formate, methyl acetate, ethyl acetate, pentyl acetate, and the like. Examples of ketone having 3 to 12 carbon atoms include acetone, methylethylketone, diethylketone, diisobutylketone, cyclopentanone, cyclohexanone, methylcyclohexanone, and the like. Examples of ether having 3 to 12 carbon atoms include diisopropylether, dimethoxymethane, dimethoxyethane, 1,4-dioxane, 1,3-dioxorane, tetrahydrofrane, anisol, phenetol, and the like. Examples of the organic solvent having two or more types of functional groups include 2-ethoxyethylacetate, 2-methoxyethanol, 2-butoxyethanol, and the like.

The alcohol used in combination with the chlorine-based organic solvent may preferably have a straight-chained structure, a branched-chained structure, or a ring structure, and is preferably saturated aliphatic hydrocarbon. The hydroxy group of the alcohol may be primary, secondary, or tertiary. Examples of the alcohol include methanol, ethanol, 1-propanol, 2-propanol, 1-butanol, 2-butanol, t-butanol, 1-pentanol, 2-methyl-2-butanol, and cyclohexanol. As the alcohol, fluorine-based alcohols can also be used. For example, 2-fluoroethanol, 2,2,2-trifluoroethanol, 2,2,3,3-tetrafluoro-1-propanol, and the like can be used. The hydrocarbon may have a straight-chained structure, a branched-chained structure, or a ring structure. Either aromatic hydrocarbon or aliphatic hydrocarbon can be used. The aliphatic hydrocarbon may be saturated or unsaturated. Examples of the hydrocarbon include cyclohexane, hexane, benzene, toluene, and xylene.

Combinations of the chlorine-based organic solvents, which are preferable main solvents for the present invention, may be, for example, as follows, but not limited thereto.

Dichloromethane/methanol/ethanol/butanol (80/8/5/2, parts by mass)
Dichloromethane/methanol/butanol/cyclohexane (75/10/5/5/5, parts by mass)
Dichloromethane/acetone/methylethylketone/ethanol/isopropanol (75/10/10/5/7, parts by mass)
Dichloromethane/methyl acetate/butanol (80/10/10, parts by mass)
Dichloromethane/1,3-dioxorane/methanol/ethanol (70/20/5/5, parts by mass)
Dichloromethane/dioxane/acetone/methanol/ethanol (60/20/10/5/5, parts by mass)

Dichloromethane/acetone/ethyl acetate/ethanol/butanol/hexane (65/10/10/5/5/5, parts by mass)

Dichloromethane/methyl acetoacetate/methanol/ethanol (65/20/10/5, parts by mass)

Dichloromethane (100, parts by mass)

Dichloromethane/ethanol (92/8, parts by mass)

Depending on the composition devised for the solvent, the peeling resistance value of a still wet film against peeling from the metal support significantly changes. By adding a non-solvent having a polarity to a chlorine-based organic solvent as the main solvent, the peeling resistance is significantly reduced. Polar solvents providing a particularly significant effect of reducing the peeling resistance are, for example, alcohols having 1 to 4 carbon atoms, monocarbonic acids having 1 to 5 carbon atoms, bivalent or more carbonic acids, half esters thereof, and the like. Among them, alcohols are most preferable since they have excellent volatility. A preferable ratio of a chlorine-based main solvent to a polar non-solvent is 70 to 98 parts by mass of a chlorine-based main solvent to 2 to 30 parts by mass of a polar non-solvent. A more preferable ratio is 78 to 95 parts by mass of a chlorine-based main solvent to 5 to 22 parts by mass of a polar non-solvent.

Preferable combinations of solvents which provide a low level of peeling resistance are as follows, but are not limited thereto.

Dichloromethane/methanol/ethanol/butanol (83/10/5/2, parts by mass)

Dichloromethane/methyl acetate/ethanol (80/10/10, parts by mass)

Dichloromethane/methanol/isopropanol (78/15/7, parts by mass)

Dichloromethane/methanol (87/13, parts by mass)

(Non-Chlorine-Based Solvent)

Next, a non-chlorine-based solvent preferably used for producing the cyclic polyolefin solution of the present invention will be described. In the present invention, the non-chlorine-based solvent is not particularly limited as long as the cyclic polyolefin is dissolved and cast to form a film and thus the object is achieved. A non-chlorine-based solvent used for the present invention is preferably selected from chained hydrocarbon, cyclic hydrocarbon, aromatic hydrocarbon, ester, ketone, and ether having 3 to 12 carbon atoms. The ester, ketone, and ether may have a ring structure. A compound having at least two functional groups of ester, ketone, and ether (i.e., —O—, —CO— or —COO—) can be used as a main solvent. Such a compound may further have another functional group, such as, for example, an alcoholic hydroxy group. In the case of a main solvent having two or more types of functional groups, the carbon atom number thereof can be within the defined range of a compound having either functional group. Examples of chained hydrocarbons having 3 to 12 carbon atoms include hexane, octane, isooctane, decane, and the like. Examples of cyclic hydrocarbons having 3 to 12 carbon atoms include hexane and derivatives thereof. Examples of aromatic hydrocarbon having 3 to 12 carbon atoms include benzene, toluene, xylene, and the like. Examples of esters having 3 to 12 carbon atoms include ethyl formate, propyl formate, pentyl formate, methyl acetate, ethyl acetate, and pentyl acetate. Examples of ketones having 3 to 12 carbon atoms include acetone, methylethylketone, diethylketone, diisobutylketone, cyclopentanone, cyclohexanone, and methylcyclohexanone. Examples of ethers having 3 to 12 carbon atoms include diisopropylether, dimethoxymethane, dimethoxyethane, 1,4-dioxane, 1,3-dioxorane, tetrahydrofrane, anisol, and phenetol. Examples of the organic solvent having two or more types of functional groups include 2-ethoxyethylacetate, 2-methoxyethanol, and 2-butoxyethanol.

(Dope Preparation)

Next, regarding the preparation of the cyclic polyolefin solution (dope) of the present invention, the method for dissolving the cyclic polyolefin is not particularly limited. The dissolution may be performed at room temperature, by a low temperature dissolution method, a high temperature dissolution method, or a combination thereof. Regarding these methods, the same technique as that for cellulose acylate films is applicable. Hatsumei Kyokai's Disclosure Bulletin No. 2001-1745 (issued on Mar. 15, 2001, Hatsumei Kyokai), page 25 et seq., which describes methods for dissolving cellulose acylate in detail, can be referenced. When dissolution is performed at high temperature, it is mostly performed at no less than the boiling point of the organic solvent used, and under a pressurized state.

The viscosity of the cyclic polyolefin solution of the present invention is preferably within the range of 1 to 500 Pa·s, more preferably 5 to 200 Pa·s, at 25° C. The viscosity was measured as follows. The viscosity of 1 mL of a sample solution was measured by a reometer (CSL 500) using a Steel Cone (both are produced by TA Instruments) having a diameter of 4 cm/2°. The measurement started after the sample solution was warmed so that the liquid temperature was constant at the measurement start temperature.

A cyclic polyolefin solution has a feature of providing a high concentration dope. A cyclic polyolefin solution which is highly concentrated and highly stable can be obtained without relying on means of concentration. For easier dissolution, the cyclic polyolefin may be dissolved to a lower concentration and then concentrated using concentration means. The method of concentration is not particularly limited. For example, the concentration can be realized by a method by which a low concentration solution is introduced between a cylinder and a rotation path of an outer circumference of a rotatable wing which is provided inside the cylinder and is rotated in a circumferential direction while a temperature difference from the solution is provided, so that the solvent is evaporated to obtain a high concentration solution (for example, JP-A 4-259511); a method by which a heated low concentration solution is blown off from a nozzle into a container so as to flash-evaporate the solvent during the time from when the solution enters from the nozzle until when the solution hits the inner wall of the container while the solvent vapor is removed from the container and a high concentration solution is removed from the bottom of the container (for example, the methods described in U.S. Pat. Nos. 2,541,012, 2,858,229, 4,414,341, and 4,504,355); or the like.

Before casting, the solution is preferably filtered using an appropriate filter of metal mesh, flannel or the like to remove foreign matr, such as undissolved substances, dust, impurities, or the like. For filtering of a cyclic polyolefin solution, a filter having an absolute filtering precision of 0.1 to 100 µm, preferably 0.5 to 25 µm, is used. The thickness of the filter is preferably 0.1 to 10 mm, more preferably 0.2 to 2 mm. In this case, the filtering pressure is 1.6 MPa or less, more preferably 1.3 MPa or less, even more preferably 1.0 MPa or less, and particularly preferably 0.6 MPa or less. As the filtering material, a conventionally known material, such as glass fiber, cellulose fiber, filter paper, fluorine resin (e.g., tetrafluoroethylene resin, etc.), or the like, can be preferably used. Ceramics, metals, and the like are also preferably used.

The viscosity of a cycle polyolefin solution immediately before film formation can be within a range which allows the solution to be cast when forming a film. Typically, the solution is prepared to have a viscosity within the range of preferably 5 Pa·s to 1000 Pa·s, more preferably 15 Pa·s to 500 Pa·s, and even more preferably 30 Pa·s to 200 Pa·s. The temperature at this point is not particularly limited as long as it is a temperature when the solution is cast, and is preferably −5 to 70° C., more preferably −5 to 35° C.

(Film Formation)

A method for forming a film using a cyclic polyolefin film will be described. As the method and the equipment for forming the cyclic polyolefin film of the present invention, a solution cast film formation method and a solution cast film formation apparatus which are similar to those conventionally used for forming a cellulose acetate film are used. A dope (cyclic polyolefin solution) which has been prepared by a dissolver (tank) is once stored in a storage tank, and the dope is defoamed as the final step of preparation. The dope is sent from a dop take-out mouth to a pressure-type die through, for example, a pressure-type metering gear pump which can transfer a constant quantity of liquid with high precision by controlling the number of revolutions per unit time. The dope is cast uniformly from a mouth (slit) of the pressure-type die onto a metal support of a casting section running endlessly. At the peeling point at which the metal support has made almost one revolution, the still wet dope film (also referred to as a "web") is peeled off from the metal support. The obtained web is held by clips at both ends thereof, conveyed by a tenter, and dried. Then, the web is conveyed by a group of rolls of a dryer. Thus, the drying process is terminated. The web is wound up around a winder so as to have a predetermined length. The combination of the tenter and the group of rolls of the dryer varies depending on the purpose of the film to be produced. In a solution cast film formation method used for functional protective films for electronic displays, a coating apparatus is often used in addition to the solution flow cast formation apparatus, in order to perform surface treatment to provide a subbing layer, an antistatic layer, an anti-halation layer, a protective film, and the like on the film. Hereinafter, each step will be briefly described, but the present invention is not limited to the following description.

For forming a cyclic polyolefin film by a solvent cast method, the prepared cyclic polyolefin (dope) is first cast onto a metal drum or metal band (belt) to evaporate the solvent. Thus, the film is formed. The concentration of the pre-casting dope is preferably adjusted so that the polymer amount is 10 to 35% by mass. The surface of the drum or band is preferably finished to be in a mirror surface state. The dope is preferably cast onto a drum or band having a surface temperature of 30° C. or lower. The surface temperature of the metal support is particularly preferably −10 to 20° C.

Cellulose acylate film formation techniques described in JP-A 2000-301555, 2000-301558, 7-032391, 3-193316, 5-086212, 62-037113, 2-276607, 55-014201, 2-111511, and 2-208650 are applicable to the present invention.

(Double Layer Casting)

A cyclic polyolefin solution may be cast as a single layer onto a smooth band or drum which serves as a metal support, or a plurality of cyclic polyolefin solutions may be cast in two or more layers. For casting a plurality of cyclic polyolefin solutions, the solutions containing a cyclic polyolefin may be cast from a plurality of casting outlets provided at intervals in the advancing direction of the metal support, so that the solutions are cast and laminated to form a film. For example, methods described in JP-A 61-158414, 1-122419, and 11-198285 are applicable.

Alternatively, the film may be formed by casting the cyclic polyolefin solutions from two casting outlets. For example, methods described in JP-B 60-27562 and JP-A 61-94724, 61-947245, 61-104813, 61-158413, and 6-134933 are applicable. Still alternatively, a polyolefin solution film cast method described in JP-A 56-162617 can also be used, in which a flow of a high concentration cyclic polyolefin solution is wrapped around in a low concentration cyclic polyolefin solution, and the high and low concentration cyclic polyolefin solutions are simultaneously extruded. Furthermore, it is preferable that as described in JP-A 61-94724 and 61-95725, an outer solution contain a greater amount of alcoholic component as a poor solvent than an inner solution. Alternatively, the film may be formed using two casting outlets. In this case, a film formed on a metal support using the first casting outlet is peeled off, and a second solution is cast from the second casting outlet onto a surface of the film which was in contact with the surface of the metal support. This method is described in, for example, JP-B 44-20235. The cyclic polyolefin solutions to be cast may be the same as or different from each other, with no specific limitation. In order to provide the plurality of cyclic polyolefin layers with functions, the cyclic polyolefin solutions corresponding to the respective functions may be extruded from the respective casting outlets. The cyclic polyolefin solutions may be cast for simultaneously forming other functional layers (e.g., an adhesive layer, a dye layer, an antistatic layer, an anti-halation layer, a UV absorbing layer, a polarization layer, etc.).

When a single layer of solution is used, a high concentration and high viscosity cyclic polyolefin solution needs to be extruded in order to provide a necessary film thickness. In this case, the poor stability of the cyclic polyolefin solution is likely to result in occurrence of solid substances to cause bump defects or poor planarity. As a solution to such a problem, a plurality of cyclic polyolefin solutions are cast from the casting outlets, thereby high viscosity solutions can be simultaneously extruded onto a metal support. This improves the planarity, which results in formation of a film having an excellent surface state. In addition, the use of a thick cyclic polyolefin solution can achieve the reduction of the drying load and thus can increase the production speed of the film.

When a plurality of solutions are simultaneously cast, the thicknesses of the inner layer and the outer layer are not particularly limited. However, the thickness of the outer layer is preferably 1 to 50%, more preferably 2 to 30%, of the entire film thickness. In the case where three or more solutions are cast, it is defined that the total thickness of the layer in contact with the metal support and the layer in contact with the air is the thickness of the outer layer. When a plurality of solutions are simultaneously cast, a laminate structure cyclic polyolefin film can be formed by simultaneously casting cyclic polyolefin solutions containing the above-described additives, such as an antideteriorant, a UV absorber, a mat agent, and the like, at different concentrations. For example, a cyclic polyolefin film having a structure of skin layer/core layer/skin layer can be formed. For example, the mat agent may be contained in the skin layers in a larger amount, or only in the skin layers. The antideteriorant and the UV absorber may be contained in the core layer in a larger amount than in the skin layers, or only in the core layer. Different types of antideteriorants and UV absorbers may be contained between the core layer and the skin layers. For example, an antideteriorant and/or a UV absorber having a low volatility may be contained in the skin layers, and a plasticizer having excellent plasticity or a UV absorber having excellent UV absorbability may be contained in the core layer. It is also preferable that only the skin layer in contact with the metal support contain a peeling promoter. It is also preferable to add a greater amount of alcohol as a poor solvent to the skin layers than the core layer, so that the metal support is cooled by a low temperature drum method to gelate the solution. The Tg may be different between the skin layers and the core layer. It is preferable that the Tg of the core layer is lower than the Tg of the skin layers. The viscosity of the solution containing the cyclic polyolefin at the time of casting may be different between the skin layers and the core layer. It is preferable that the viscosity of the skin layers be lower than the viscosity of the core layer, but it is also acceptable that the viscosity of the core layer be lower than the viscosity of the skin layers.

(Casting)

Preferable methods for casting the solution include a method of uniformly extruding the prepared dope from the pressure die onto the metal support, a doctor blade method of adjusting the thickness of the film of the dope once cast onto the metal support with a blade, a method employing a reverse roll coater of adjusting the thickness of the film of the dope using a roll rotating in a reverse direction, and the like. The method employing the pressure die is preferable. The pressure die is of a coat hanger type, a T die type, or the like. Any type is preferably usable. In addition to the above-described methods, various film formation methods conventionally known for casting a cellulose triacetate solution can be used. The effects substantially the same as the effects described in the respective publications are provided by setting various conditions in consideration of the boiling point of the solvent used and the like. As the endlessly running metal support used for forming the cyclic polyolefin film of the present invention, a drum having a surface which is mirror-finished by chromium plating or a stainless belt (also referred to as a "band") having a surface which is mirror-finished by surface polishing, is used. For forming the cyclic polyolefin film of the present invention, one or two or more pressure dies may be installed above the metal support. Preferably, one or two dies are installed. When two or more dies are installed, the amount of a dope to be cast may be divided among the dies with various proportions, or the dope may be sent to the dies from a plurality of high-precision constant quantity pumps with the respective proportions. The temperature of the cyclic polyolefin solution to be cast is preferably −10 to 55° C., more preferably 25 to 50° C. In this case, the temperature may be the same in all the steps, or may be changed, depending on the step. When the temperature is changed, depending on the step, a desired temperature only needs be attained immediately before the solution is cast.

(Drying)

Generally used methods for drying the dope on the metal support for forming a cyclic polyolefin film include a method of blowing hot air to the surface of the metal support (drum or belt), i.e., to the surface of the web on the metal support; a method of blowing hot air to the rear surface of the drum or belt; a liquid heat transmission method of putting a temperature-controlled liquid into contact with the rear surface of the belt or drum, which is opposite to the surface on which the dope is cast, so as to heat the drum or belt by heat transmission to control the surface temperature; and the like. The rear surface liquid heat transmission method is preferable. The surface temperature of the metal support before the solution is cast may be any temperature which is equal to or lower than the boiling point of the solvent used for the dope. However, in order to promote the drying or in order to deprive the solution of fluidity on the metal support, it is preferable to set the surface temperature to a temperature which is lower by 1 to 10 degrees than the boiling point of the solvent having the lowest boiling point among the solvents used. This is not applied to the case where the cast dope can be peeled off without being cooled or dried.

(Stretching)

The retardation of the cyclic polyolefin film of the present invention can be adjusted by stretching. There are also techniques of actively stretching the film in the width direction, as described in, for example, JP-A 62-115035, 4-152125, 4-284211, 4-298310, and 11-48271. With these techniques, the formed cyclic polyolefin film is stretched in order to increase the in-plane retardation thereof.

The film is stretched at room temperature or in a heated state. The film is heated to preferably ±50° C., more preferably ±45° C., and even more preferably ±40° C., of the glass transition temperature of the film. The film may be monoaxially stretched only in the length or width direction, or may be simultaneously or sequentially biaxially stretched in the length and width directions. The film is stretched by 0.5 to 200%, preferably 0.5 to 100%, and particularly preferably 0.5 to 50%. Regarding the birefringence of an optical film, it is preferable that the refractive index in the width direction be larger than the refractive index in the length direction. Therefore, it is preferable to stretch the film more in the width direction than in the length direction. The stretching may be performed in the middle of the film formation process, or after the film is formed and wound up. In the former case, the stretching may be performed while a residual amount of solvent is contained. The stretching can be performed preferably when the residual amount of solvent is 1 to 50%.

The thickness of a finished (dried) cyclic polyolefin film of the present invention varies depending on the purposes of use, but is typically in the range of 5 to 500 μm, preferably in the range of 30 to 150 μm. Especially when used for a liquid-crystal display device, the film preferably has a thickness of 40 to 110 μm.

The thickness of the film can be adjusted by adjusting the concentration of the solid substance in the dope, the slit size of the mouth of the die, the extruding pressure from the die, the speed of the metal support, and the like so as to obtain a desired thickness. The width of the cyclic polyolefin film obtained as described above is preferably 0.5 to 3 m, more preferably 0.6 to 2.5 m, and even more preferably 0.8 to 2.2 m. The film is wound up so that the length of each roll is preferably 100 to 10,000 m, more preferably 500 to 7,000 m, and even more preferably 1,000 to 6,000 m. When winding up the film, it is preferable to provide knurling on at least one end. The width of the knurling is preferably 3 to 50 mm, more preferably 5 to 30 mm, and the height of the knurling is preferably 0.5 to 500 μm, more preferably 1 to 200 μm. The knurling may be provided on one side or on both sides. The variance of the Re value in the entire width is preferably ±5 nm, more preferably ±3 nm. The variance of the Rth value is preferably ±10 nm, more preferably ±5 nm. The variance of the Re value and the variance of the Rth value in the length direction are preferably within the range of those in the width direction. In order to keep the transparency of the film, the haze is preferably 0.01 to 2%. In order to reduce the haze, the microparticles of the mat agent added are sufficiently diffused to reduce the number of coagulated particles, or the mat agent is used only in the skin layer to reduce the added amount thereof.

A cyclic polyolefin film has a significant advantage of being low in moisture permeability and balanced water content, as compared to the cellulose acylate film conventionally used for polarizing plates. The moisture permeability is preferably 1000 g/m² or less, more preferably 400 g/m² or lower, at 60° C. and 95% RH for 24 hours. The measured balanced water content is preferably 2.0% or less, more preferably 1.0% or less, at 25° C. and 80% RH. When an additive, such as a UV absorber, a retardation exhibiting agent, or the like, is volatile or decomposable and thus the mass or the size of the film changes, optical characteristics of the film change. In this case, the change in the mass of the film is preferably 5% or less after 48 hours at 80° C. and 90% RH. Similarly, the change in the size of the film is preferably 5% or less after 24 hours at 60° C. and 95% RH. Even if the mass or size slightly changes, the optical characteristics change less when the optical elasticity of the film is small. Therefore, the optical elasticity of the film is preferably $30\times10^{-13}$ cm$^2$/dyne or less, more preferably $15\times10^{-13}$ cm$^2$/dyne or less.

(Attachment)

For attaching the cyclic polyolefin film of the present invention to a polarization film formed of PVA or the like, a polarization film protective film, a phase retardation film, or the like, the attaching techniques described in the section regarding the polarizing plate below and the techniques described in the section regarding the surface treatment below can be used. The film may be attached using a sticky material. An appropriate method is used in accordance with the type of the material to which the film is to be attached (hydrophilic or hydrophobic).

(Polarizing Plate)

A polarizing plate is formed of a polarizer and two transparent protective films provided on both sides thereof. As one protective film, the cyclic polyolefin film of the present invention can be used. As the other protective film, a typical cellulose acetate film may be used. As the polarizer, an iodine-based polarizer, a dye-type polarizer using a dichroic dye, and a polyen-based polarizer are available. The iodine-based polarizer and the dye-type polarizer are generally produced using a polyvinyl alcohol-based film. When the cyclic polyolefin film of the present invention is used as the polarizing plate protective film, the film is surface-treated as described below and then the treated surface of the film and the polarizer are attached together using an adhesive. Examples of usable adhesives include polyvinyl alcohol-based adhesives, such as polyvinyl alcohol, polyvinyl butylal, and the like; vinyl-based latex, such as butyl acrylate and the like; gelatin; and the like. The polarizing plate is composed of a polarizer and protective films for protecting both sides thereof. In addition, a protection film is attached to one side of the polarizer, and a separate film is attached to the other side thereof. The protection film and the separate film are used for the purpose of protecting the polarizing plate at the time of shipping of the polarizing plate, product inspection, and the like. In this case, the protection film is attached for the purpose of protecting the surface of the polarizing plate, and is used for the other side opposite to the side of the polarizing plate to be attached to a liquid-crystal plate. The separate film is used for the purpose of covering an adhesive layer for attaching the polarizing plate to the liquid-crystal plate, and is used for the side of the polarizing plate which is to be attached to the liquid-crystal plate.

It is preferable that the cyclic polyolefin film of the present invention be attached to the polarizer, so that the transmission axis of the polarizer matches the slow axis of the cyclic polyolefin film for the present invention. The polarizing plate produced in the crossed Nicols state was evaluated. As a result, it was found that when the precision of orthogonal crossing of the slow axis of the cyclic polyolefin film for the present invention and the absorption axis of the polarizer (axis orthogonally crossing the transmission axis) is 1° or more, the polarization performance of the polarizing plate in the crossed Nicols state is lower, resulting in light leakage. Where such a polarizing plate is combined with a liquid-crystal cell, a sufficient black level or contrast cannot be obtained. Therefore, the offset between the direction of the main refractive index of the cyclic polyolefin film for the present invention and the direction of the transmission axis of the polarizing plate is preferably 1° or less, more preferably 0.5° or less.

For measuring the single plate transmittance TT, the parallel transmittance PT, and the cross transmittance CT of the polarizing plate, UV3100PC (produced by Shimadzu Corporation) was used. The measurement was performed in the range of 380 nm to 780 nm. For all of the single plate transmittance, the parallel transmittance, and the cross transmittance, the measurement was performed 10 times and the average value thereof was obtained. The polarizing plate durability test was performed as follows in two forms, i.e., (1) with only the polarizing plate and (2) with a combination of the polarizing plate and a glass plate attached thereto with an adhesive. For the measurement with only the polarizing plate, two same samples were prepared, in which two polarizers were located in an orthogonally-crossed state and an optically-compensatory film was held therebetween. For the measurement with the polarizing plate with the glass plate attached thereto, two same samples (about 5 cm×5 cm) were prepared, in which the polarizing plate was attached to the glass plate so that the optically-compensatory film was on the side of the glass plate. For the measurement of the single plate transmittance, each sample was set so that the film was directed to the lights source. The measurement was performed on the two samples, and the average value was assumed to be the single plate transmittance. A preferable range of polarization performance is: for the single plate transmittance TT, $40.5 \leq TT \leq 45$; for the parallel transmittance PT, $32 \leq PT \leq 39.5$; and for the cross transmittance CT, $CT \leq 1.5$. A more preferable range is: for the single plate transmittance TT, $41.0 \leq TT \leq 44.5$; for the parallel transmittance PT, $34 \leq PT \leq 39.5$; and for the cross transmittance CT, $CT \leq 1.3$. In the polarizing plate durability test, the change amount is preferably smaller.

(Surface Treatment of a Cyclic Polyolefin Film)

In the present invention, the surface of a cyclic polyolefin film is surface-treated in order to improve the adhesiveness between a polarizer and a protective film. Any surface treatment method can be used as long as the adhesiveness is improved. Preferable types of surface treatment include, for example, glow discharge treatment, UV irradiation treatment, corona treatment, and flame treatment. As used herein, the glow discharge treatment refers to so-called low temperature plasma treatment performed in a low pressure gas. For the present invention, plasma treatment under the atmospheric pressure is most preferable. Glow discharge treatment is described in detail in U.S. Pat. Nos. 3,462,335, 3,761299, 4,072,769, and GB Patent No. 891469. A method described in JP-A 59-556430 can also be used, in which the discharge atmospheric gas composition contains only a type of gas which is generated by subjecting a polyester support to discharge treatment after the discharge is started. For performing vacuum glow discharge treatment, a method described in JP-B 60-16614 can be used, in which the discharge is performed while the surface temperature of the film is 80° C. or higher and 180° C. or lower.

The vacuum degree at the time of glow discharge treatment is preferably 0.5 to 3000 Pa, more preferably 2 to 300 Pa. The voltage is preferably 500 to 5000 V, more preferably 500 to 3000V. The discharge frequency used is from direct current to several thousand megahertz, more preferably 50 Hz to 20 MHz, and even more preferably 1 kHz to 1 MHz. The discharge treatment intensity is preferably 0.01 kV·A·min/m$^2$ to 5 kV·A·min/m$^2$, more preferably 0.15 kV·A·min/m$^2$ to 1 kV·A·min/m$^2$.

In the present invention, it is also preferable to perform UV irradiation as a surface treatment. The UV irradiation can be performed by methods described in, for example, JP-B 43-2603, 43-2604, and 45-3828. The mercury lamp is a high pressure mercury lamp formed of a quartz tube, and preferably provides UV having a wavelength in the range of 180 to 380 nm. The UV irradiation method is as follows. As the light source, a high pressure mercury lamp providing light having a main wavelength of 365 nm can be used if the capability of the support allows the surface temperature of the protective film to increase to about 150° C. with no problem. When low temperature treatment is required, a low pressure mercury lamp providing light having a main wavelength of 254 nm is preferable. It is also possible to use an ozone-less type high pressure mercury lamp and a low pressure mercury lamp. As the light amount used for the treatment is increased, the adhesiveness between a polymer resin film having a thermoplastic saturated alicyclic structure and the polarizer is improved, but there is also a problem that as the light amount is increased, the film is colored and becomes brittle. Accordingly, when a high pressure mercury lamp providing light having a main wavelength of 365 nm is used, the light amount used for radiation is preferably 20 to 10,000 (mJ/cm$^2$), more preferably 50 to 2,000 (mJ/cm$^2$). In the case of a low pressure mercury lamp providing light having a main wavelength of 254 nm, the light amount used for radiation is preferably 100 to 10,000 (mJ/cm$^2$), more preferably 300 to 1,500 (mJ/cm$^2$).

In the present invention, it is also preferable to perform corona discharge treatment as a surface treatment. The corona discharge treatment can be performed by methods described in, for example, JP-B 39-12838, and JP-A 47-19824, 48-20867, and 52-42114. Usable corona discharge treatment apparatuses include a solid-state corona treatment apparatus, a LEPEL-type surface treatment apparatus, a VETAPHON-type treatment apparatus, and the like produced by Pillar Induction Company. The treatment can be performed under atmospheric pressure in the air. The discharge frequency at the time of treatment is preferably 5 to 40 kV, more preferably 10 to 30 kV. The waveform is preferably an alternating sine wave. The gap transparent lance between the electrode and the dielectric roll is 0.1 to 10 mm, more preferably 1.0 to 2.0 mm. The discharge is performed above the dielectric support roller provided in the discharge band, and the amount to be treated is 0.3 to 0.4 kV·A·min/m$^2$, more preferably 0.34 to 0.38 kV·A·min/m$^2$.

In the present invention, it is also preferable to perform flame treatment as a surface treatment. Any of natural gas, liquefied propane gas, and city gas can be used, but the mixture ratio with air is important. The reason is that the effect provided by the surface treatment using flame is considered to be brought about by plasma containing active oxygen. The key is the amount of the activity of the plasma (temperature), which is an important property of the flame, and oxygen. This is determined by the gas/oxygen ratio. The energy density is highest and so the activity of the plasma is high when the gas and oxygen react with each other with no excess or shortage. Specifically, the mixture ratio of natural gas/air is preferably 1/6 to 1/10, more preferably 1/7 to 1/9, in volume. The mixture ratio of liquefied propane gas/air is preferably 1/14 to 1/22, more preferably 1/16 to 1/19, in volume. The mixture ratio of city gas/air is preferably 1/2 to 1/8, more preferably 1/3 to 1/7, in volume. The amount of flame used for the treatment is in the range of 1 to 50 kcal/m$^2$, more preferably 3 to 20 kcal/m$^2$. The distance between the tip of the inner flame of the burner and the film is 3 to 7 cm, more preferably 4 to 6 cm. Preferable nozzle shapes of the burner include the ribbon type of Flynn Burner Corp. (USA), the porous type of Heat Wise Inc. (USA), the ribbon type of Aerogen Company Limited (Great Britain), the zigzag porous type of Kasuga Ew Co., Ltd. (Japan), and the zigzag porous type of Koike Sanso Kogyo Co., Ltd. (Japan). The backup roll for supporting the film against the flame is a hollow type roll. It is advisable to cool the backup roll by cooling water, so that the treatment is performed at a constant temperature of 20 to 50° C.

The preferable range of the extent of surface treatment varies depending on the type of surface treatment or the type of cyclic polyolefin. It is preferable that as a result of the surface treatment, the contact angle of the surface of the surface-treated protective film with the pure water be less than 50°. The contact angle is preferably 25° or more and less than 45°. When the contact angle between the surface of the protective film and the pure water is in the above-described range, the adhesion strength between the protective film and the polarization film is satisfactory.

(Adhesive)

In the present invention, an adhesive containing a water-soluble polymer is used for attaching a polarizer formed of polyvinyl alcohol and a protective film formed of a surface-treated polymer resin having a thermoplastic saturated alicyclic structure to each other.

Examples of water-soluble polymers preferably used for the adhesive include single polymers or copolymers having an ethylenic unsaturated monomer as an element, such as N-vinyl pyrrolidone, acrylic acid, methacrylic acid, maleic acid, β-hydroxyethyl acrylate, β-hydroxyethyl mechacrylate, vinyl alcohol, methylvinyl ether, vinyl acetate, acrylamide, methacrylamide, diacetone acrylamide, vinyl imidazol; polyoxyethylene; polyoxypropylene, and the like; poly-2-methyloxazoline; methyl cellulose; hydroxyethyl cellulose; hydroxypropyl cellulose gelatin; and the like. For the present invention, PVA and gelatin are preferable.

The preferable characteristics of PVA when PVA is used for the adhesive are the same as the preferable characteristics of PVA when PVA is used for the polarizer described above. In the present invention, it is preferable to additionally use a crosslinker. Examples of the crosslinkers preferably used when PVA is used for the adhesive include boronic acid, polyvalent aldehyde, polyfunctional isocynanate compounds, polyfunctional epoxy compounds, and the like. For the present invention, boronic acid is particularly preferable.

As gelatin used for the adhesive, so-called lime-treated gelatin, acid-treated gelatin, enzyme-treated gelatin, gelatin derivatives, denatured gelatin, or the like can be used. Among these types of gelatin, lime-treated gelatin and acid-treated gelatin are preferably used. Examples of crosslinkers preferably usable with gelatin when gelatin is used for the adhesive include active halogen compounds (2,4-dichlor-6-hydroxy-1,3,5-triazine and sodium salts thereof, etc.), active vinyl compounds ((1,3-bisvinylsulfonyl-2-propanol, 1,2-bisvinylsulfonylacetoamide)ethane, bis(vinylsulfonylmethyl)ether or vinyl-based polymers having a vinylsulfonyl group in a side chain), etc.), N-carbamoyl pyridium salts ((1-morpholinocarbamoyl-3-pyridinio)methanesulfonate, etc.) and haloamidinium salts (1-(1-chloro-1-pyridinomethylene)pyrrolidinium 2-naphthalene sulfonate, etc.), and the like. For the present invention, active halogen compounds and active vinyl compounds are particularly preferably used.

The preferable add amount of the crosslinker used in combination with gelatin is 0.1% by mass or more and less than 40% by mass, more preferably 0.5% by mass or more and less than 30% by mass, with respect to the water-soluble polymer in the adhesive. Preferably, at least one surface of the protective film or the polarizer is coated with an adhesive to form an adhesive layer, and the protective film and the polarizer are attached to each other. Preferably, the treated surface of the protective film is coated with an adhesive to form an adhesive layer, and the adhesive layer is attached to the surface of the polarizer. The thickness of the adhesive layer is preferably 0.01 to 5 μm, particularly preferably 0.05 to 3 μm, after drying.

2. Next, the cellulose acylate film of the present invention will be described.

[Cotton as a Raw Material for Cellulose Acylate]

A cellulose as a raw material for cellulose acylate used for the present invention is cotton linter, wood pulp (hardwood pulp, softwood pulp) or the like. Cellulose acylate obtained from any raw material cellulose can be used. A plurality of raw material celluloses may be mixed as required. The raw material cellulose described in, for example, Maruzawa & Uda, Plastic Material Lecture (17) Cellulosic Resin, by Nikkan Kogyo Shinbun (1970); and Hatsumei Kyokai's Disclosure Bulletin No. 2001-1745 (pp. 7-8), can be used. There is no specific limitation on the raw material for the cellulose acylate film of the present invention.

[Degree of Substitution of Cellulose Acylate]

Next, the cellulose acylate of the present invention, which is produced from the above-described cellulose materials, will be described. The cellulose acylate of the present invention is obtained by acylating a hydroxy group of cellulose. As the substituent, any acyl group having 2 (acetyl group) to 22 carbon atoms can be used. For the cellulose acylate of the present invention, the degree of substitution of the hydroxy group of cellulose is not particularly limited. The degree of substitution can be obtained by calculation based on the measurement of the degree of binding of acetic acid and/or fatty acid having 3 to 22 carbon atoms which substitute the hydroxy group of cellulose. The method of measurement can be conducted in accordance with ASTM D-817-91.

As described above, for the cellulose acylate of the present invention, the degree of substitution of the hydroxy group of cellulose is not particularly limited. The degree of substitution of the hydroxy group with acyl is preferably 2.50 to 3.00, more preferably 2.75 to 3.00, and even more preferably 2.85 to 3.00.

Among acetic acids and/or fatty acids having 3 to 22 carbon atoms which substitute the hydroxy group of cellulose, any acyl group having 2 to 22 carbon atoms can be used with no specific limitation regardless of whether it is an aliphatic group or an allyl group. A single type of acyl group or a mixture of two or more types of acyl groups can be used. These are, for example, alkylcarbonyl ester or alkenylcarbonyl ester of cellulose, aromatic carbonyl ester, or aromatic alkylcarbonyl ester, and may have a substituted group. Examples of preferable acyl groups thereof include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphtylcarbonyl, and cinnamoyl groups, and the like. Among these, acetyl, propionyl, butanoyl, dodecanoyl, octadecanoyl, t-butanoyl, oleoyl, benzoyl, naphtylcarbonyl, cinnamoyl, and the like are preferable. Acetyl, propionyl, and butanoyl are particularly preferable.

In the case where the acyl substituent substituting the hydroxy group of cellulose is formed of substantially two types among acetyl group, propionyl group and butanoyl group, the optical anisotropy of the cellulose acylate film can be lowered when the total degree of substitution is 2.50 to 3.00. The degree of acyl substitution is more preferably 2.60 to 3.00, even more preferably 2.65 to 3.00.

[Degree of Polymerization of Cellulose Acylate]

The degree of polymerization of cellulose acylate preferably used for the present invention is 180 to 700 as measured in terms of the viscosity average degree of polymerization. For cellulose acylate, the degree of polymerization is more preferably 180 to 550, even more preferably 180 to 400, and particularly preferably 180 to 350. When the degree of polymerization is excessively high, the viscosity of the dope solution of cellulose acylate is excessively high and it becomes difficult to form a film by casting the solution. When the degree of polymerization is excessively low, the strength of the formed film is lowered. The average degree of polymerization can be measured as described in Uda et al., Limiting Viscosity Method (Kazuo UDA and Hideo SAITO, the Journal of the Society of Fiber Science and Technology, Japan, Vol. 18, No. 1, pp. 105-120, 1962. This is described in detail in JP-A 9-95538.

The molecular weight distribution of cellulose acylate preferably used for the present invention is evaluated by gel permeation chromatography. It is preferable that the polydispersity index (Mw/Mn) thereof (Mw represents the mass average molecular weight and Mn represents the number average molecular weight) be small and the molecular weight distribution be narrow. The specific Mw/Mn value is preferably 1.0 to 3.0, more preferably 1.0 to 2.0, and most preferably 1.0 to 1.6.

When a low molecular weight component is removed, the average molecular weight (degree of polymerization) increases but the viscosity becomes lower than that of typical cellulose acylate. Therefore, the removal of the low molecular weight component is useful. Cellulose acylate having a small amount of low molecular weight components can be obtained by removing the low molecular weight component from cellulose acylate obtained by a typical method. The low molecular weight component can be removed by washing the cellulose acylate with an appropriate organic solvent. For producing cellulose acylate having a small amount of low molecular weight components, it is preferable to adjust the amount of a sulfuric acid catalyst for the acetification reaction to be 0.5 to 25 parts by mass with respect to 100 parts by mass of cellulose. When the amount of the sulfuric acid catalyst is in the above-described range, cellulose acylate having a preferable molecular weight distribution (having a uniform molecular weight distribution) can be obtained. The water content of cellulose acylate produced according to the present invention is preferably 2% by mass or less, more preferably 1% by mass or less, and particularly preferably 0.7% by mass or less. Generally, cellulose acylate is known to have a water content of 2.5 to 5% by mass. In order to reduce the water content to the above-described level, it is necessary to dry the cellulose acylate. The method is not particularly limited as long as the intended water content is obtained. Raw material cotton and a synthesis method of the cellulose acylate of the present invention are described in detail in Hatsumei Kyokai's Disclosure Bulletin No. 2001-1745 (issued on Mar. 15, 2001, Hatsumei Kyokai), pp. 7-12.

For the cellulose acylate of the present invention, a single type of cellulose acylate, or a mixture of two or more types of cellulose acylates, can be used as long as the substituent, the degree of substitution, the degree of polymerization, the molecular weight distribution, and the like are in the above-described respective ranges.

[Additives to the Cellulose Acylate]

To the cellulose acylate solution of the present invention, various additives can be added (for example, a compound for lowering the optical anisotropy, a wavelength-dependent distribution adjuster, a UV inhibitor, a plasticizer, an antideteriorant, a microparticle, an optical characteristic adjusting agent, etc.) in the respective step, depending on the uses. These will be described below. The additives may be added at any time during the dope production process, or a step of adding an additive may be provided after the final step of the dope preparation process.

It is preferable that the cellulose acylate film of the present invention contain at least one type of compound for lowering the optical anisotropy, particularly the thickness-direction retardation Rth represented by Rth=((nx+ny)/2−nz)×d in the range satisfying the following expressions (IV) and (V).

$$(Rth(A)-Rth(0))/A \leq -1.0 \quad \text{(IV)}$$

$$0.01 \leq A \leq 30 \quad \text{(V)}$$

Regarding expressions (I) and (II) above, it is preferable that:

$$(Rth(A)-Rth(0))/A \leq -2.0; \text{ and} \quad \text{(IV)}$$

$$0.05 \leq A \leq 25; \text{ and} \quad \text{(V)}$$

it is more preferable that:

$$(Rth(A)-Rth(0))/A \leq -3.0; \text{ and} \quad \text{(IV)}$$

$$0.1 \leq A \leq 20. \quad \text{(V)}$$

where

Rth(A): Rth (nm) of the film containing a compound for lowering Rth at A %;

Rth(0): Rth (nm) of the film which does not contain any compound for lowering Rth (nm); and A: the mass (%) of the compound when the mass of the polymer as a material for the film is 100.

[Structural Features of a Compound for Lowering the Optical Anisotropy of the Cellulose Acylate Film]

A compound for lowering the optical anisotropy of the cellulose acylate film will be described. A compound for suppressing cellulose acylate in the film from being aligned in the in-plane or thickness direction is used to sufficiently lower the optical anisotropy so that Re is zero and Rth is close to zero. In order to achieve this, it is advantageous that the compound for lowering the optical anisotropy be sufficiently soluble in cellulose acylate and that the compound itself do not have a rod-shaped structure or a planar structure. Specifically, when the compound has a plurality of planar functional groups like an aromatic group, it is advantageous that the compound have the functional groups in a non-planar manner, not on the same plane.

(Log P)

In producing the cellulose acylate film for use in the invention, it is desirable to use the compound capable of retarding the in-plane and thickness-direction orientation of cellulose acylate in the film as so mentioned hereinabove to thereby lower the optical anisotropy of the film. Of the compound of the type, preferred is one having an octanol-water partition coefficient (log P value) of from 0 to 7. The compound of which the log P is over 7 is poorly compatible with cellulose acylate and it may therefore cause film whitening and dusting. On the other hand, the compound of which the log P is smaller than 0 is highly hydrophilic and it may worsen the water resistance of the cellulose acylate film. The log P is more preferably from 1 to 6, even more preferably from 1.5 to 5.

The octanol-water partition coefficient (log P) may be determined according to the flask dipping method of JIS Z7260-107 (2000). In place of actually measuring it, the octanol-water partition coefficient (long P) may be estimated according to a calculative chemical method or an experiential method. For the calculative method, preferred are a Crippen's fragmentation method (J. Chem. Inf. Comput. Sci., 27, 21 (1987)); Viswanadhan's fragmentation method (J. Chem. Inf. Comput. Sci., 29, 163 (1989)); Broto's fragmentation method (Eur. J. Med. Chem. Chim. Theor., 19, 71 (1984)). Of those, more preferred is a Crippen's fragmentation method (J. Chem. Inf. Comput. Sci., 27, 21 (1987)). When the log P of a compound differs depending on the measurement method or the calculation method, then the compound is preferably judged as to whether it falls within the range of the invention according to the Crippen's fragmentation method.

[Physical Properties of Compound Capable of Lowering Optical Anisotropy]

The compound having the ability to lower the optical anisotropy of film may have or may not have an aromatic group. Preferably, the compound having the ability to lower the optical anisotropy of film has a molecular weight of from 150 to 3000, more preferably from 170 to 2000, further more preferably from 200 to 1000. So far as having a molecular weight that falls within the range, the compound may have a specific monomer structure or may have an oligomer structure or a polymer structure with a plurality of such monomer units bonding to each other.

Preferably, the compound having the ability to lower the optical anisotropy of film is liquid at 25° C., or is a solid having a melting point of from 25 to 250° C., more preferably it is liquid at 25° C., or is a solid having a melting point of from 25 to 200° C. Preferably, the compound having the ability to lower the optical anisotropy of film does not evaporate away in the dope-casting and drying process of cellulose acylate film formation.

The amount of the optical anisotropy-lowering compound to be added to the film-forming dope in the invention is preferably from 0.01 to 30% by mass of cellulose acylate, more preferably from 1 to 25% by mass, even more preferably from 5 to 20% by mass.

One or more different types of optical anisotropy-lowering compounds may be used herein either singly or as combined in any desired ratio.

The time when the optical anisotropy-lowering compound is added to the film-forming dope may be any one during the process of dope preparation, and the compound may be added to the done in the final step of the dope preparation.

Regarding the content of the optical anisotropy-lowering compound in the cellulose acylate film in the invention, the mean content of the compound in the part of up to 10% of the overall thickness of the film from at least one surface side of the film is from 80 to 99% of the mean content of the compound in the center part of the film. The amount of the compound in the film in the invention may be determined by measuring the amount thereof in the surface part of the film and that in the center part thereof through IR absorption spectrometry as in JP-A 8-57879

Hereinafter, specific examples of compounds preferably used in the present invention for lowering the optical anisotropy of the cellulose acylate film will be described, but the present invention is not limited to these compounds.

The value of log P described herein is obtained based on Crippen's fragmentation method (J. Chem. Inf. Comput. Sci., 27, 21 (1987)).

Formula (1):

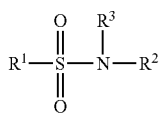

In general formula (1) above, $R^1$ represents an alkyl group or an aryl group, and $R^2$ and $R^3$ each independently represents a hydrogen atom, an alkyl group or an aryl group. It is particularly preferable that the total sum of the carbon atoms of $R^1$, $R^2$ and $R^3$ be 10 or more. As the substituent, a fluorine atom, an alkyl group, an aryl group, an alkoxy group, a sulfone group, and a sulfoneamide group are preferable; and an alkyl group, an aryl group, an alkoxy group, a sulfone group, and a sulfoneamide group are particularly preferable. The alkyl group may have a straight-chained, a branched-chained, or a ring structure. The alkyl group preferably has 1 to 25 carbon atoms, more preferably 6 to 25, and even more preferably 6 to 20 (for example, methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl, and didecyl). The aryl group preferably has 6 to 30 carbon atoms, particularly preferably 6 to 24 (for example, phenyl, biphenyl, terphenyl, naphtyl, binaphtyl, and triphenylphenyl). Preferable examples of compounds represented by general formula (1) will be shown below, but the present invention is not limited to these preferable specific examples.

A-1
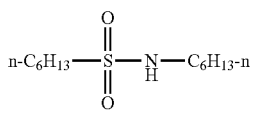

A-2
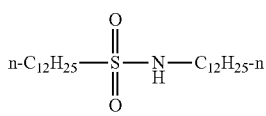

A-3
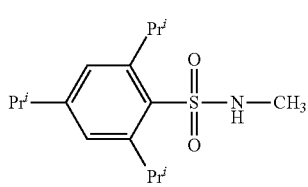

A-4
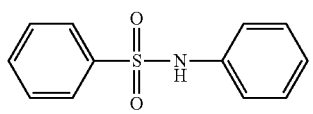

A-5
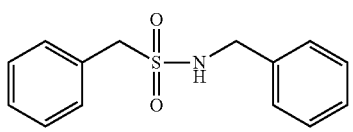

A-6
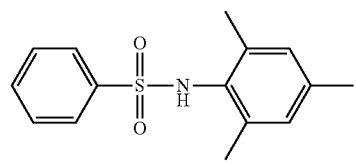

A-7
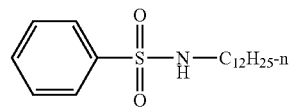

A-8
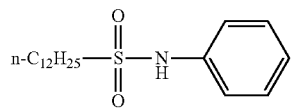

A-9
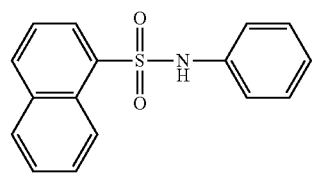

A-10
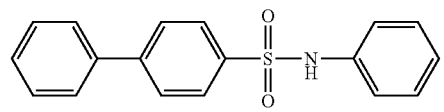

A-11
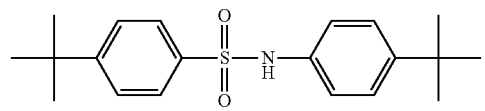

A-12
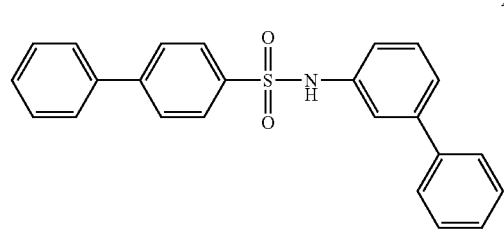

A-13
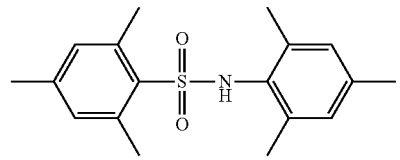

A-14
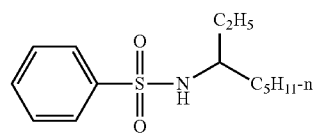

A-15
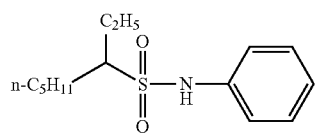

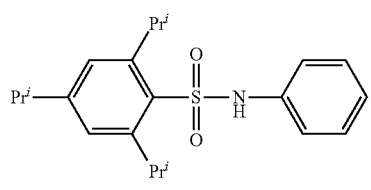
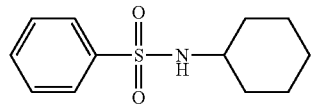
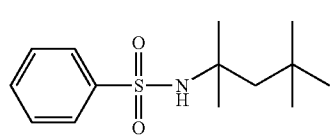
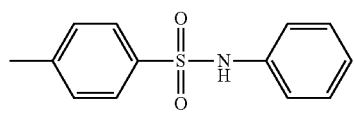
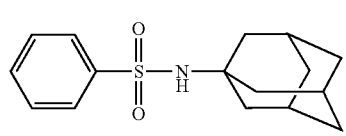
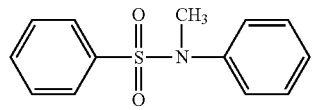
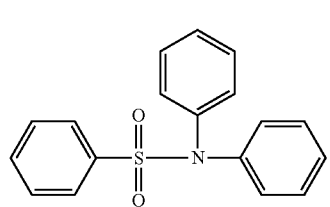
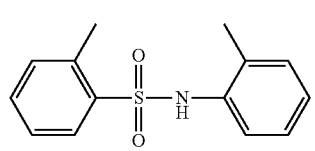
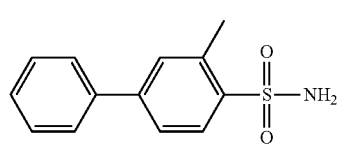
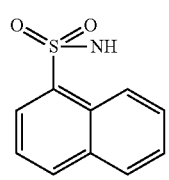
A-16
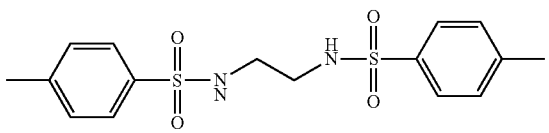
A-17
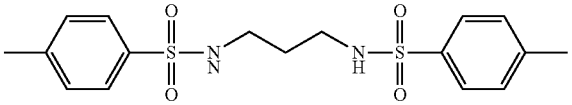
A-18
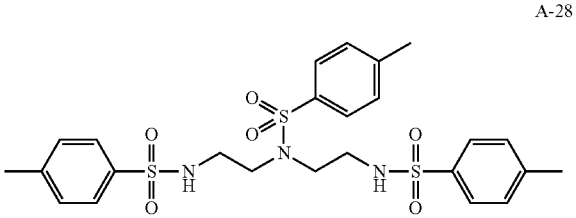
A-19
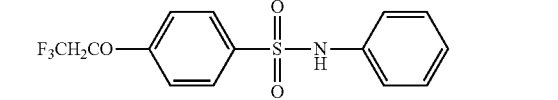
A-20
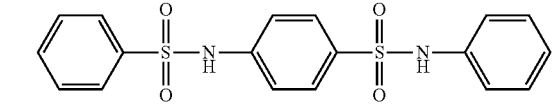
A-21
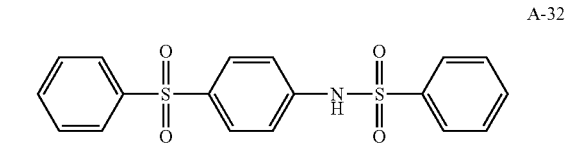
A-22
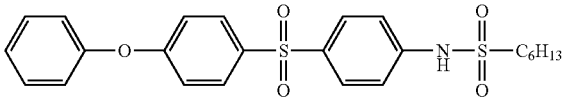
A-23
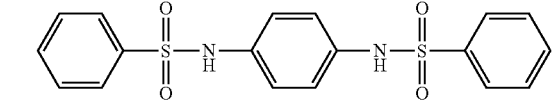
A-24
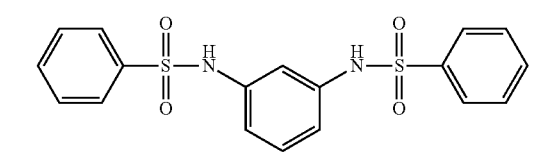
A-25
A-26
A-27
A-28
A-29
A-30
A-31
A-32
A-33
A-34
A-35

-continued

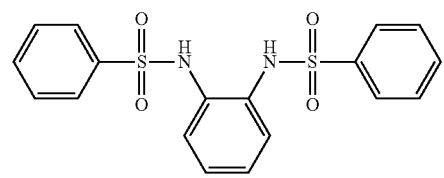
A-36

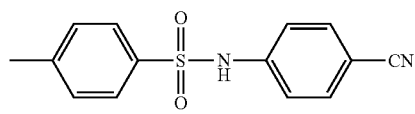
A-37

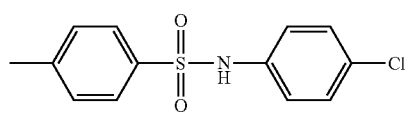
A-38

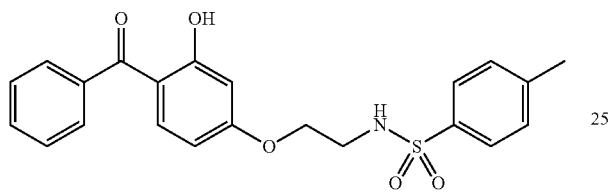
A-39

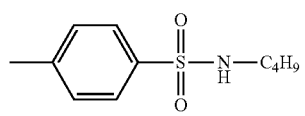
A-40

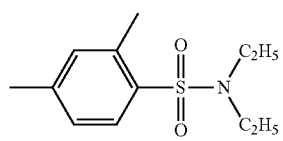
A-41

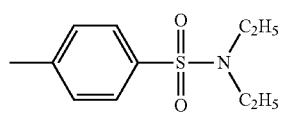
A-42

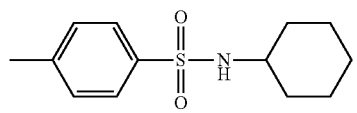
A-43

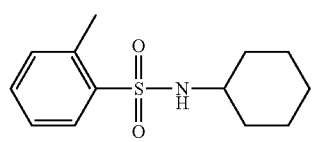
A-44

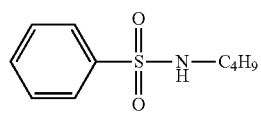
A-45

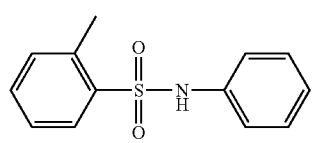
A-46

-continued

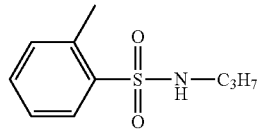
A-47

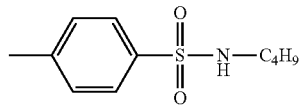
A-48

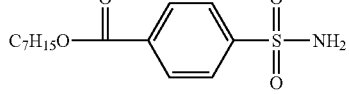
A-49

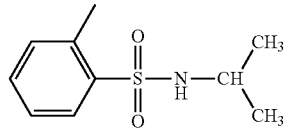
A-50

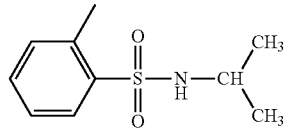
A-51

Formula (2):

In the formula, $R^{31}$ represents an alkyl group or an aryl group, and $R^{32}$ and $R^{33}$ each independently represent a hydrogen atom, an alkyl group, or an aryl group. The alkyl group may have a straight-chained, a branched-chained, or a ring structure. The alkyl group preferably has 1 to 20 carbon atoms, more preferably 1 to 15, and even more preferably 1 to 12. Among cyclic alkyl groups, a cyclohexyl group is particularly preferable. The aryl group preferably has 6 to 36 carbon atoms, more preferably 6 to 24.

The alkyl group or the aryl group mentioned above may have a substituent. As the substituent, a halogen atom (for example, chlorine, bromine, fluorine, iodine, etc.), an alkyl group, an aryl group, an alkoxy group, an aryloxy group, an acyl group, an alkoxycarbonyl group, an aryloxycarbonyl group, an acyloxy group, an sulfonylamino group, a hydroxy group, a cyano group, an amino group, and an acylamino group are preferable; a halogen atom, an alkyl group, an aryl group, an alkoxy group, an aryloxy group, a sulfonylamino group, and an acylamino group are more preferable; and an alkyl group, an aryl group, a sulfonylamino group, and an acylamino group are particularly preferable.

Preferable examples of compounds represented by general formula (2) will be shown below, but the present invention is not limited to these preferable specific examples.

FA-1

-continued
FA-2
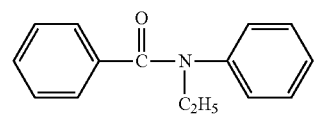
FA-3
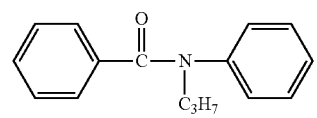
FA-4
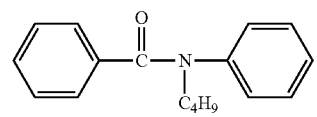
FA-5
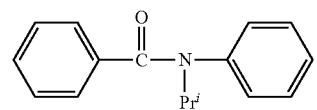
FA-6
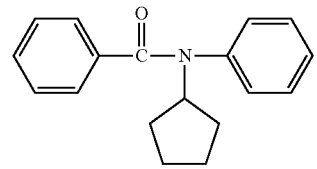
FA-7
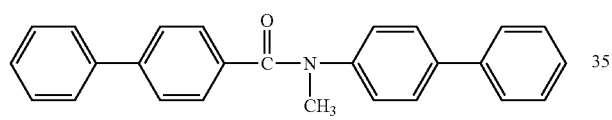
FA-8
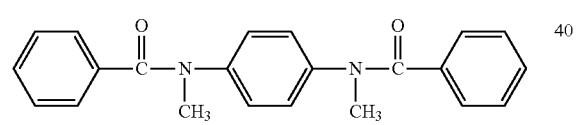
FA-9
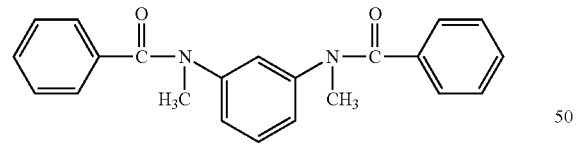
FA-10
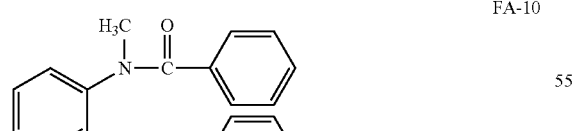
FA-11
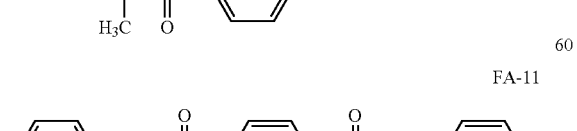
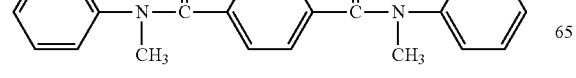
-continued
FA-12
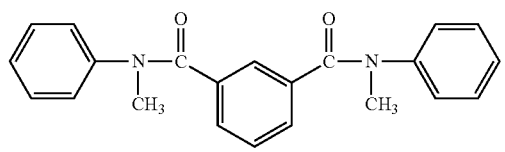
FA-13
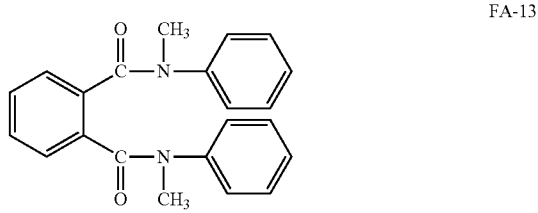
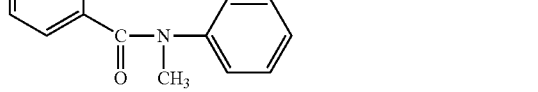
FA-14
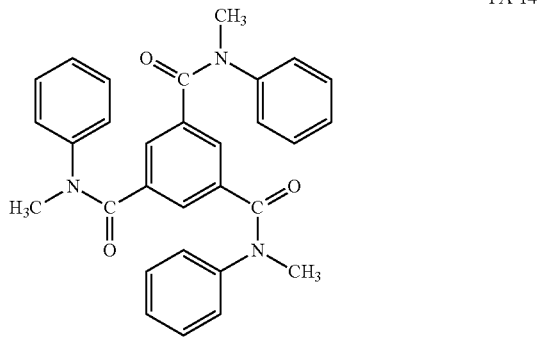
FA-15
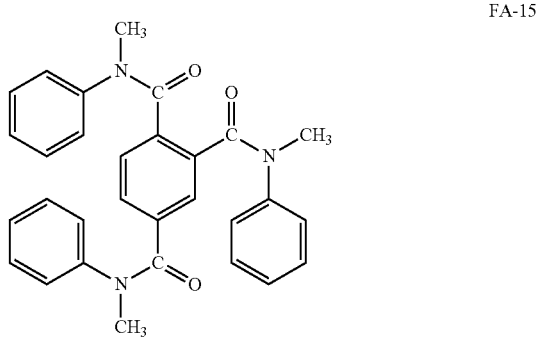
FA-16
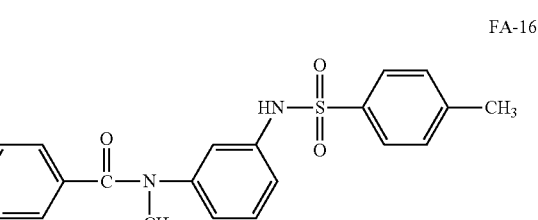
FA-17
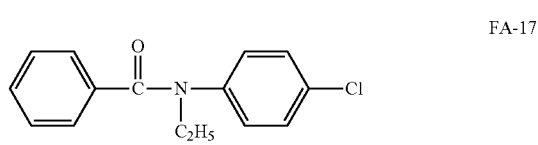
FA-18
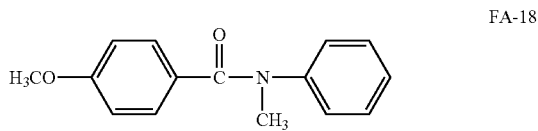

FA-19
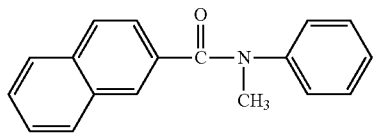
FA-20
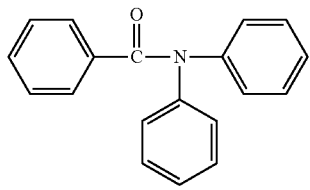
FA-21
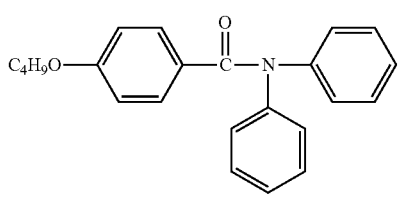
FA-22
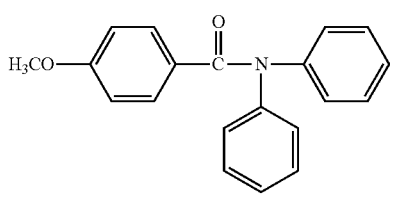
FA-23
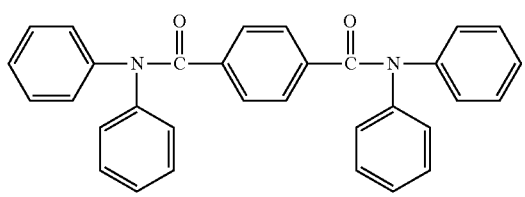
FA-24
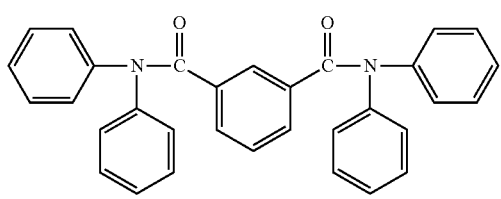
FA-25
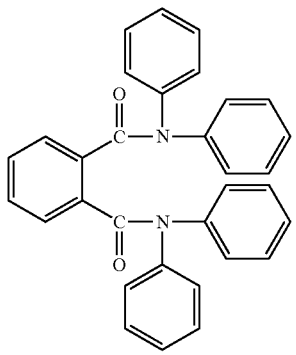
FA-26
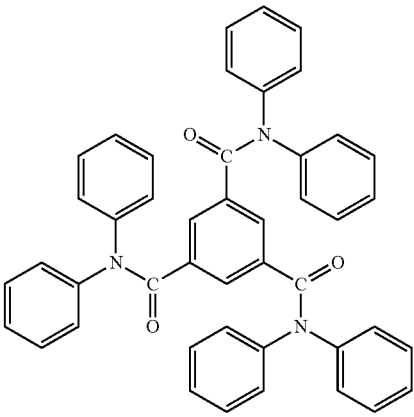
FA-27
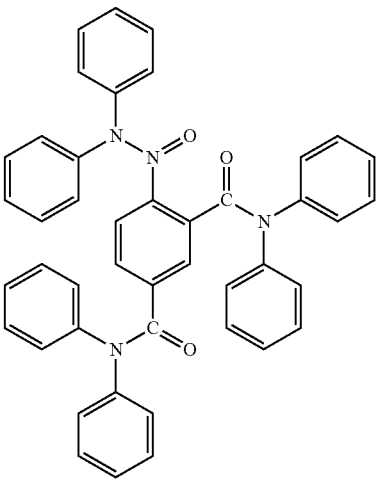
FA-28
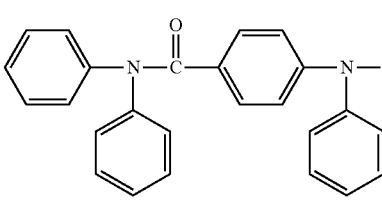
FB-1
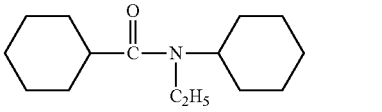
FB-2
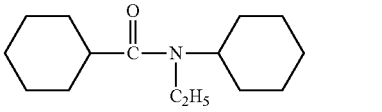
FB-3
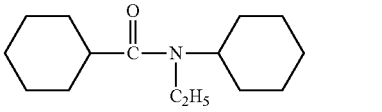
FB-4
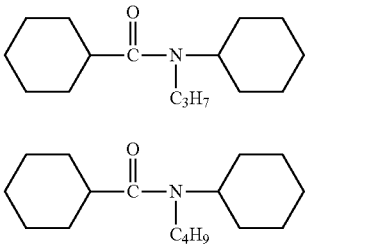

FB-5
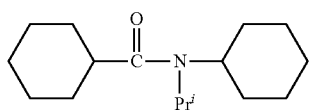
FB-6
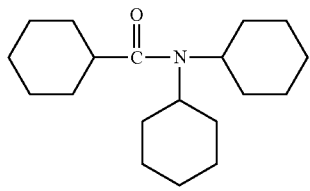
FB-7
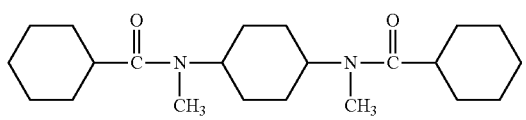
FB-8
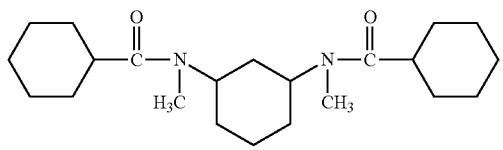
FB-9
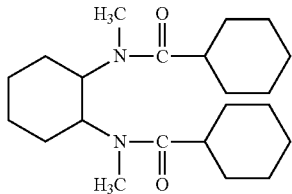
FB-10
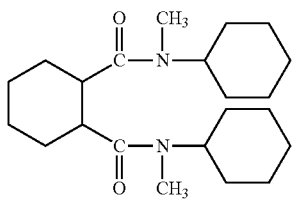
FB-11
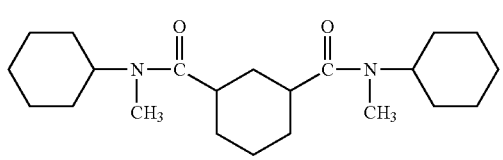
FB-12
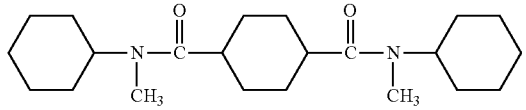
FB-13
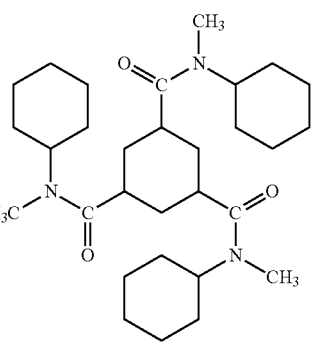
FB-14
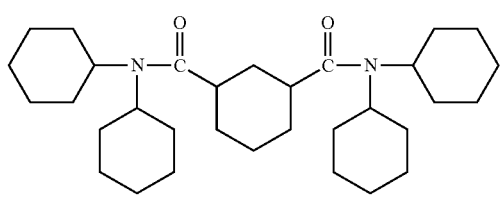
FB-15
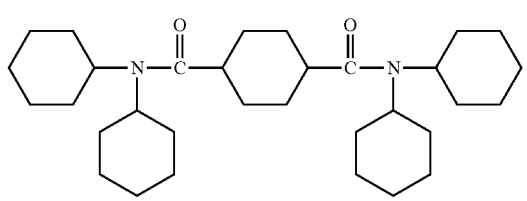
FB-16
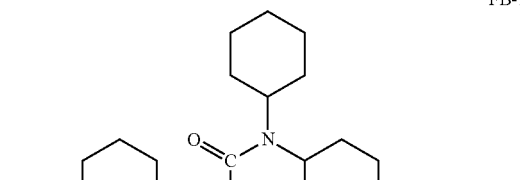
FB-17
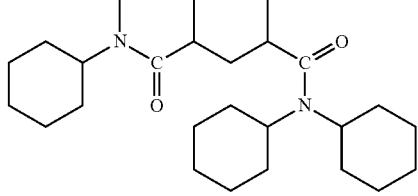
FB-18
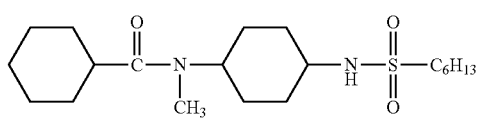
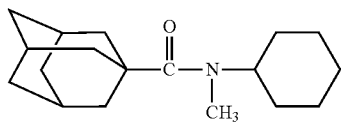
FB-19
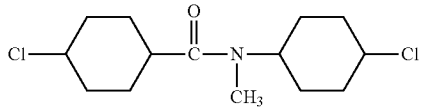

FB-20 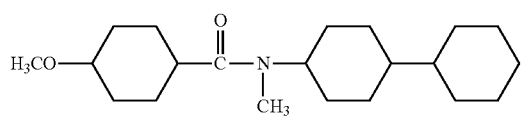
FB-21 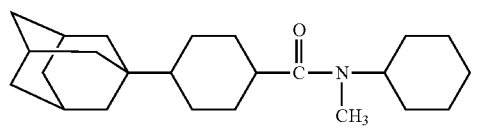
FB-22 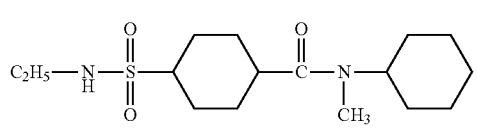
FB-23 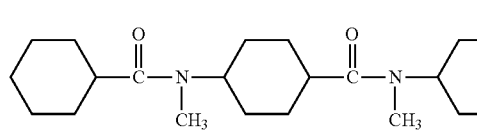
FB-24 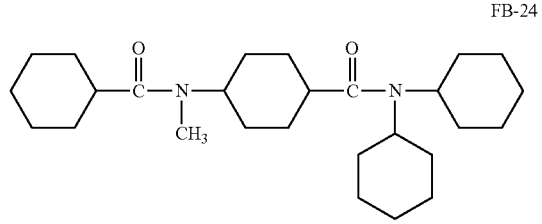
FC-1 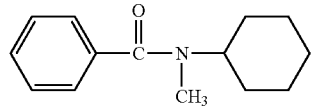
FC-2 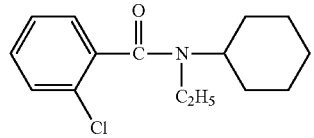
FC-3 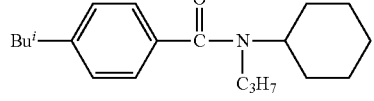
FC-4 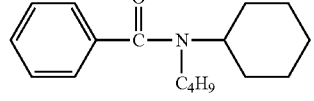
FC-5 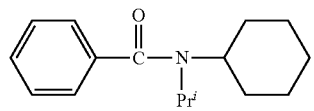
FC-6 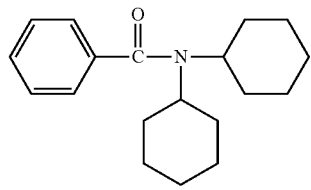
FC-7 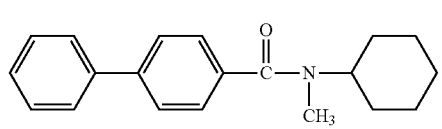
FC-8 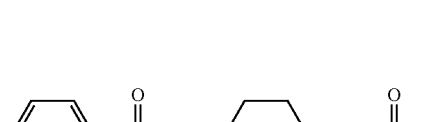
FC-9 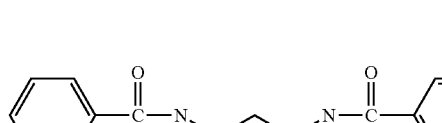
FC-10 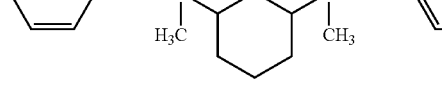
FC-11 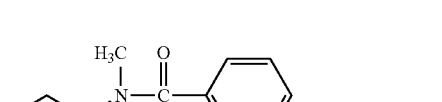
FC-12 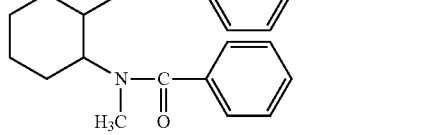
FC-13 

FC-14
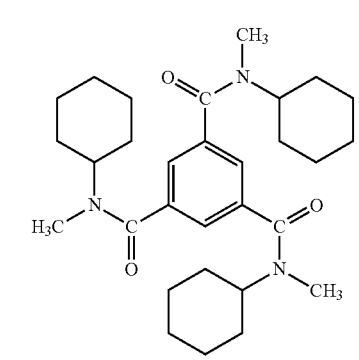
FC-15
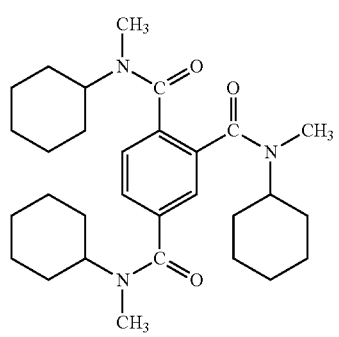
FC-16
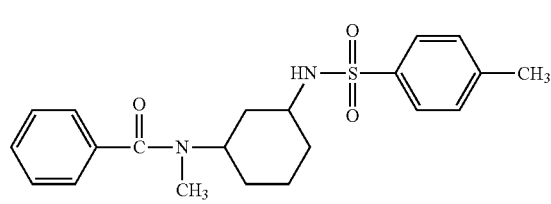
FC-17
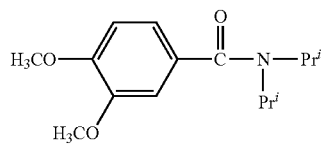
FC-18
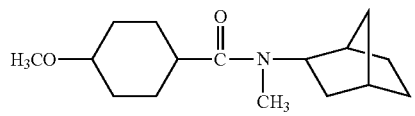
FC-19
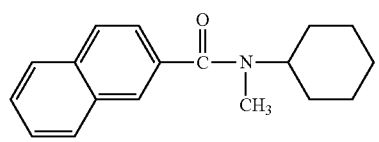
FC-20
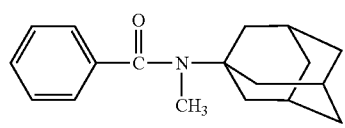
FC-21
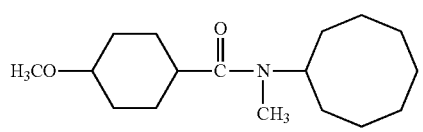
FC-22
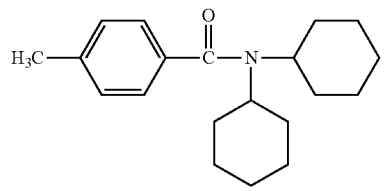
FC-23
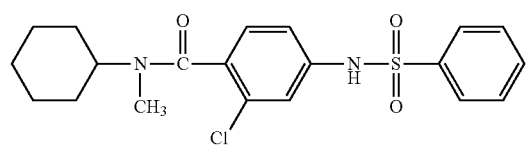
FC-24
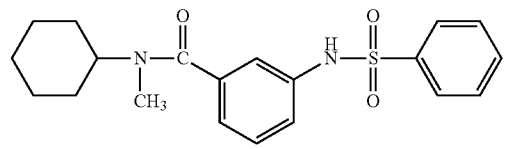
FC-25
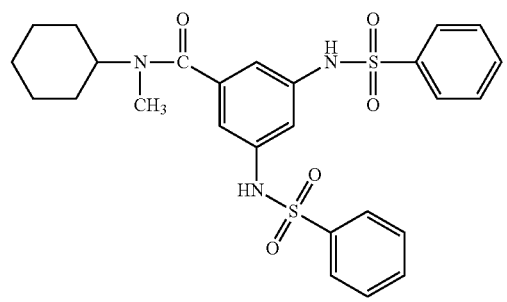
FD-1
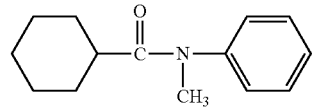
FD-2
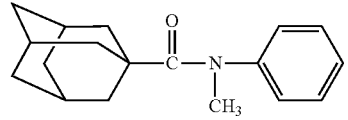
FD-3
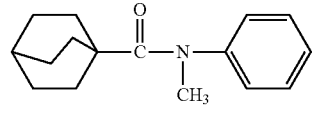
FD-4
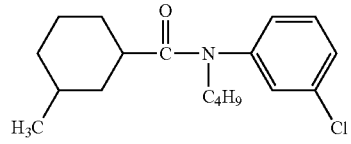
FD-5
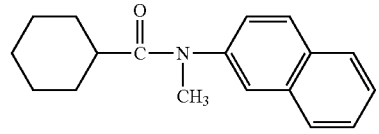

FD-6
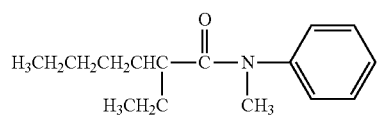
FD-7
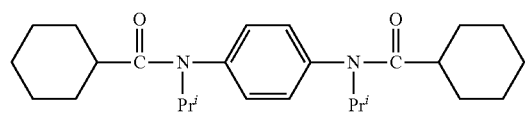
FD-8
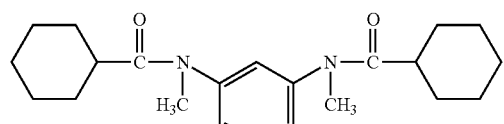
FD-9
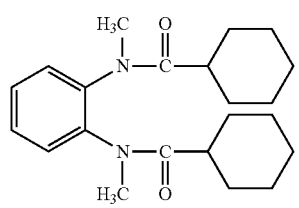
FD-10
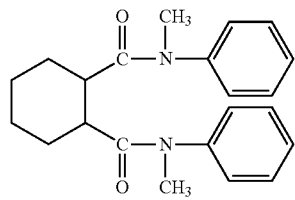
FD-11
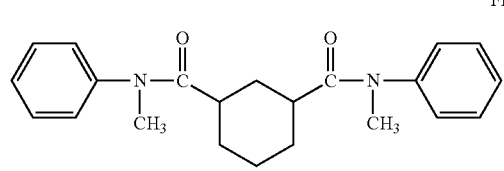
FD-12
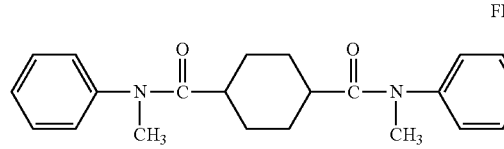
FD-13
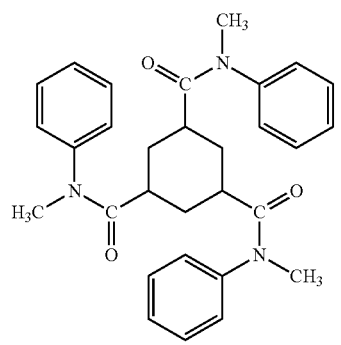
FD-14
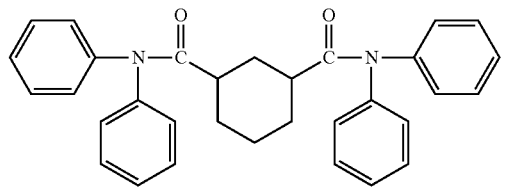
FD-15
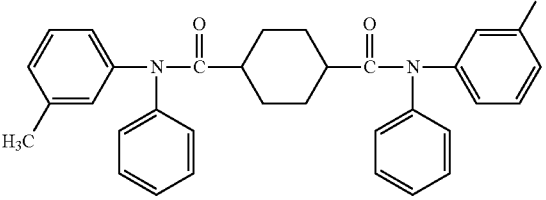
FD-16
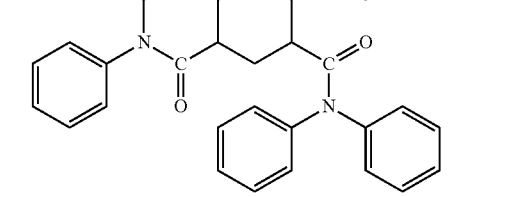
FD-17
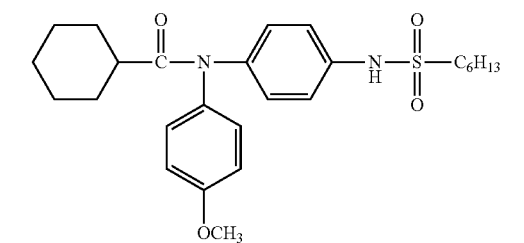
FD-18
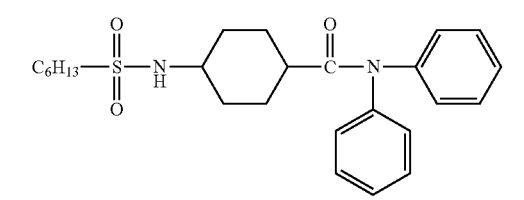
FD-19
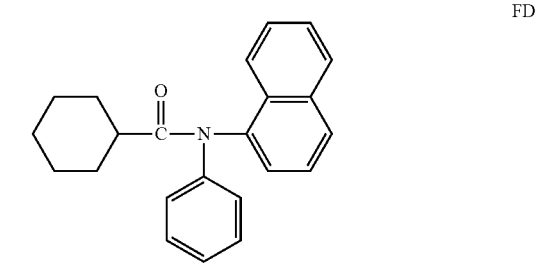

-continued

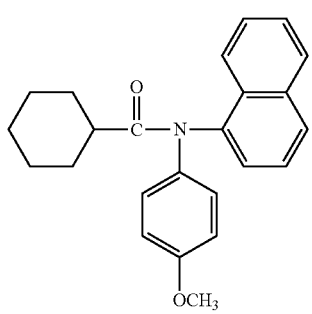
FD-20

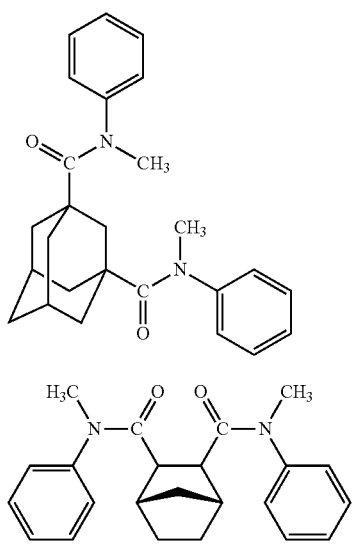
FD-21

FD-22

[Wavelength-Dependent Distribution Adjuster]

Compounds for reducing the wavelength-dependent distribution of the cellulose acylate film (hereinafter, referred to as the "wavelength-dependent distribution adjusters") will be described. In order to improve the wavelength-dependent Rth distribution of the cellulose acylate film of the present invention, it is preferable that at least one type of compound for reducing the wavelength-dependent Rth distribution represented by $\Delta Rth = |Rth_{(400)} - Rth_{(700)}|$ be contained in the range satisfying the following expressions (VI) and (VII), $(\Delta Rth(B) - \Delta Rth(0))/B \leq -2.0$, and (VI)

$0.01 \leq B \leq 30.$ (VII)

Regarding expressions (VI) and (VII) above, it is preferable that:

$(\Delta Rth(B) - \Delta Rth(0))/B \leq -3.0$, and (VI)

$0.01 \leq B \leq 25$; and (VII)

it is more preferable that:

$(\Delta Rth(B) - \Delta Rth(0))/B \leq -4.0$, and (VI)

$0.01 \leq B \leq 20$ (VII)

where,
$Rth_{(400)}$: Rth(nm) at 400 nm;
$Rth_{(700)}$: Rth(nm) at 700 nm;
$\Delta Rth(B)$: $\Delta Rth(nm)$ of the film containing a compound for lowering Rth at B % by mass;
Rth(0): Rth (nm) of the film which does not contain any compound for lowering Rth; and B: the mass (%) of the compound when the mass of the polymer as the material for the film is 100.

The Re and Rth values of a cellulose acylate film generally have wavelength-dependent distribution characteristics in which the Re and Rth values are greater in a longer wavelength range than in a shorter wavelength range. Accordingly, it is required to smooth the wavelength-dependent distribution by increasing Re and Rth on the relatively shorter wavelength side. By contrast, a compound absorbing the light of UV range of 200 to 400 nm has wavelength-dependent distribution characteristics in which light absorption is larger in the longer wavelength range than in the shorter wavelength range. It is assumed that, in the case where such a compound exists isotropically inside the cellulose acylate film, the birefringence of the compound itself, and thus the wavelength-dependent Re and Rth distribution, are greater in the shorter wavelength range like the wavelength-dependent distribution of light absorption.

Therefore, the wavelength-dependent Re and Rth distribution of the cellulose acylate film can be adjusted by using a compound which absorbs light in the UV range of 200 to 400 nm and is assumed to have a greater wavelength-dependent distribution in the shorter wavelength range as described above. In order to achieve this, the compound for adjusting the wavelength-dependent distribution needs to be sufficiently uniformly miscible with cellulose acylate. The UV absorption range of such a compound is preferably 200 to 400 nm, more preferably 220 to 395 nm, and even more preferably 240 to 390 nm.

In recent liquid-crystal display devices for televisions, notebook-size personal computers and mobile display terminals, the optical members are required to have a high transmittance in order that the display devices can have a high brightness at a smaller power. In this point, when a compound having an absorption in a UV region of from 200 to 400 nm and having the ability to reduce |Re(400)−Re(700)| and |Rth(400)−Rth(700)| of cellulose acylate film is added to the film, it is desired that the film with the compound added thereto could have a high spectral transmittance. Preferably, the cellulose acylate film in the invention has a spectral transmittance at a wavelength of 380 nm of from 45% to 95%, and has a spectral transmittance at a wavelength of 350 nm of at most 10%.

From the viewpoint of the vaporization thereof, it is desirable that the wavelength-dependent anisotropy distribution improver preferred for use in the invention such as that mentioned hereinabove has a molecular weight of from 250 to 1000, more preferably from 260 to 800, even more preferably from 270 to 800, still more preferably from 300 to 800. Having a molecular weight that falls within the range, the improver may have a specific monomer structure or may have an oligomer structure or a polymer structure that comprises plural monomer units bonding to each other.

It is desirable that the wavelength-dependent anisotropy distribution improver does not evaporate away during the process of dope-casting and drying in cellulose acylate film formation.

(Amount of Compound to be Added)

It is desirable that the amount of the above-mentioned wavelength-dependent anisotropy distribution improver preferable for use in the invention is from 0.01 to 30% by mass of cellulose acylate, more preferably from 0.1 to 20% by mass, even more preferably from 0.2 to 10% by mass.

(Method of Addition of Compound)

One or more different types of such wavelength-dependent anisotropy distribution improvers may be used herein either singly or as combined.

Regarding its addition, the wavelength-dependent anisotropy distribution improver may be added to the film-forming dope in any stage of dope preparation or in the last step of dope preparation.

Specific examples of the wavelength-dependent anisotropy distribution improver preferred for use in the invention are benzotriazole compounds, benzophenone compounds, cyano group-containing compounds, oxybenzophenone compounds, salicylate compounds and nickel complex salt compounds, to which, however, the invention should not be limited.

Preferred examples of benzotriazole compounds for use as the wavelength-dependent anisotropy distribution improver in the invention are those of the following formula (101):

$Q^1$-$Q^2$-OH wherein $Q^1$ represents a nitrogen-containing aromatic hetero ring; and $Q^2$ represents an aromatic ring.

$Q^1$ is a nitrogen-containing aromatic hetero ring, preferably a 5- to 7-membered nitrogen-containing aromatic hetero ring, more preferably a 5- or 6-membered nitrogen-containing aromatic hetero ring, including, for example, imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene. More preferably, $Q^1$ is a 5-membered nitrogen-containing aromatic hetero ring, concretely including imidazole, pyrazole, triazole, tetrazole, thiazole, oxazole, benzotriazole, benzothiazole, benzoxazole, thiadiazole, oxadiazole, and is especially preferably benzotriazole.

The nitrogen-containing aromatic hetero ring for $Q^1$ is may have a substituent. For the substituent, the substituents T mentioned below are applicable. Plural substituents, if any, may be condensed to form a condensed ring.

The aromatic ring for $Q^2$ may be an aromatic hydrocarbon ring or an aromatic hetero ring. This may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^2$ is preferably an aromatic hydrocarbon ring, more preferably a naphthalene ring or a benzene ring, even more preferably a benzene ring. $Q^2$ may have a substituent. For the substituent, preferred are the substituents T mentioned below.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (101), preferred are those of the following formula (101-A):

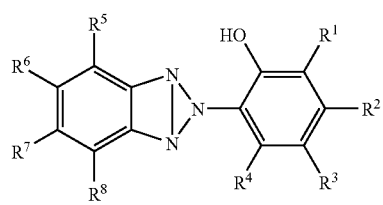

Formula (101-A)

wherein $R^1$, $R^2$, $R^3$, $R^4$, $R^5$, $R^6$, $R^7$ and $R^8$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent. For the substituent, referred to are the substituents T mentioned above. These substituents may have any other substituent. The substituents may be condensed to form a condensed cyclic structure.

$R^1$ and $R^3$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably an alkyl group having from 1 to 12 carbon atoms (preferably having from 4 to 12 carbon atoms).

$R^2$ and $R^4$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 1.2 carbon atoms; still more preferably a hydrogen atom or a methyl group; most preferably a hydrogen atom.

$R^5$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^6$ and $R^7$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom or a halogen atom; still more preferably a hydrogen atom or a chlorine atom.

Of the compounds of formula (101), more preferred are those of the following formula (101-B):

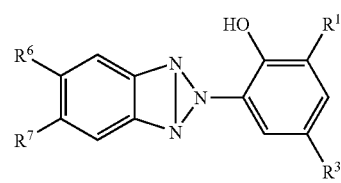

Formula (101-B)

wherein $R^1$, $R^3$, $R^6$ and $R^7$ have the same meanings as those in formula (101-A), and their preferred ranges are also the same as those therein.

Specific examples of the compounds of formula (101) are mentioned below, to which, however, the invention should not be limited.

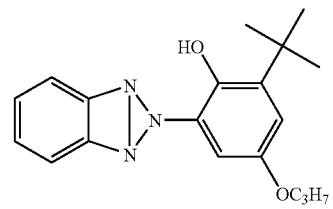

UV-1

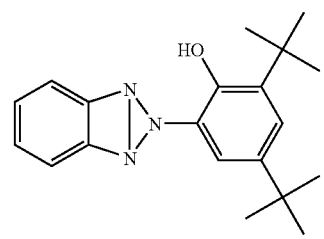

UV-2

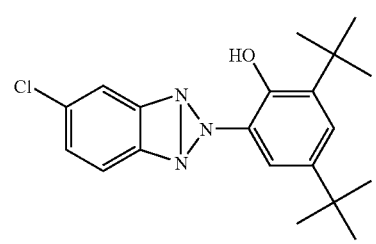

UV-3

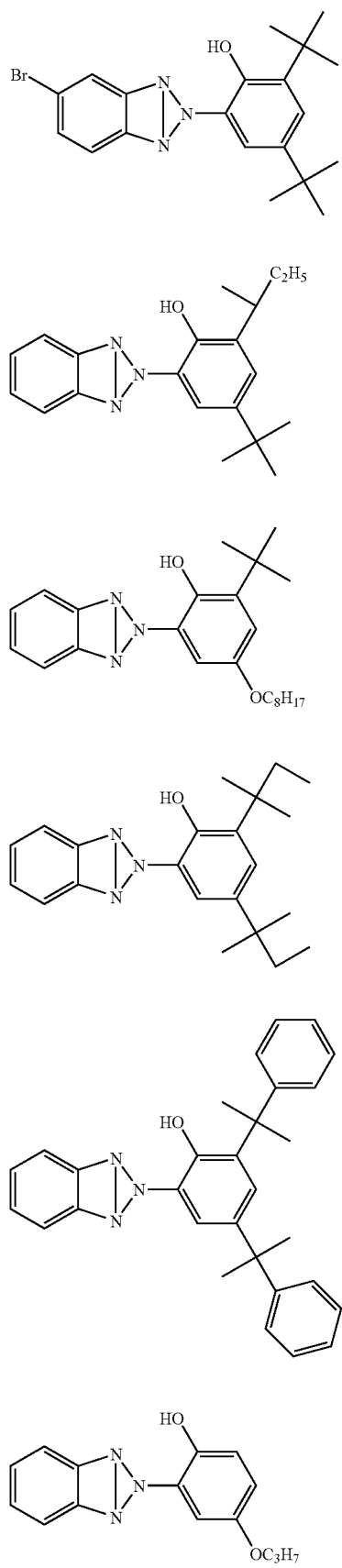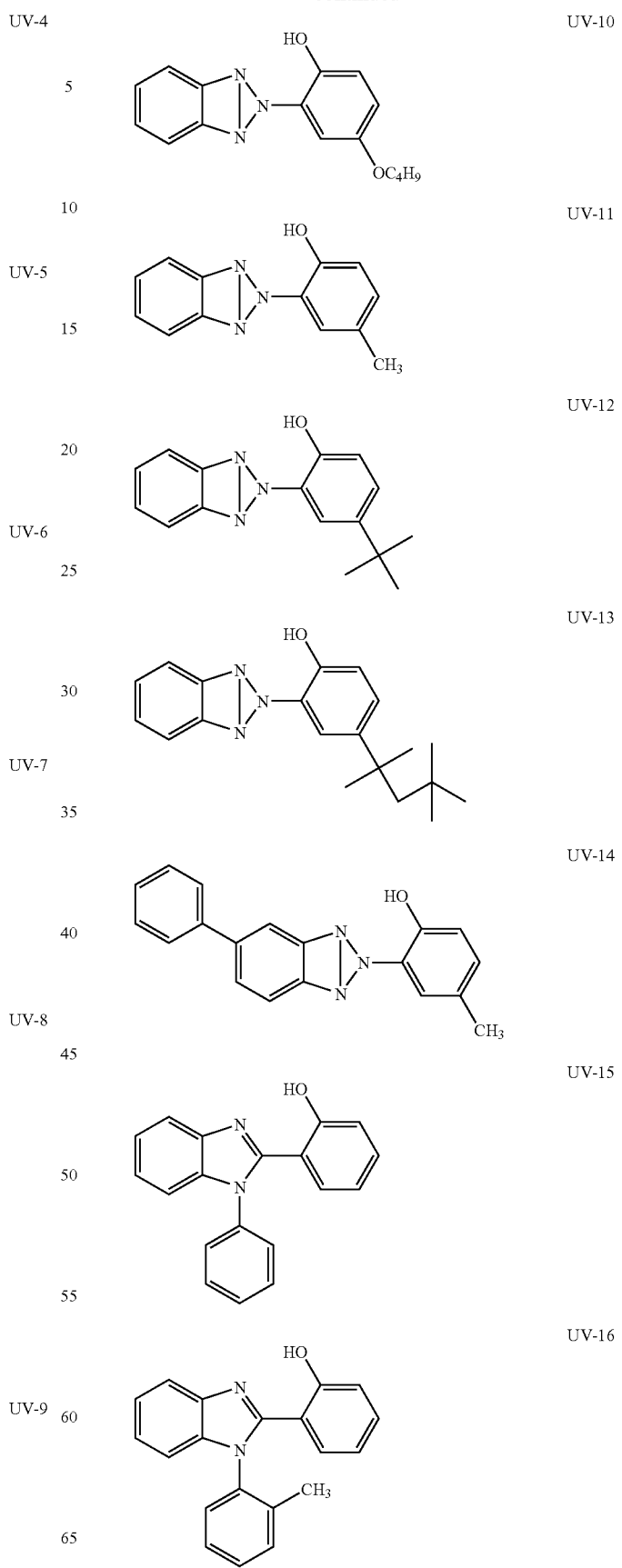

UV-17 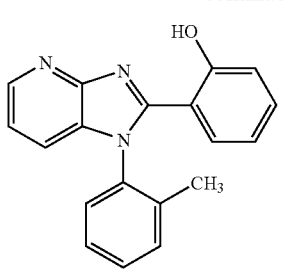

UV-18 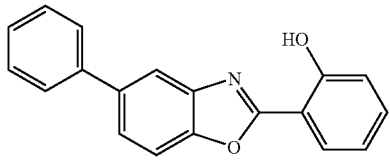

UV-19 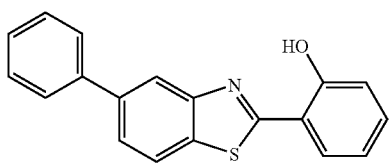

UV-20 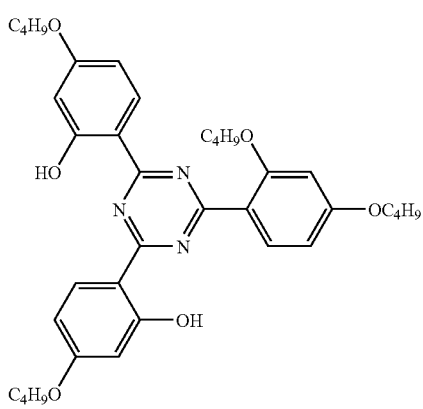

UV-21 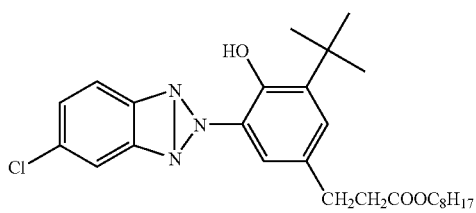

UV-22 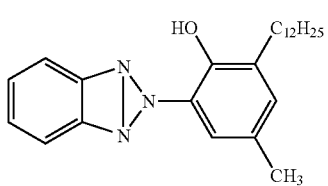

UV-23 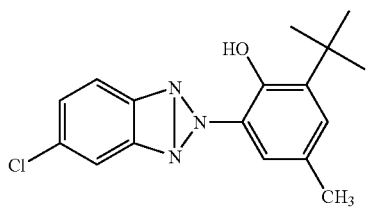

Of the benzotriazole compounds mentioned hereinabove, those having a molecular weight of not smaller than 320 are preferred. We, the present inventors have confirmed that the compounds of the type are advantageous in point of their retentiveness in cellulose acylate films formed with them.

Preferred examples of benzophenone compounds for use as the wavelength-dependent anisotropy distribution improver in the invention are those of the following Formula (102):

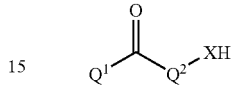

Formula (102)

wherein $Q^1$ and $Q^2$ each independently represents an aromatic ring; X represents NR (where R represents a hydrogen atom or a substituent), an oxygen atom or a sulfur atom.

The aromatic ring for $Q^1$ and $Q^2$ may be an aromatic hydrocarbon ring or an aromatic hetero ring. It may be a single ring or may form a condensed ring with any other ring.

The aromatic hydrocarbon ring for $Q^1$ and $Q^2$ is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero ring for $Q^1$ and $Q^2$ is preferably an aromatic hetero ring that contains at least any one of an oxygen atom, a nitrogen atom or a sulfur atom. Examples of the hetero-ring are furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably an aromatic hydrocarbon ring having from 6 to 10 carbon atoms, still more preferably a substituted or unsubstituted benzene ring.

$Q^1$ and $Q^2$ may have a substituent, for which preferred are the substituents T mentioned below. However, the substituent does not include a carboxylic acid, a sulfonic acid and a quaternary ammonium salt. If possible, the substituents may bond to each other to form a cyclic structure.

X represents NR (where R represents a hydrogen atom or a substituent, and for the substituent, referred to are the substituents T mentioned below), an oxygen atom or a sulfur atom. X is preferably NR (where R is preferably an acyl group or a sulfonyl group which may be substituted), or O, more preferably O.

The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

Of the compounds of formula (102), preferred are those of the following formula (102-A):

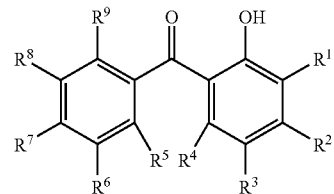

Formula (102-A)

wherein $R^1$, $R^2$, $R^3$, $R^4$, $R^5$, $R^6$, $R^7$, $R^8$ and $R^9$ each independently represents a hydrogen atom or a substituent.

$R^1$, $R^2$, $R^3$, $R^4$, $R^5$, $R^6$, $R^7$, $R^8$ and $R^9$ each independently represents a hydrogen atom or a substituent. For the substituent, referred to are the substituents T mentioned above. These substituents may have any other substituent. The substituents may be condensed to form a condensed cyclic structure.

$R^1$, $R^3$, $R^4$, $R^5$, $R^6$, $R^8$ and $R^9$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably an alkoxy group having from 1 to 20 carbon atoms; still more preferably an alkoxy group having from 1 to 12 carbon atoms.

$R^7$ is preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 20 carbon atoms (preferably having from 1 to 12 carbon atoms, more preferably having from 1 to 8 carbon atoms, still more preferably a methyl group); especially preferably a methyl group or a hydrogen atom.

Of the compounds of formula (102), more preferred are those of the following formula (102-B):

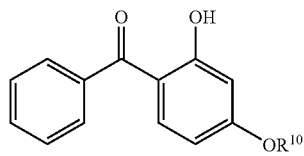

Formula (102-B)

wherein $R^{10}$ represents a hydrogen atom, a substituted or unsubstituted alkyl group, a substituted or unsubstituted alkenyl group, a substituted or unsubstituted alkynyl group, or a substituted or unsubstituted aryl group.

$R^{10}$ is a hydrogen atom, a substituted or unsubstituted alkyl group, a substituted or unsubstituted alkenyl group, a substituted or unsubstituted alkynyl group, or a substituted or unsubstituted aryl group. For the substituent, referred to are the substituents T mentioned above.

$R^{10}$ is preferably a substituted or unsubstituted alkyl group, more preferably a substituted or unsubstituted alkyl group having from 5 to 20 carbon atoms, even more preferably a substituted or unsubstituted alkyl group having from 5 to 12 carbon atoms (e.g., n-hexyl group, 2-ethylhexyl group, n-octyl group, n-decyl group, n-dodecyl group, benzyl group), still more preferably a substituted or unsubstituted alkyl group having from 6 to 12 carbon atoms (e.g., 2-ethylhexyl group, n-octyl group, n-decyl group, n-dodecyl group, benzyl group).

The compounds of formula (102) may be produced according to a known method such as that described in JP-A 11-12219.

Specific examples of the compounds of formula (102) are mentioned below, to which, however, the invention should not be limited.

UV-101
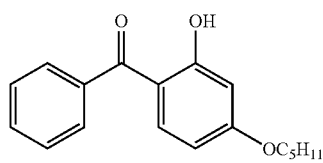

UV-102
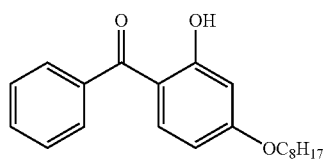

UV-103
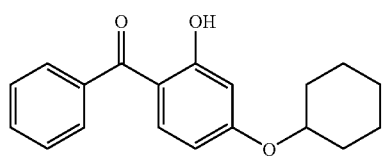

UV-104
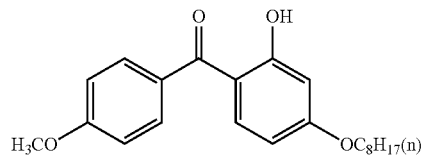

UV-105
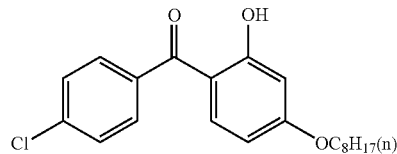

UV-106
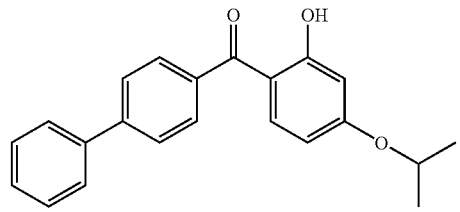

UV-107
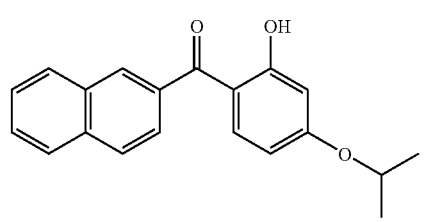

UV-108
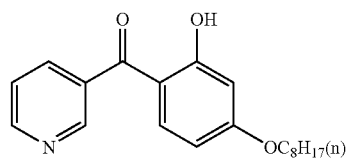

UV-109
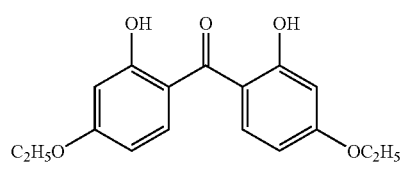

UV-110
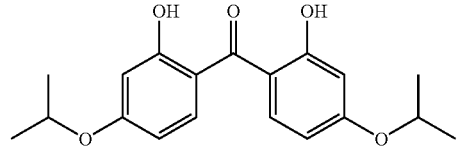

UV-111
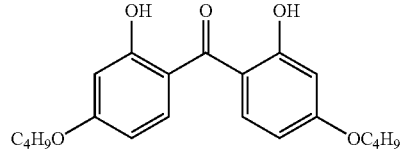

UV-112
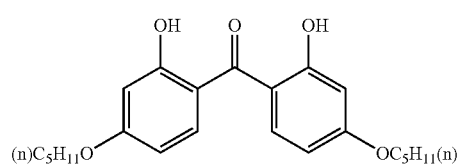

-continued

UV-113
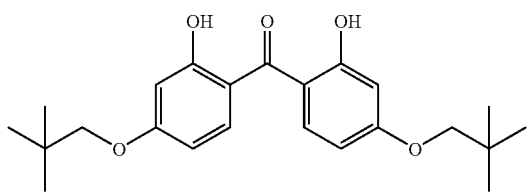

UV-114
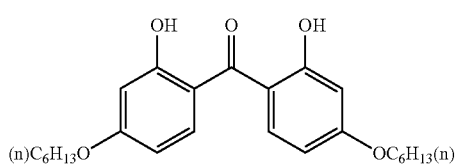

UV-115
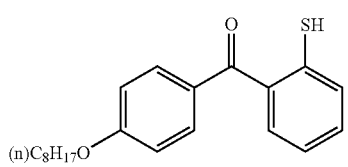

UV-116
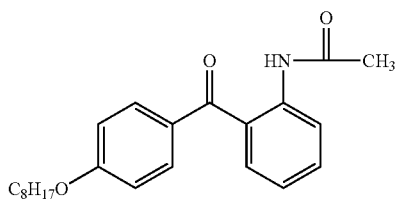

UV-117
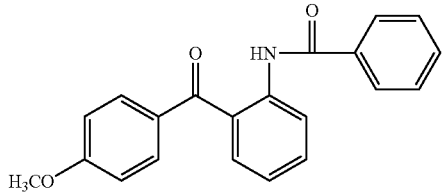

UV-118
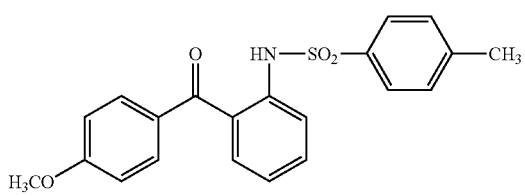

UV-119
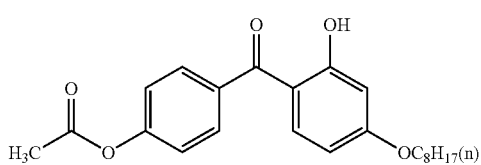

UV-120
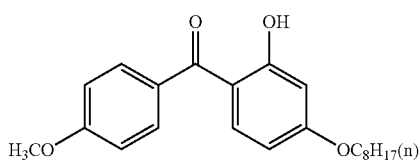

-continued

UV-121
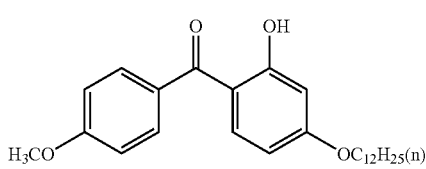

Preferred examples of cyano group-containing compounds for use as the wavelength-dependent anisotropy distribution improver in the invention are those of the following Formula (103):

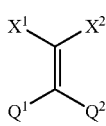

Formula (103)

wherein $Q^1$ and $Q^2$ each independently represents an aromatic ring; $X^1$ and $X^2$ each independently represents a hydrogen atom or a substituent, and at least one of these is a cyano group, a carboxyl group, a sulfo group, or an aromatic heterocyclic group.

The aromatic ring for $Q^1$ and $Q^2$ may be an aromatic hydrocarbon ring or an aromatic hetero ring, and it may be a single ring or may form a condensed ring with any other ring.

The aromatic hydrocarbon ring is preferably a monocyclic or bicyclic aromatic hydrocarbon ring having from 6 to 30 carbon atoms (e.g., benzene ring, naphthalene ring), more preferably an aromatic hydrocarbon ring having from 6 to 20 carbon atoms, even more preferably from 6 to 12 carbon atoms. Still more preferably, it is a benzene ring.

The aromatic hetero-ring is preferably one that contains a nitrogen atom or a sulfur atom as a hetero atom. Examples of the hetero-ring are thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene. The aromatic hetero-ring is preferably pyridine, triazine or quinoline.

The aromatic ring for $Q^1$ and $Q^2$ is preferably an aromatic hydrocarbon ring, more preferably a benzene ring.

$Q^1$ and $Q^2$ may have a substituent, for which referred to are the substituents T mentioned below. The substituents T include, for example, an alkyl group (preferably having from 1 to 20 carbon atoms, more preferably from 1 to 12 carbon atoms, even more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, even more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, even more preferably from 2 to 8 carbon atoms, e.g., propargyl, 3-pentynyl), an aryl group (preferably having from 6 to 30 carbon atoms, more preferably from 6 to 20 carbon atoms, even more preferably from 6 to 12 carbon atoms, e.g., phenyl, p-methylphenyl, naphthyl), a substituted or unsubstituted amino group (preferably having from 0 to 20 carbon atoms, more preferably from 0 to 10 carbon atoms, even more preferably from 0 to 6 carbon atoms, e.g., amino, methylamino, dimethylamino, diethylamino, dibenzylamino), an alkoxy group (preferably having from 1 to 20 carbon atoms, more preferably from 1 to 12 carbon atoms, even more preferably from 1 to 8 carbon atoms, e.g., methoxy, ethoxy, butoxy), an aryloxy group (preferably having from 6 to 20 carbon atoms, more preferably from 6 to 16 carbon atoms, even more preferably from 6 to 12 carbon atoms, e.g., phenyloxy, 2-naphthyloxy), an acyl group (preferably having from 1 to 20 carbon atoms, more preferably from 1 to 16 carbon atoms, even more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, even more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, even more preferably from 7 to 10 carbon atoms, e.g., phenyloxycarbonyl), an acyloxy group (preferably having from 2 to 20 carbon atoms, more preferably from 2 to 16 carbon atoms, even more preferably from 2 to 10 carbon atoms, e.g., acetoxy, benzoyloxy), an acylamino group (preferably having from 2 to 20 carbon atoms, more preferably from 2 to 16 carbon atoms, even more preferably from 2 to 10 carbon atoms, e.g., acetylamino, benzoylamino), an alkoxycarbonylamino group (preferably having from 2 to 20 carbon atoms, more preferably from 2 to 16 carbon atoms, even more preferably from 2 to 12 carbon atoms, e.g., methoxycarbonylamino), an aryloxycarbonylamino group (preferably having from 7 to 20 carbon atoms, more preferably from 7 to 16 carbon atoms, even more preferably from 7 to 12 carbon atoms, e.g., phenyloxycarbonylamino), a sulfonylamino group (preferably having from 1 to 20 carbon atoms, more preferably from 1 to 16 carbon atoms, even more preferably from 1 to 12 carbon atoms, e.g., methanesulfonylamino, benzenesulfonylamino), a sulfamoyl group (preferably having from 0 to 20 carbon atoms, more preferably from 0 to 16 carbon atoms, even more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, even more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, even more preferably from 1 to 12 carbon atoms, e.g., methylthio, ethylthio), an arylthio group (preferably having from 6 to 20 carbon atoms, more preferably from 6 to 16 carbon atoms, even more preferably from 6 to 12 carbon atoms, e.g., phenylthio), a sulfonyl group (preferably having from 1 to 20 carbon atoms, more preferably from 1 to 16 carbon atoms, even more preferably from 1 to 12 carbon atoms, e.g., mesyl, tosyl), a sulfinyl group (preferably having from 1 to 20 carbon atoms, more preferably from 1 to 16 carbon atoms, even more preferably from 1 to 12 carbon atoms, e.g., methanesulfinyl, benzenesulfinyl), an ureido group preferably having from 1 to 20 carbon atoms, more preferably from 1 to 16 carbon atoms, even more preferably from 1 to 12 carbon atoms, e.g., ureido, methylureido, phenylureido), a phosphoramido group (preferably having from 1 to 20 carbon atoms, more preferably from 1 to 16 carbon atoms, even more preferably from 1 to 12 carbon atoms, e.g., diethylphosphoramido, phenylphosphoramido), a hydroxyl group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, in which the hetero atom is any of nitrogen atom, oxygen atom or sulfur atom., e.g., imidazolyl, pyridyl, quinolyl, furyl, piperidyl, morpholino, benzoxazolyl, benzimidazolyl, benzothiazolyl), a silyl group (preferably having from 3 to 40 carbon atoms, more preferably from 3 to 30 carbon atoms, even more preferably from 3 to 24 carbon atoms, e.g., trimethylsilyl, triphenylsilyl). These substituents may be further substituted. Two or more substituents, if any, may be the same or different. If possible, they may bond to each other to form a ring.

$X^1$ and $X^2$ each are a hydrogen atom or a substituent, and at least one of these is a cyano group, a carboxy group, a sulfo group, or an aromatic heterocyclic group. For the substituent for $X^1$ and $X^2$, referred to are the substituents T mentioned above. The substituent for $X^1$ and $X^2$ may be substituted with any other substituent, and $X^1$ and $X^2$ may be condensed to form a cyclic structure.

$X^1$ and $X^2$ are preferably a hydrogen atom, an aryl group, a cyano group, a nitro group, a carbonyl group, a sulfonyl group or an aromatic hetero ring; more preferably a cyano group, a carbonyl group, a sulfonyl group or an aromatic hetero ring; even more preferably a cyano group or a carbonyl group; still more preferably a cyano group, or an alkoxycarbonyl group (—C(=O)OR where R represents an alkyl group having from 1 to 20 carbon atoms, an aryl group having from 6 to 12 carbon atoms or their combination).

Of the compounds of formula (103), preferred are those of the following formula (103-A):

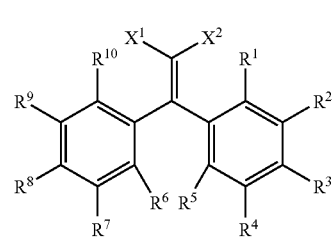

Formula (103-A)

wherein $R^1$, $R^2$, $R^3$, $R^4$, $R^5$, $R^6$, $R^7$, $R^8$, $R^9$ and $R^{10}$ each independently represents a hydrogen atom or a substituent; $X^1$ and $X^2$ have the same meanings as those in formula (103), and their preferred ranges are also the same as those therein.

$R^1$, $R^2$, $R^3$, $R^4$, $R^5$, $R^6$, $R^7$, $R^8$, $R^9$ and $R^{10}$ each independently represents a hydrogen atom or a substituent. For the substituent, referred to are the substituents T mentioned above. These substituents may have any other substituent. The substituents may be condensed to form a condensed cyclic structure.

$R^1$, $R^2$, $R^4$, $R^5$, $R^6$, $R^7$, $R^9$ and $R^{10}$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group, an aryl group, an alkyloxy group, an aryloxy group or a halogen atom; even more preferably a hydrogen atom, or an alkyl group having from 1 to 12 carbon atoms; still more preferably a hydrogen atom or a methyl group; most preferably a hydrogen atom.

$R^3$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group or a halogen atom; more preferably a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms, or a hydroxyl group; even more preferably a hydrogen atom, or an alkoxy group having from 1 to 12 carbon atoms; still more preferably an alkoxy group having from 1 to 12 carbon atoms; further preferably a hydrogen atom.

Of the compounds of formula (103), more preferred are those of the following formula (103-B):

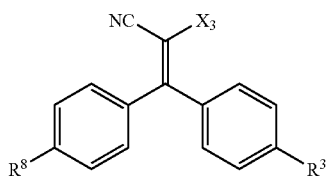

Formula (103-B)

wherein $R^3$ and $R^8$ have the same meanings as those in formula (103-A), and their preferred ranges are also the same as therein; $X^3$ represents a hydrogen atom or a substituent.

$X^3$ represents a hydrogen atom or a substituent. For the substituent, referred to are the substituents T mentioned above. If possible, the substituent may be further substituted with any other substituent. $X^3$ is preferably a hydrogen atom, an alkyl group, an aryl group, a cyano group, a nitro group, a carbonyl group a sulfonyl group or an aromatic hetero ring; more preferably a cyano group, a carbonyl group, a sulfonyl group or an aromatic hetero ring; even more preferably a cyano group or a carbonyl group; still more preferably a cyano group or an alkoxycarbonyl group (—C(=O)OR where R is an alkyl group having from 1 to 20 carbon atoms, an aryl group having from 6 to 12 carbon atoms or their combination).

Of the compounds of formula (103), even more preferred are those of the following formula (103-C):

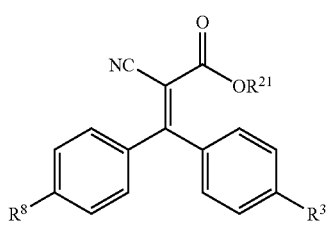

Formula (103-C)

wherein $R^3$ and $R^8$ have the same meanings as those in formula (103-A), and their preferred ranges are also the same as therein; $R^{21}$ represents an alkyl group having from 1 to 20 carbon atoms.

When $R^3$ and $R^8$ are both hydrogen atoms, then $R^{21}$ is preferably an alkyl group having from 2 to 12 carbon atoms, more preferably an alkyl group having from 4 to 12 carbon atoms, even more preferably an alkyl group having from 6 to 12 carbon atoms, still more preferably an n-octyl group, a tert-octyl group, a 2-ethylhexyl group, an n-decyl group or an n-dodecyl group; most preferably a 2-ethylhexyl group.

When $R^3$ and $R^8$ are not hydrogen atoms, then $R^{21}$ is preferably an alkyl group having at most 20 carbon atoms with which the molecular weight of the compound of formula (103-C) could be at least 300.

The compounds of formula (103) for use in the invention can be produced according to the method described in *Journal of American Chemical*, Vol. 63, p. 3452 (1941).

Specific examples of the compounds of formula (103) are mentioned below, to which, however, the invention should not be limited.

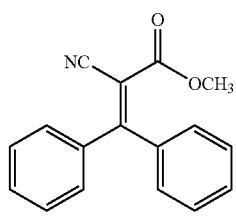

UV-201

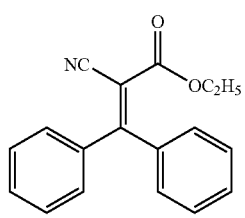

UV-202

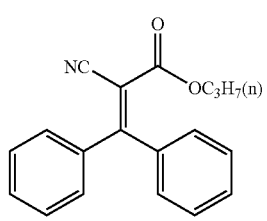

UV-203

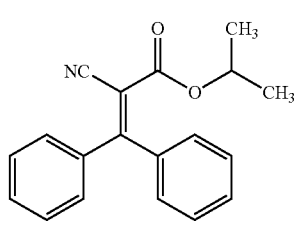

UV-204

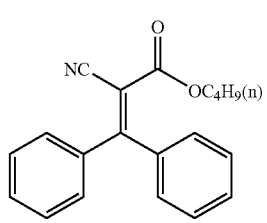

UV-205

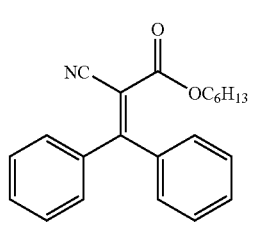

UV-206

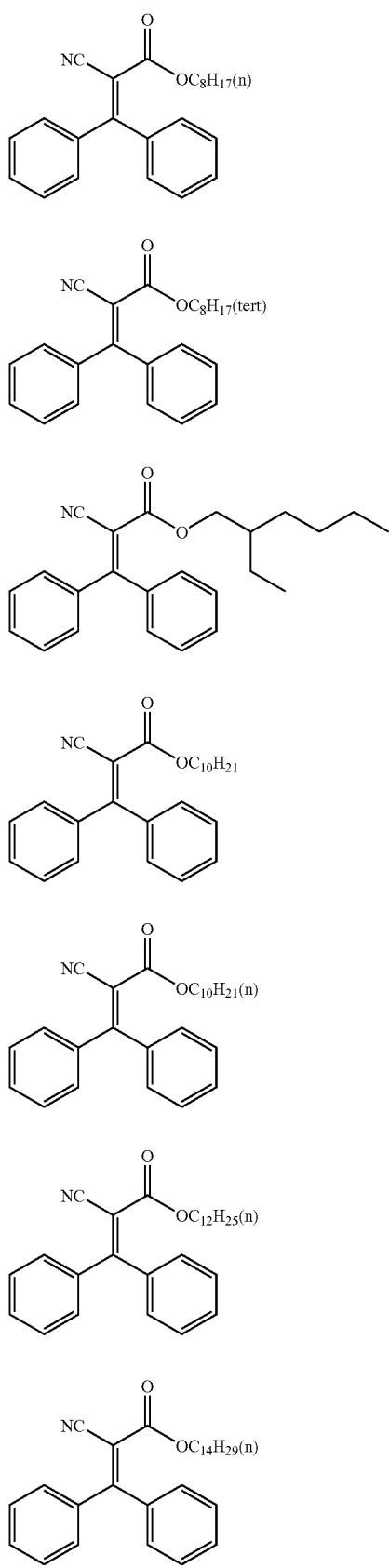
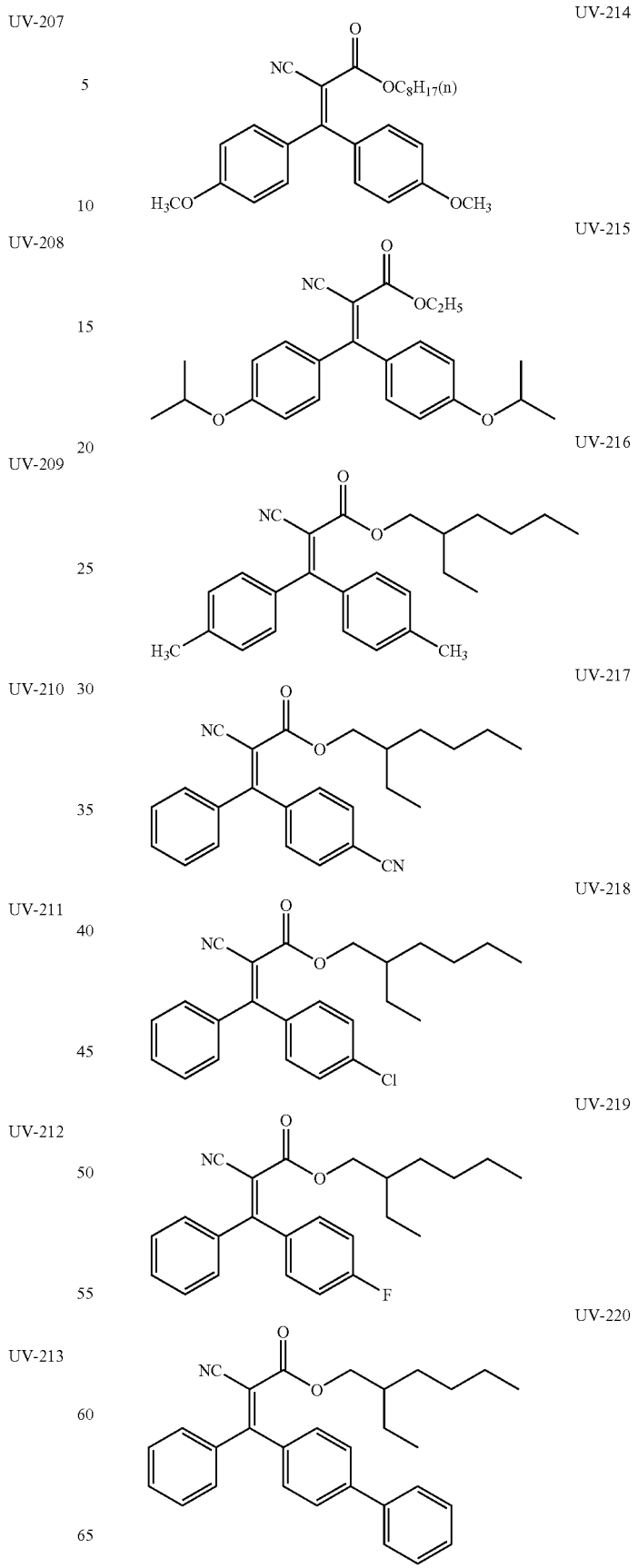

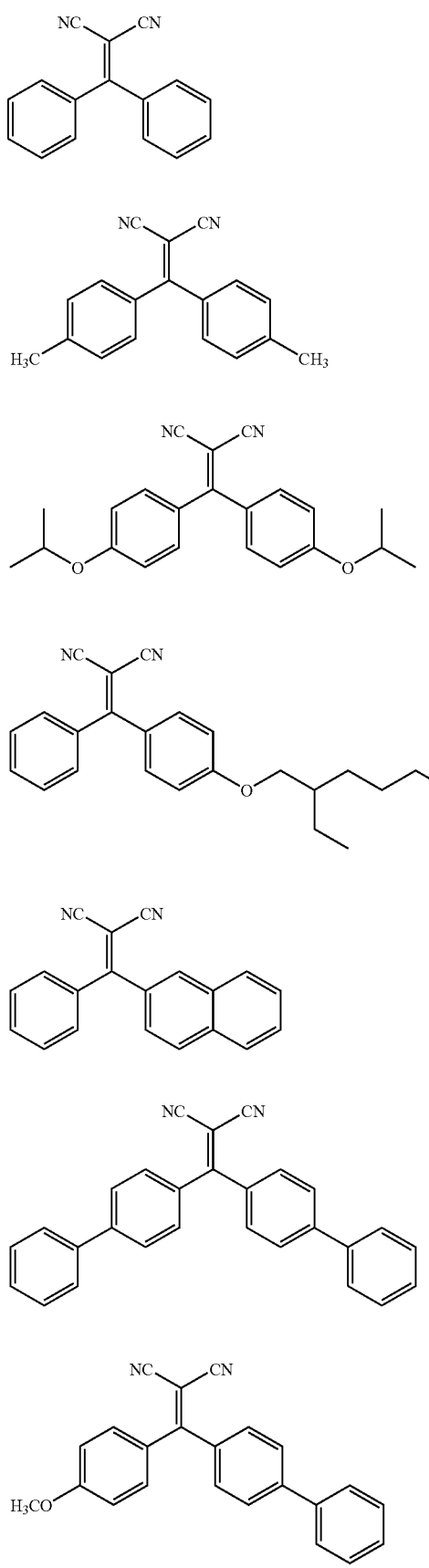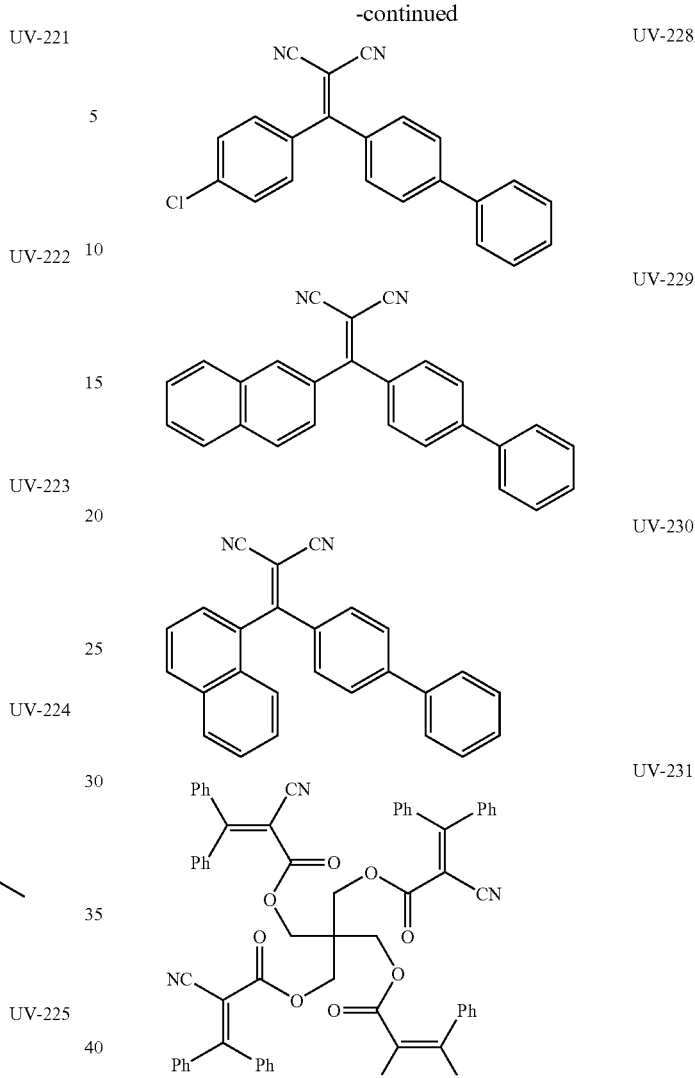

[Mat Agent Particles]

The cellulose acylate film in the invention preferably contains particles serving as a mat agent. The particles for use herein include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate and calcium phosphate. The particles are preferably silicon-having ones as the haze of the films containing them may be low. Especially preferred is silicon dioxide. Particles of silicon dioxide for use herein preferably have a primary mean particle size of at most 20 nm and have an apparent specific gravity of at least 70 g/liter. More preferred are particles having a small primary mean particle size of from 5 to 16 nm, since the haze of the films containing them is lower. The apparent specific gravity is more preferably from 90 to 200 g/liter, even more preferably from 100 to 200 g/liter. Particles having a larger apparent specific gravity may give a dispersion having a higher concentration, and are therefore preferable since the haze of the films containing them could be lower and since the solid deposits in the film may be reduced.

The particles generally form secondary particles having a mean particle size of from 0.1 to 3.0 μm, and in the film, they exist as aggregates of primary particles, therefore forming protrusions having a size of from 0.1 to 3.0 µm in the film surface. Preferably, the secondary mean particle size is from 0.2 µm to 1.5 µm, more preferably from 0.4 µm to 1.2 µm, most preferably from 0.6 µm to 1.1 µm. The primary and secondary particle sizes are determined as follows: The particles in a film are observed with a scanning electromicroscope, and the diameter of the circle that is circumscribed around the particle is referred to as the particle size. 200 particles are observed at random in different sites, and their data are averaged to give the mean particle size thereof.

For silicon dioxide particles, herein usable are commercial products of Aerosil R972, R972V, R974, R812, 200, 200V, 300, R202, OX50, TT600 (all by Nippon Aerosil). Zirconium oxide particles are also commercially available, for example, as Aerosil R976 and R811 (both by Nippon Aerosil), and are usable herein.

Of those, Aerosil 200V and Aerosil R972V are silicon dioxide particles having a primary mean particle size of at most 20 nm and having an apparent specific gravity of at least 70 g/liter, and these are especially preferred for use herein since they are effective for reducing the friction coefficient of optical films not increasing the haze thereof.

In the invention, for obtaining a cellulose acylate film that contains particles having a small secondary mean particle size, there may be employed some methods for preparing a dispersion of particles. For example, one method for it comprises previously preparing a dispersion of particles by stirring and mixing a solvent and particles, then adding the resulting dispersion to a small amount of a cellulose acylate solution separately prepared, and thereafter further mixing it with a main cellulose acylate dope. This method is desirable since the dispersibility of silicon dioxide particles is good and since the dispersion of silicon dioxide particles prepared hardly reaggregates. Apart from it, also employable herein is a method comprising adding a small amount of a cellulose ester to a solvent, dissolving them with stirring, and fully mixing the resulting dispersion of particles with a dope in an in-line mixer. The invention should not be limited to these methods. When silicon dioxide particles are mixed and dispersed in a solvent, the silicon dioxide concentration in the resulting dispersion is preferably from 5 to 30% by mass, more preferably from 10 to 25% by mass, most preferably from 15 to 20% by mass. Relative to the amount of the particles therein, the dispersion having a higher concentration may have a smaller haze, and is therefore favorable since the haze of the films with it may be lowered and the solid deposits may be reduced in the films. Finally, the amount of the mat agent to be in the cellulose acylate dope is preferably from 0.01 to 1.0 g/m$^2$, more preferably from 0.03 to 0.3 g/m$^2$, most preferably from 0.08 to 0.16 g/m$^2$.

The solvent may be a lower alcohol, preferably methyl alcohol, ethyl alcohol, propyl alcohol, isopropyl alcohol or butyl alcohol. The solvent usable herein except such lower alcohols is not specifically defined, for which, however, preferred are those generally used in cellulose ester film formation.

[Plasticizer, Antideteriorant, Release Agent]

In addition to the optical anisotropy-lowering compound and the wavelength-dependent anisotropy dispersion improver mentioned above, the cellulose acylate film of the invention may contain various additives (e.g., plasticizer, UV inhibitor, antideteriorant, release agent, IR absorbent) added thereto in the process of producing it and in accordance with the use of the film. The additives may be solid or oily. In other words, they are not specifically defined in point of their melting point and boiling point. For example, UV-absorbing materials may be mixed at 20° C. or lower and at 20° C. or higher; and the same may apply to mixing plasticizers. For example, this is described in JP-A 2001-151901. Further, IR-absorbing dyes are described in, for example, JP-A 2001-194522. The time when the additives are added may be anytime in the process of preparing dopes. As the case may be, the additives may be added in the final step of the process of preparing dopes. The amount of each additive to be added is not specifically defined so far as the additive could exhibit its function. When the cellulose acylate film has a multi-layer structure, then the type and the amount of the additives to be added to each layer may differ. For example, this is described in JP-A 2001-151902, and the technique is well known in the art. Its details are described in Hatsumei Kyokai's Disclosure Bulletin No. 2001-1745 (issued Mar. 15, 2001 by Hatsumei Kyokai), pp. 16-12, and the materials described therein are preferably used in the invention.

[Blend Ratio of Compounds]

In the cellulose acylate film of the invention, the overall amount of the compounds having a molecular weight of at most 3000 is preferably from 5 to 45% relative to the mass of cellulose acylate, more preferably from 10 to 40%, even more preferably from 15 to 30%. As so mentioned hereinabove, the compounds include an optical anisotropy-lowering compound, a wavelength-dependent anisotropy dispersion improver, a UV inhibitor, a plasticizer, an antideteriorant, fine particles, a release agent and an IR absorbent. Preferably, they have a molecular weight of at most 3000, more preferably at most 2000, even more preferably at most 1000. If the overall amount of these compounds is smaller than 5%, then it may be problematic in that the properties of the cellulose acylate alone may be too noticeable in the film and, for example, the optical properties and the physical strength of the film may readily fluctuate depending on the change of the ambient temperature and humidity. If, however, the overall amount of the compounds is larger than 45%, then the compounds will be over the limit of their miscibility in the cellulose acylate film and it may be also problematic in that the excess compounds may deposit in the film surface and the film may be thereby whitened (bleeding out from film).

[Organic Solvent in Cellulose Acylate Solution]

In the invention, the cellulose acylate film is produced preferably according to a solvent-casting method, in which a cellulose acylate is dissolved in an organic solvent to prepare a solution (dope) and the dope is formed into films. The organic solvent preferably used as the main solvent in the invention is selected from esters, ketones and ethers having from 3 to 12 carbon atoms, and halogenohydrocarbons having from 1 to 7 carbon atoms. Esters, ketones and ethers for use herein may have a cyclic structure. Compounds having any two or more functional groups of esters, ketones and ethers (i.e., —O—, —CO— and —COO—) may also be used herein as the main solvent, and for example, they may have any other functional group such as alcoholic hydroxyl group. The number of the carbon atoms that constitute the main solvent having two or more functional groups may fall within the range the compound having any of those functional groups.

For the cellulose acylate film of the invention, chlorine-based halogenohydrocarbons may be used as the main solvent, or non-chlorine solvents as in Hatsumei Kyokai's Disclosure Bulletin 2001-1745 (pp. 12-16) may also be used as the main solvent. Anyhow, the main solvent is not limitative for the cellulose acylate film of the invention.

In addition, the solvents for the cellulose acylate solution and the film and also methods for dissolution therein are disclosed in the following patent publications, and these are preferred embodiments for use in the invention. For example, they are described in JP-A 2000-95876, 12-95877, 10-324774, 8-15251, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, 11-60752. These patent publications disclose not only the solvents preferred for cellulose acylate for the invention but also the physical properties of their solutions as well as the substances that may coexist along with them, and these are also preferred embodiments for use in the invention.

[Method for Producing Cellulose Acylate Film]
[Dissolution Step]

Preparing the cellulose acylate solution (dope) in the invention is not specifically defined in point of its dissolution process. It may be prepared at room temperature or may be prepared in a mode of cooling dissolution or high-temperature dissolution or in a mode of their combination. A process comprising a step of preparing the cellulose acylate solution for use in the invention and a subsequent step of concentration and filtration of the solution is described in detail in Hatsumei Kyokai's Disclosure Bulletin 2001-1745 (issued Mar. 15, 2001, by Hatsumei Kyokai), pp. 22-25, and this is preferably employed in the invention.

(Transparency of Dope Solution)

Preferably, the dope transparency of the cellulose acylate solution in the invention is at least 85%, more preferably at least 88%, even more preferably at least 90%. We, the present inventors have confirmed that various additives well dissolve in the cellulose acylate dope solution in the invention. A concrete method for determining the dope transparency is described. A dope solution is put into a glass cell having a size of 1 cm$^2$, and its absorbance at 550 nm is measured with a spectrophotometer (UV-3150 by Shimadzu). The solvent alone is measured as a blank, and the transparency of the cellulose acylate solution is calculated from the ratio of the solution absorbance to the blank absorbance.

[Casting, Drying, and Winding-Up Step]

Next, a method for producing a film using the cellulose acylate solution of the present invention will be described. As the method and apparatus for producing the cellulose acylate solution of the present invention, a solution cast film formation method and a solution cast film formation apparatus conventionally used for producing a cellulose acetate film are used. A dope (cyclic polyolefin solution) which has been prepared by a dissolver (tank) is once stored in a storage tank, and the dope is defoamed as the final step of preparation. The dope is sent from a dop take-out mouth to a pressure-type die through, for example, a pressure-type metering gear pump which can transfer a constant quantity of liquid with high precision by controlling the rotation rate. The dope is cast uniformly from a mouth (slit) of the pressure-type die onto a metal support of a casting section running endlessly. At the peeling point at which the metal support has made almost one rotation, the dope film in a damp-dried state (also referred to as a "web") is peeled off from the metal support. The obtained web is held by clips at both ends thereof while the width thereof is kept, conveyed by a tenter, and dried. Then, the obtained film is mechanically conveyed by a group of rolls of a dryer. Thus, the drying process is terminated. The web is wound up around a winder so as to have a predetermined length. The combination of the tenter and the group of rolls of the dryer varies depending on the purposes. In a solution cast film formation method used for the main uses of a cellulose acylate film of the present invention, i.e., functional protective films as optical members of electronic displays and photosensitizing materials for silver halide photos, a coating apparatus is often used in addition to the solution cast film formation apparatus, in order to perform surface treatment to provide a subbing layer, an antistatic layer, an anti-halation layer, a protective film, and the like on the film. These are described in detail in Hatsumei Kyokai's Disclosure Bulletin No. 2001-1745 (issued on Mar. 15, 2001, Hatsumei Kyokai), pp. 25-30 in classifications of casting (including concurrent casting), metal support, drying, peeling, and the like, and can be preferably used in the present invention.

The thickness of the cellulose acylate film is preferably 10 to 120 μm, more preferably 20 to 100 μm, and even more preferably 30 to 90 μm.

[Change in the Optical Performance of the Film after High Humidity Treatment]
[Evaluation of Physical Property of the Cellulose Acylate Film]

Regarding a change in the optical performance of the cellulose acylate film of the present invention which occurs due to an environmental change, the change amount of Re and Rth of the film treated at 60° C. and 90% RH for 240 hours is preferably 15 nm or less, more preferably 12 nm or less, and even more preferably 10 nm or less.

[Change in the Optical Performance of the Film after High Temperature Treatment]

The change amount of Re and Rth of the film treated at 80° C. for 240 hours is preferably 15 nm or less, more preferably 12 nm or less, and even more preferably 10 nm or less.

[Amount of Emission of the Compound after the Heat Treatment of the Film]

The amount of emission of a compound for lowering Rth and a compound for lowering ΔRth, which are preferably used for the cellulose acylate film of the present invention, from the film treated at 80° C. for 240 hours is preferably 30% or less, more preferably 25% or less, and even more preferably 20% or less.

The amount of emission from the film is obtained as follows. A film treated at 80° C. for 240 hours and an untreated film are independently dissolved in a solvent, and the compound is detected by high rate liquid chromatography. The amount of emission is calculated using the following expression, in which the amount of the compound remaining in the film is the peak area of the compound.

$$\text{Amount of emission (\%)} = \{(\text{amount of the compound remaining in the untreated film}) - (\text{amount of the compound remaining in the treated film})\} / (\text{amount of the compound remaining in the untreated film}) \times 100.$$

[Glass Transition Temperature Tg of Film]

The glass transition temperature Tg of the cellulose acylate film in the invention falls between 80 and 165° C. From the viewpoint of the heat resistance of the film, Tg preferably falls between 100 and 160° C., more preferably between 110 and 150° C. The glass transition temperature Tg is determined as follows: 10 mg of a sample of the cellulose acylate film of the invention is heated from room temperature up to 200° C. at a heating rate of 5° C./min, and the quantity of heat of the sample is measured with a differential scanning calorimeter (DSC 2910 by T. A. Instrument), and the glass transition temperature Tg of the film is calculated from it.

[Haze of Film]

Preferably, the haze of the cellulose acylate film in the invention falls between 0.01 and 2.0%, more preferably between 0.05 and 1.5%, even more preferably between 0.1 and 1.0%. The film transparency is a matter of importance when the film serves as an optical film. The haze may be determined as follows: A sample of the cellulose acylate film of the invention having a size of 40 mm×80 mm is measured with a haze meter (HGM-2DP by Suga Test Instruments) at 25° C. and 60% RH, according to JIS K-6714.

[Humidity Dependence of Re and Rth of Film]

Preferably, the humidity-dependent change of the in-plane retardation Re and the thickness-direction retardation Rth of the cellulose acylate film in the invention is as small as possible. Concretely, the difference between Rth at 25° C. and 10% RH and Rth at 25° C. and 80% RH, ΔRth (=Rth 10% RH−Rth80% RH) falls between 0 and 50 nm, more preferably between 0 and 40 nm, even more preferably between 0 and 35 nm.

[Equivalent Water Content of Film]

The equivalent water content of the cellulose acylate film in the invention is described. When the film is used as a protective film for polarizing plates, then the equivalent water content thereof at 25° C. and 80% RH is preferably from 0 to 4%, more preferably from 0.1 to 3.5%, even more preferably from 1 to 3% irrespective of the film thickness, in order not to detract from the adhesiveness of the film to water-soluble polymer such as polyvinyl alcohol. If the equivalent water content is higher than 4%, then it is undesirable since the humidity-dependent retardation of the film may be too great when the film is used as a support for optically-compensatory films.

The water content is determined as follows: A sample of the cellulose acylate film of the invention having a size of 7 mm×35 mm is analyzed with a water content analyzer combined with a sample drier (CA-03, VA-05, both by Mitsubishi Chemical), according to a Karl-Fisher method. The amount of water (g) in the sample thus measured is divided by the weight of the sample (g).

[Moisture Permeability of Film]

Preferably, the moisture permeability of the cellulose acylate film to be used for optically-compensatory sheets of the invention, as determined at a temperature of 60° C. and at a humidity of 95% RH according to JIS Z0288 and converted in terms of a standard film thickness of 80 μm, is from 400 to 2000 g/m$^2$·24 h, more preferably from 500 to 1800 g/m$^2$·24 h, even more preferably from 600 to 1600 g/m$^2$·24 h. If it is over than 2000 g/m$^2$·24 h, then the humidity-dependent absolute values Re and Rth of the film may be significantly higher than 0.5 nm/% RH. In addition, it is also unfavorable when an optically-anisotropic layer is laminated on the cellulose acylate film of the type of the invention to fabricate an optically-compensatory film, since the humidity-dependent absolute values Re and Rth of the sheet may also be significantly higher than 0.5 nm/% RH. When the optically-compensatory sheet or the polarizing plate of the type is built in liquid-crystal display devices, then it may cause discoloration and viewing angle reduction. On the other hand, if the moisture permeability of the cellulose acylate film is smaller than 400 g/m$^2$·24 h, then the film may interfere with drying of adhesive when it is stuck to both faces of a polarization film to fabricate a polarizing plate, or that is, the film may cause adhesion failure in the polarizing plate.

When the thickness of the cellulose acylate film is larger, then the moisture permeability thereof may be smaller; and when the thickness is smaller, then the moisture permeability may be larger. Accordingly, the moisture permeability of every sample having a different thickness must be determined, as converted in terms of a standard film thickness of 80 μm. Depending on the film thickness thereof, the moisture permeability of the film is determined as follows: Moisture permeability as converted in terms of standard film thickness of 80 μm=(measured moisture permeability)×(measured film thickness μm/80 μm). Regarding the method of measuring the moisture permeability, referred to are the methods described in Physical Properties of Polymer II (Polymer Experimental Lecture 4, Kyoritsu Publishing), pp. 285-297, "Determination of Vapor Permeation (mass method, temperature method, vapor pressure method, adsorption method)". Briefly, a sample of the cellulose acylate film having a size of 70 mmφ is conditioned at 25° C. and 90% RH, and at 60° C. and 95% RH both for 24 hours. Using a permeability tester (KK-709007 by Toyo Seiki), the water content per unit area of the sample is measured (g/m$^2$) according to JIS Z-0208, and the moisture permeability of the sample is calculated as follows: Moisture permeability=weight of conditioned sample−weight of unconditioned sample.

[Dimensional Change of Film]

The dimensional stability of the cellulose acylate film of the invention is preferably as follows: The dimensional change of the film after stored at 60° C. and 90% RH for 24 hours (high-humidity storage), and the dimensional change of the film after stored at 90° C. and 5% RH for 24 hours (high-temperature storage) are both at most 0.5%. More preferably, the dimensional change is at most 0.3%, even more preferably at most 0.15%.

A concrete method for the measurement is described. Two samples of the cellulose acylate film of the invention, having a size of 30 mm×120 mm, are prepared and conditioned at 25° C. and 60% RH for 24 hours. Using an automatic pin gauge (by Shinto Kagaku), holes of 6 mmφ are formed on both sides of the samples each at intervals of 100 mm. The original hole-to-hole distance is L0. One sample is processed at 60° C. and 90% RH for 24 hours, and then the hole-to-hole distance is measured (L1); and the other sample is processed at 90° C. and 5% RH for 24 hours, and the hole-to-hole distance is measured (L2). The minimum gauge limit in every measurement is 1/1000 mm. The dimensional change is determined as follows: Dimensional change at 60° C. and 90% RH (high-humidity storage)={|L0−L1|/L0}×100. Dimensional change at 90° C. and 5% RH (high-temperature storage)={|L0−L2|/L0}×100.

[Elastic Modulus of Film]

(Elastic Modulus)

Preferably, the elastic modulus of the cellulose acylate film in the invention is from 200 to 500 kgf/mm$^2$, more preferably from 240 to 470 kgf/mm$^2$, even more preferably from 270 to 440 kgf/mm$^2$. A concrete method for measuring it is as follows: Using a universal tensile tester, Toyo Boldwin's STM T50BP, a sample of the film is pulled in an atmosphere of 23° C. and 70% RH at a pulling rate of 10%/min, and its stress to yield 0.5% elongation is measured. This is the elastic modulus of the sample.

[Photoelasticity Coefficient of Film]

(Photoelasticity Coefficient)

Preferably, the photoelasticity coefficient of the cellulose acylate film in the invention is at most 50×10$^{-13}$ cm$^2$/dyne, more preferably at most 30×10$^{-13}$ cm$^2$/dyne, even more preferably at most 20×10$^{-13}$ cm$^2$/dyne. A concrete method for measuring it is as follows: A tensile stress is imparted to a sample of the cellulose acylate film of the invention having a size of 12 mm×120 mm, in the direction of the major axis thereof, whereupon the retardation of the sample is measured with an ellipsometer (Nippon Bunko's M150), and the photoelasticity coefficient of the sample is derived from the retardation change thereof relative to the stress applied to the sample.

[Change in the In-Plane Retardation Before and after the Stretching, Detection of the Slow Axis]

Samples of 100×100 mm are prepared and stretched in the machine conveying direction (MD direction) or the transverse direction (TD direction) perpendicular thereto, using a fixed monoaxial stretching apparatus under a condition where the temperature is 140° C. The in-plane retardation of each sample before and after the stretching is measured using an automatic birefringence meter KOBRA 21ADH. The slow axis is determined based on an alignment angle obtained at the time of the above-described retardation measurement. It is preferable that a change in Re caused by the stretching be small. Specifically, $|Re(n)-Re(0)|/n \leq 1.0$ is preferable, and $|Re(n)-Re(0)|/n \leq 0.3$ or less is more preferable, where $Re(n)$ is the in-plane retardation (nm) of the film stretched by n(%), and $Re(0)$ is the in-plane retardation (nm) of the non-stretched film.

[Direction Having the Slow Axis]

A polarizer has an absorption axis in the machine conveying direction (MD direction). Therefore, when used for a polarizer protective film, the cellulose acylate film of the present invention preferably has the slow axis in the vicinity of the MD direction or in the vicinity of the TD direction. Light leakage and hue change can be reduced by causing the slow axis to be parallel or perpendicular with respect to the polarizer. "In the vicinity of" means that the slow axis and the MD or TD direction are within the range of 0 to 10°, preferably 0 to 5°.

[Cellulose Acylate Film Having a Positive Inherent Birefringence]

The cellulose acylate film of the present invention increases the in-plane retardation Re thereof when stretched in the direction of the slow axis in the plane of the film, and decreases the in-plane retardation Re thereof when stretched in the direction perpendicular to the direction of the slow axis in the plane of the film. This indicates that the inherent birefringence is positive. In order to counteract Re occurring in the film, it is effective to stretch the film in the direction perpendicular to the direction of the slow axis. This is realized by, for example, stretching the film using a tenter in the direction perpendicular to the machine conveying direction (MD direction) (i.e., stretching the film in the TD direction) when the film has the slow axis in the MD direction. Thus, the in-plane retardation Re can be reduced. By contrast, for example, when the film has the slow axis in the TD direction, the in-plane retardation Re can be reduced by stretching the film by increasing the tension of the machine conveying roll in the MD direction.

[Cellulose Acylate Film Having a Negative Inherent Birefringence]

In some cases, the cellulose acylate film of the present invention decreases the in-plane retardation Re thereof when stretched in the direction of the slow axis, and increases the in-plane retardation Re thereof when stretched in the direction perpendicular to the direction of the slow axis. This indicates that the inherent birefringence is negative. In order to counteract Re occurring in the film, it is effective to stretch the film in the direction of the slow axis. This is realized by, for example, stretching the film by increasing the tension of the machine conveying roll in the machine conveying direction (MD direction) when the film has the slow axis in the MD direction. Thus, the in-plane retardation Re can be reduced. By contrast, for example, when the film has the slow axis in the direction perpendicular to the MD direction (i.e., in the TD direction), the in-plane retardation Re can be reduced by stretching the film using a tenter in the TD direction.

[Method for Evaluating the Cellulose Acylate Film of the Present Invention]

The evaluation of the cellulose acylate film of the present invention is performed by the following measurements.

(In-Plane Retardation Re, Thickness-Direction Retardation Rth)

Samples of 30 mm×40 mm are adjusted in terms of humidity at 25° C. and 60% RH for 2 hours. $Re(\lambda)$ is measured by the automatic birefringence meter KOBRA 21ADH (produced by Oji Keisoku Kiki Kabushiki Kaisha) by causing light having a wavelength of $\lambda$ nm to be incident in the normal line direction with respect to the film. $Rth(\lambda)$ is calculated based on $Re(\lambda)$ measured above and the retardation value measured as follows together with a temporarily average refractive index of 1.48 and the film thickness. The retardation value is measured by causing light having a wavelength of $\lambda$ nm to be incident while each sample is inclined up to 50° at an interval of 10°, using the in-plane slow axis as the inclining axis and assuming the normal line direction to the film as 0°.

(Measurement of the Wavelength-Dependent Re and Rth Distribution)

Samples of 30 mm×40 mm are adjusted in terms of humidity at 25° C. and 60% RH for 2 hours. Light having a wavelength of 780 nm to 380 nm is caused to be incident in the normal line direction to the film using the ellipsometer M-150 (produced by Nihon Bunko Kabushiki Kaisha), so that Re each wavelength is obtained. Thus, the wavelength-dependent Re distribution is measured. The wavelength-dependent Rth distribution is calculated based on the following retardation values measured in three directions together with a temporarily average refractive index of 1.48 and the film thickness. The retardation values are: Re measured in the above direction, the retardation value measured by causing light having a wavelength of 780 to 380 nm to be incident from the direction inclined by +40° with respect to the normal line direction to the film using the in-plane slow axis as the inclining axis, and the retardation value measured by causing light having a wavelength of 780 to 380 nm to be incident from the direction inclined by −40° with respect to the normal line direction to the film using the in-plane slow axis as the inclining axis.

(Molecule Orientation Axis)

A sample of 70 mm×100 mm is conditioned at 25° C. and 60% RH for 2 hours. Using an automatic birefringence meter (Oji Keisoku Kiki's KOBRA 21ADH), the molecule orientation axis is computed from the retardation measured by changing the incident angle in vertical light introduction.

(Axis Shifting)

Using an automatic birefringence meter (Oji Keisoku Kiki's KOBRA 21ADH), the axis shifting angle is measured. 20 points at regular intervals in the entire width of the sample in the width direction are measured, and the absolute values thus measured are averaged. The range of the slow axis angle (axis shifting) is as follows: 20 points at regular intervals in the entire width of the sample in the width direction are measured, and the difference between the mean value of the four points having given larger four absolute values of axis shifting, and the mean value of the four points having given smaller four absolute values of axis shifting is obtained.

(Transmittance)

Using a transparency meter (AKA phototube colorimeter by Kotaki Seisakusho) at 25° C. and 60% RH, the visible light (615 nm) transmittance of a sample of 20 mm×70 mm is measured.

(Spectral Characteristic)

Using a spectral photometer (U-3210 by Hitachi) at 25° C. and 60% RH, the transmittance of a sample of 13 mm×40 mm is measured within a wavelength range of from 300 to 450 nm. The inclination width is obtained as (wavelength for 72%)−(wavelength for 5%). The limiting wavelength is represented by (inclination width/2)+(wavelength for 5%). The absorption end is represented by a wavelength for transmittance 0.4%. The transmittance of the sample at 380 nm and 350 nm is obtained.

[Surface Property of Film]
(Surface Shape)

The surface property of the cellulose acylate film of the invention is described. Preferably, the arithmetic mean roughness (Ra) of the surface roughness of the film, according to JIS B0601-1994, is at most 0.1 µm, and the maximum height (Ry) thereof is at most 0.5 µm. More preferably, the arithmetic mean roughness (Ra) is at most 0.05 µm, and the maximum height (Ry) is at most 0.2 µm. The profile of the recesses and the projections of the film surface may be analyzed with an atomic force microscope (AFM).

(In-Plane Variance of Retardation of the Cellulose Acylate Film)

The cellulose acylate film of the present invention preferably satisfies the following expression.

$$|Re_{(MAX)}-Re_{(MIN)}|\leqq 3 \text{ and } |Rth_{(MAX)}-Rth_{(MIN)}|\leqq 5$$

In the expression, $Re_{(MAX)}$ and $Rth_{(MAX)}$ are each the maximum retardation value of a 1 m×1 m film which is arbitrarily cut out, and $Re_{(MIN)}$ and $Rth_{(MIN)}$ each the minimum retardation value of such a film.

[Additive Retentiveness in Film]

The cellulose acylate film of the invention is required to well retain various compounds added thereto. Concretely, when the cellulose acylate film is stored at 80° C. and 90% RH for 48 hours, the mass change of the film is preferably from 0 to 5%, more preferably from 0 to 3%, even more preferably from 0 to 2%.

<Method of Evaluation of Additive Retentiveness in Film>

A sample is cut into a size of 10 cm×10 cm, and stored at 23° C. and 55% RH for 24 hours, and its mass is measured. Then, this is stored at 80±5° C. and 90±10% RH for 48 hours. After processed, the surface of the sample is gently wiped, and then further stored at 23° C. and 55% RH for 1 day, and the mass of the sample is again measured. The additive retentiveness in the sample is calculated as follows:

Additive Retentiveness (mass %)={(mass before storage−mass after storage)/(mass before storage)}×100.

[Mechanical Characteristics of Film]
(Curl)

The curl value in the width direction of the cellulose acylate film of the invention is preferably from −10/m to +10/m. The cellulose acylate film is subjected to surface treatment as will be mentioned hereinunder, or rubbed before coated with an optically-anisotropic layer, or coated or laminated with an orientation layer or an optically-anisotropic layer. For these treatments, the film is processed while it is a long film. If the curl value of the long, cellulose acylate film in the width direction thereof falls outside the scope as above, then the film may be difficult to handle and it may be cut or broken. If so, in addition, the edges and the center part of the film may be strongly contacted with conveyor rolls to give dust, and, as a result, much impurity may deposit on the film. In that condition, the frequency of spot defects and coating streaks may be over the acceptable level. In addition, when the curl value is controlled to fall within the defined range, then it is favorable since a trouble of color mottles that may often occur when coated with an optically-anisotropic layer may be reduced, and, in addition, the film may be prevented from catching bubbles when laminated with a polarization film.

The curl value may be determined according to the method defined by the American National Standard Institute (ANSI/ASCPH1.29-1985).

(Tear Strength)

Preferably, the cellulose acylate film of the invention having a thickness of from 20 to 80 µm has a tear strength of at least 2 g, measured according to the tear test method of JISK7128-2:1998 (Elmendorf tear test method), more preferably from 5 to 25 g, even more preferably from 6 to 25 g. Also preferably, the tear strength of the film having a thickness of 60 µm is at least 8 g, more preferably from 8 to 15 g. Concretely, a sample piece having a size of 50 mm×64 mm is conditioned at 25° C. and 65% RH, and then tested with a light load tear strength tester to measure its tear strength.

[Solvent Remaining in Film]

It is desirable that the cellulose acylate film of the invention is dried under the condition under which the solvent amount remaining in the film could be from 0.01 to 1.5% by mass, more preferably from 0.01 to 1.0% by mass. The solvent amount to remain in the transparent support for use in the invention is controlled to at most 1.5%, whereby the film curling may be reduced. More preferably, it is at most 1.0%. The essential reason for it may be because, since the solvent amount to remain in the film formed according to the above-mentioned solvent casting method is reduced, the free volume of the film could be reduced.

[Moisture-Absorbing Expansion Coefficient of Film]

Preferably, the moisture-absorbing expansion coefficient of the cellulose acylate film of the invention is at most $30\times10^{-5}$/% RH, more preferably at most $15\times10^{-5}$/% RH, even more preferably at most $10\times10^{-5}$/% RH. The moisture-absorbing expansion coefficient of the film is preferably smaller, but in general, it may be at least $1.0\times10^{-5}$/% RH. The moisture-absorbing expansion coefficient means the change of the length of a sample when the relative humidity around the sample is changed at a constant temperature. When the moisture-absorbing expansion coefficient is controlled as above and when the cellulose acylate film of the invention is used as a support for optically-compensatory films, then frame-like transmittance increase, or that is, strain-caused light leakage can be prevented while the optically-compensatory function of the optically-compensatory films is kept as such.

[Surface Treatment]

In some cases, the adhesiveness between the cellulose acylate film and each functional layer (for example, a subbing layer or a back layer) can be improved by performing surface treatment with respect to the cellulose acylate film. For example glow discharge treatment, UV irradiation treatment, corona treatment, flame treatment, acid or alkali treatment can be used. Herein, glow discharge treatment may be low temperature plasma treatment performed under a low pressure gas of $10^{-3}$ to 20 Torr or plasma treatment performed under the atmospheric pressure. Both are preferable. A plasma-excited gas refers to a gas plasma-excited under the above-described conditions, including, for example, argon, helium, neon, krypton, xenon, nitrogen, carbon dioxide, flons such as tetrafluoromethane, or mixtures thereof. These are described in detail in Hatsumei Kyokai's Disclosure Bulletin No. 2001-1745 (issued Mar. 15, 2001, by Hatsumei Kyokai), pp. 30-32, and can be preferably used in the present invention.

[Contact Angle of the Film Surface by Alkali Saponification Treatment]

One effective means of surface treatment for using the cellulose acylate film of the present invention as a transparent protective film for a polarizing plate is alkali saponification treatment. In this case, the contact angle of the film surface after the alkali saponification treatment is preferably 55° or less, more preferably 50° or less, and even more preferably 45° or less. The contact angle can be evaluated using a typical evaluation means in which water drops having a diameter of 3 mm are dropped onto the film surface after the alkali saponification treatment and the angle between the film surface and the water drops is obtained. The contact angle can be used as a measure for hydrophilicity and hydrophobicity.

(Lightfastness)

An index of the lightfastness of the cellulose acylate film of the present invention is as follows. The color difference $\Delta E^*ab$ of the film irradiated with super xenon light for 240 hours is preferably 20 or less, more preferably 18 or less, and even more preferably 15 or less. The color difference was measured using UV3100 (produced by Shimadzu Corporation) as follows. The film is adjusted in terms of humidity at 25° C. and 60% RH for 2 hours, and then the color of the film was measured before the irradiation of xenon light so as to obtain the initial value (L0*, a0*, b0*). Thereafter, the film is irradiated with xenon light under the conditions of 150 W/m², 60° C. and 50% RH for 240 hours using the super xenon weather meter SX-75 (produced by Suga Test Instruments Co., Ltd.). After a predetermined time period, the film is removed from the constant temperature bath, and adjusted in terms of humidity at 25° C. and 60% RH for 2 hours. Then, the color of the film is measured again so as to obtain the post-irradiation value (L1*, a1*, b1*). From these values, the color difference $\Delta E^*ab=((L0^*-L1^*)^2+(a0^*-a1^*)^2+(b0^*-b1^*)^2)^{0.5}$ is obtained.

[Functional Layer]

The applications of the cellulose acylate film of the invention include optical applications and photographic materials. The optical applications of the film are especially preferably for liquid-crystal display devices, more preferably those that comprise a liquid-crystal cell carrying liquid crystal between two electrode substrates, two polarizers disposed on both sides thereof, and at least one optically-compensatory sheet disposed between the liquid-crystal cell and the polarizer. For the liquid-crystal display devices, preferred are TN, IPS, FLC, AFLC, OCB, STN, ECB, VA and HAN.

When the cellulose acylate film of the invention is used for these optical applications, various functional layers may be added to it. The layers are, for example, antistatic layer, cured resin layer (transparent hard coat layer), antireflection layer, easily-adhesive layer, antiglare layer, optically-compensatory layer, orientation layer, liquid-crystal layer. These functional layers and their materials that may be used for the cellulose acylate film of the invention include surfactant, lubricant, mat agent, antistatic layer and hard coat layer, and they are described in detail in Hatsumei Kyokai's Disclosure Bulletin 2001-1745 (issued Mar. 15, 2001, by Hatsumei Kyokai), pp. 32-45, and are preferably used also in the invention.

[Use (Polarizing Plate)]

The uses of the cellulose acylate film of the present invention will be described.

The optical film of the present invention is particularly useful as a polarizing plate protective film. When the cellulose acylate film of the present invention is used as a polarizing plate protective film, the polarizing plate can be produced by a general method with no specific limitation. According to one method, the obtained cellulose acylate film is treated with alkali and attached to both sides of a polarizer using an aqueous solution of completely saponified polyvinyl alcohol. The polarizer is produced by immersing and stretching a polyvinyl alcohol film in an iodine solution. Instead of alkali treatment, adhesion treatment as described in JP-A 6-94915 and 6-118232 may be used.

Examples of an adhesive used for attaching the treated surface of the protective film and the polarizer include polyvinyl alcohol-based adhesives, such as polyvinyl alcohol, polyvinyl butylal, and the like; vinyl-based latexes, such as butyl acrylate, and the like; and the like.

The polarizing plate is composed of a polarizer and protective films for protecting both sides thereof. In addition, a protection film is attached to one side of the polarizer, and a separate film is attached to the other side thereof. The protection film and the separate film are used for the purpose of protecting the polarizing plate at the time of shipping of the polarizing plate, product inspection, and the like. In this case, the protection film is attached for the purpose of protecting the surface of the polarizing plate, and is used for the other side opposite to the side of the polarizing plate to be attached to a liquid-crystal plate. The separate film is used for the purpose of covering an adhesive layer for attaching the polarizing plate to the liquid-crystal plate, and is used for the side of the polarizing plate which is to be attached to the liquid-crystal plate.

A liquid-crystal display device typically comprises a substrate containing liquid crystal between two polarizing plates. A polarizing plate protective film using the optical film of the present invention provides excellent display visibility regardless of where the film is located. Especially a polarizing plate protective film located on the display surface of the liquid-crystal display device is provided with a transparent hard-coat layer, an antiglare layer, an antireflection layer or the like. Therefore, the polarizing plate protective film is particularly preferably used at this location.

[Use (Optically-Compensatory Film)]

The cellulose acylate film of the present invention can be used for various uses, and is particularly effective when used as an optically-compensatory film of a liquid-crystal display device. An optically-compensatory film refers to an optical member which is generally used in a liquid-crystal display device for compensating for phase retardation. The optically-compensatory film has the same meaning as a phase retarder, an optically-compensatory sheet or the like. An optically-compensatory film has birefringence and is used for removing coloration from the display panel of the liquid-crystal display device or improving the viewing angle characteristics of the liquid-crystal display device. The cellulose acylate film of the present invention has a low level of optical anisotropy as indicated by $0 \leq Re_{(630)} \leq 10$ nm and $|Rth_{(630)}| \leq 25$ nm and a low level of wavelength-dependent distribution as indicated by $|Re_{(400)}-Re_{(700)}| \leq 10$ and $|Rth_{(400)}-Rth_{(700)}| \leq 35$. Accordingly, the film does not have any superfluous anisotropy. When the cellulose acylate film of the present invention is used in combination with an optical-anisotropic layer having birefringence, only the optical performance of the optical-anisotropic layer can be exhibited.

Accordingly, when the cellulose acylate film of the present invention is used as an optically-compensatory film of a liquid-crystal display device, Re and Rth of the optical-anisotropic layer used in combination therewith is preferably $Re_{(630)}=0$ to 350 nm and $|Rth_{(630)}|=0$ to 400 nm. Any optical-anisotropic layer having these ranges of Re and Rth can be used. Any optical-anisotropic layer having characteristics required of an optically-compensatory film can be used regardless of the optical performance or the driving system of the liquid-crystal cell of the liquid-crystal display device in which the cellulose acylate film of the present invention is used. The optical-anisotropic layer used may be formed of a composition containing a liquid-crystal compound or a polymer film having birefringence.

The optical-anisotropic layer used in combination with the optically-compensatory film of the present invention is formed of a cyclic polyolefin film which is a polymer film having birefringence and satisfies $35 \leq Re_{(630)} \leq 350$ and $70 \leq Rth_{(630)} \leq 400$, more preferably $35 \leq Re_{(630)} \leq 300$ and $100 \leq Rth_{(630)} \leq 350$, and even more preferably $35 \leq Re_{(630)} \leq 250$ and $100 \leq Rth_{(630)} \leq 300$.

As the above-described liquid-crystal compound, a discotic liquid-crystal compound or a rod-shaped liquid-crystal compound is preferable.

(Discotic Liquid-Crystal Compound)

Examples of the discotic liquid-crystal compound usable in the invention are described in various references (C. Destrade et al., *Mol. Cryst. Liq. Cryst.*, Vol. 71, p. 111 (1981); *Quarterly Journal of Outline of Chemistry*, by the Chemical Society of Japan, No. 22, Chemistry of Liquid Crystal, Chap. 10, Sec. 2 (1994); B. Kohne et al., *Angew. Chem. Soc. Chem. Comm.*, p. 1794 (1985); J. Zhang et al., *J. Am. Chem. Soc.*, Vol. 116, p. 2655 (1994)).

Preferably, the discotic liquid-crystal molecules are fixed as aligned in the optically-anisotropic layer in the invention, most preferably fixed therein through polymerization. The polymerization of discotic liquid-crystal molecules is described in JP-A 8-27284. For fixing discotic liquid-crystal molecules through polymerization, a polymerizable group must be bonded to the disc core of each discotic liquid-crystal molecule as a substituent thereto. However, if such a polymerizable group is directly bonded to the disc core, then the molecules could hardly keep their orientation during polymerization. Accordingly, a linking group is introduced between the disc core and the polymerizable group to be bonded thereto. Such polymerizable group-having discotic liquid-crystal molecules are disclosed in JP-A 2001-4387.

(Rod-Shaped Liquid-Crystal Compound)

Examples of the rod-shaped liquid-crystal compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexyl-benzonitriles. Not only such low-molecular liquid-crystal compounds, but also high-molecular liquid-crystal compounds may also be usable herein.

In the optically-anisotropic layer, it is desirable that the rod-shaped liquid-crystal molecules are fixed in an aligned state, most preferably they are fixed through polymerization. Examples of the polymerizable rod-shaped liquid-crystal compound usable in the invention are described in *Macromol. Chem.*, Vol. 190, p. 2255 (1989); *Advanced Materials*, Vol. 5, p. 107 (1993); U.S. Pat. Nos. 4,683,327, 5,622,648, 5,770, 107; pamphlets of International Laid-Open Nos. 95/22586, 95/24455, 97/00600, 98/23580, 98/52905; JP-A 1-272551, 6-16616, 7-110469, 11-80081, 2001-328973.

(Optical-Anisotropic Layer Formed of a Polymer Film)

As described above, the optical-anisotropic layer may be formed of a polymer film. The polymer film is formed of a polymer which can exhibit optical anisotropy. Examples of such a polymer include polyolefin (e.g., polyethylene, polypropylene, norbornene-based polymer), polycarbonate, polyarylate, polyfulfone, polyvinyl alcohol, polymethacrylate, polyacrylate, and cellulose ester (e.g., cellulose triacetate, cellulose diacetate). A copolymer or a mixture of these polymers may be used.

In the optically-compensatory film of the present invention, the optical-anisotropic layer is formed of a cyclic polyolefin film satisfying $35 \leq Re_{(630)} \leq 350$ and $70 \leq Rth_{(630)} \leq 400$.

The optical anisotropy of the polymer film is preferably generated by stretching. The stretching is preferably monoaxial stretching or biaxial stretching. Concretely, preferred is machine-direction monoaxial stretching to be attained by utilizing the peripheral speed difference between two or more rolls; or tenter stretching to be attained by clipping both sides of a polymer film and stretching it in the width direction; or biaxial stretching comprising a combination of these. If desired, two or more polymer films may be used so that the overall optical properties of these two or more films may satisfy the above-mentioned conditions. Preferably, the polymer film is produced according to a solvent casting method in order that the birefringence unevenness of the film is reduced as much as possible. Preferably, the thickness of the polymer film falls between 20 and 500 μm, most preferably between 40 and 100 μm.

(Constitution of General Liquid-Crystal Display Device)

For the polymer film to form the optically-anisotropic layer, usable is at least one polymer material selected from polyamide, polyimide, polyester, polyether ketone, polyamidimide-polyester imide, and polyaryl-ether ketone. This is dissolved in a solvent, then the resulting solution is applied to a substrate, and the solvent is evaporated away to form a film on the film. This method is favorably employed herein. In this case, also preferred is a method of stretching the polymer film and the substrate so as to make the film have optical anisotropy, and the film thus processed may be used as an optically-anisotropic layer. The cellulose acylate film of the invention is preferably used as the support in these embodiments. Another preferred method is as follows: The polymer film is formed on a different substrate, and this is peeled from it, and then this is stuck to the cellulose acylate film of the invention to give an optically-anisotropic layer having a laminate structure. In this method, the polymer film may be thinned, and its thickness is preferably at most 50 μm, more preferably from 1 to 20 μm.

(Constitution of General Liquid-Crystal Display Device)

When the cellulose acylate film of the invention is used as an optically-compensatory film, the transmission axis of the polarizer element for it may be at any angle to the slow axis of the optically-compensatory film of the cellulose acylate film. A liquid-crystal display device comprises a liquid-crystal cell that carries a liquid crystal between two electrode substrates, two polarizers disposed on both sides of the cell, and at least one optically-compensatory film disposed between the liquid-crystal cell and the polarizer.

The liquid-crystal layer of the liquid-crystal cell is generally formed by introducing a liquid crystal into the space formed by two substrates via a spacer put therebetween, and sealed up in it. A transparent electrode layer is formed on a substrate as a transparent film that contains a conductive substance. The liquid-crystal cell may further have a gas barrier layer, a hard coat layer or an undercoat layer (for adhesion to transparent electrode layer). These layers are generally formed on a substrate. The substrate of the liquid-crystal cell generally has a thickness of from 50 μm to 2 mm.

(Type of Liquid-Crystal Display Device)

The cellulose acylate film of the invention may be used for liquid-crystal cells of various display modes. Various display modes such as TN (twisted nematic), IPS (in-plane switching), FLC (ferroelectric liquid-crystal), AFLC (anti-ferroelectric liquid-crystal), OCB (optically-compensatory bent), STN (super-twisted nematic), VA (vertically aligned), ECB (electrically-controlled birefringence) and HAN (hybrid aligned nematic) modes have been proposed. Also proposed are other display modes with any of the above-mentioned display modes aligned and divided. The cellulose acylate film of the invention is effective in liquid-crystal display devices of any display mode. Further, it is also effective in any of transmission-type, reflection-type and semitransmission-type liquid-crystal display devices.

(TN-Mode Liquid-Crystal Display Device)

The cellulose acylate film of the present invention may be used as a support for an optically-compensatory sheet of a TN-mode liquid-crystal display device having a TN-mode liquid-crystal cell. The TN-mode liquid-crystal cell and the TN-mode liquid-crystal display device are conventionally well known. The optically-compensatory sheet used in a TN-mode liquid-crystal display device is described in JP-A 3-9325, 6-148429, 8-50206, and 9-26572. In addition, it is also described in Mori et al.'s papers (Jpn. J. Appl. Phys., Vol. 36 (1997), p. 143; Jpn. J. Appl. Phys., Vol. 36 (1997), p. 1068).

(STN-Mode Liquid-Crystal Display Device)

The Cellulose Acylate Film of the Present Invention May be Used as a Support for an optically-compensatory sheet of an STN-mode liquid-crystal display device having an STN-mode liquid-crystal cell. Generally in an STN-mode liquid-crystal display device, rod-shaped liquid-crystal molecules in the liquid-crystal cell are twisted in the range of 90 to 360 degrees, and the product ($\Delta nd$) of the refractive anisotropy ($\Delta n$) of the rod-shaped liquid-crystal molecules and the cell gap (d) is in the range of 300 to 1500 nm. The optically-compensatory sheet used in an STN-mode liquid-crystal display device is described in JP-A 2000-105316.

(VA-Mode Liquid-Crystal Display Device)

The Cellulose Acylate Film of the Present Invention is Particularly Advantageously Usable as a support for an optically-compensatory sheet of a VA-mode liquid-crystal display device having a VA-mode liquid-crystal cell. The Re retardation value of the optically-compensatory sheet used in a VA-mode liquid-crystal display device is preferably 0 to 150 nm, and the Rth retardation value thereof is preferably 70 to 400 nm. The Re retardation value is more preferably 20 to 70 nm. In the case where two optically anisotropic polymer films are used in a VA-mode liquid-crystal display device, the Rth retardation value of the films is preferably 70 to 250 nm. In the case where one optically anisotropic polymer film is used in a VA-mode liquid-crystal display device, the Rth retardation value of the film is preferably 150 to 400 nm. The VA-mode liquid-crystal display devices for the invention may have an orientation-divided system as described in, for example, JP-A 10-123576.

(IPS-Mode Liquid-Crystal Display Device and ECB-Mode Liquid-Crystal Display Device)

The Cellulose Acylate Film of the Present Invention is Particularly Advantageously Usable as a support for an optically-compensatory sheet or a polarizing plate protective film of an IPS-mode liquid-crystal display device having an IPS-mode liquid-crystal cell or an ECB-mode liquid-crystal display device having an ECB-mode liquid-crystal cell. In these modes, the liquid-crystal material is aligned nearly in parallel to the film face in black display, and the black display is provided by aligning the liquid-crystal molecules parallel to the substrate surface in the absence of applied voltage. In these embodiments, the polarizing plate using the cellulose acylate film of the present invention contributes to improvement of the hue, enlargement of the viewing angle, and improvement of the contrast. In these embodiments, it is preferable that the cellulose acylate film of the present invention be used as a protective film provided between the liquid-crystal cell and at least one of the polarizing plates provided on both sides of the liquid-crystal cell (i.e., the cell-side protective film). More preferably, an optically anisotropic layer is provided between the polarizing plate protective film and the liquid-crystal cell and that the retardation value of the optically anisotropic layer thus provided is set to be equal to or less than twice the value of $\Delta n \cdot d$ of that of the liquid-crystal layer.

(OCB-Mode Liquid-Crystal Display Device and HAN-Mode Liquid-Crystal Display Device)

The cellulose acylate film of the present invention is also advantageously usable as a support for an optically-compensatory sheet of an OCB-mode liquid-crystal display device having an OCB-mode liquid-crystal cell or a HAN-mode liquid-crystal display device having a HAN-mode liquid-crystal cell. It is preferable that, in the optically-compensatory sheet used in an OCB-mode liquid-crystal display device or a HAN-mode liquid-crystal display device, the direction in which the absolute value of retardation is smallest do not exist both in the in-plane direction and in the normal line direction of the optically-compensatory sheet. The optical properties of the optically-compensatory sheet used in an OCB-mode liquid-crystal display device or a HAN-mode liquid-crystal display device are determined by the optical properties of the optically anisotropic layer, the optical properties of the support, and the positional relationship between the optically anisotropic layer and the support. The optically-compensatory sheet used in an OCB-mode liquid-crystal display device or a HAN-mode liquid-crystal display device is described in JP-A 9-197397 and also in the article of Mori et al. (Jpn. J. Appl. Phys. Vol. 38 (1999) page 2837).

(Reflection-Type Liquid-Crystal Display Device)

The cellulose acylate film of the present invention is also advantageously usable as an optically-compensatory sheet of a TN-mode, STN-mode, HAN-mode, or GH (Guest-Host)-mode reflection-type liquid-crystal display device. These modes are conventionally well known. A TN-mode reflection-type liquid-crystal display device is described in JP-A 10-123478, pamphlet of International Laid-Open No. 98/48320, and Japanese Patent 3022477. An optically-compensatory sheet used in a reflection-type liquid-crystal display device is described in pamphlet of International Laid-Open No. 00/65384.

(Other Types of Liquid-Crystal Display Devices)

The cellulose acylate film of the present invention is also advantageously usable as a support for an optically-compensatory sheet of an ASM (Axially Symmetric Aligned Microcell)-mode liquid-crystal display device having an ASM-mode liquid-crystal cell. An ASM-mode liquid-crystal cell is characterized in that the thickness of the cell is maintained by a resin spacer whose position is adjustable. The other properties of the ASM-mode liquid-crystal cell are the same as those of the TN-mode liquid-crystal cell. An ASM-mode liquid-crystal cell and an ASM-mode liquid-crystal display device are described in Kume et al.'s paper (Kume et al., SID 98 Digest 1089 (1998)).

(Hard Coat Film, Antiglare Film, Antireflection Film)

The cellulose acylate film of the invention is favorably applied to hard coat films, antiglare films and antireflection films. For the purpose of improving the visibility of flat panel displays such as LCD, PDP, CRT, EL, any or all of a hard coat layer, an antiglare layer and an antireflection layer may be fitted to one or both faces of the cellulose acylate film of the invention. Preferred embodiments of such antiglare films and antireflection films are described in Hatsumei Kyokai's Disclosure Bulletin 2001-1745 (issued Mar. 15, 2001, by Hatsumei Kyokai), pp. 54-57, and the cellulose acylate film of the invention may be favorably used in these.

(Photographic Film Support)

The cellulose acylate film usable in the invention is applicable to supports of silver halide photographic materials. Various materials and formulations and methods for processing them are described in some patent publications, and they may apply to the invention. Regarding the techniques, JP-A 2000-105445 has detailed descriptions of color negative films, and the cellulose acylate film of the invention is favorably used in these. Also preferably, the film of the invention is applicable to supports of color reversal silver halide photographic materials, and various materials and formulations and methods for processing them described in JP-A 11-282119 are applicable to the invention.

(Transparent Substrate)

Since the cellulose acylate film of the invention has nearly zero optical anisotropy and has good transparency, it may be substitutable for the glass substrate for liquid-crystal cells in liquid-crystal display devices, or that is, it may be usable as a transparent support for sealing up the driving liquid crystals in the devices.

Since the transparent substrate for sealing up liquid crystal must have a good gas-barrier property, a gas-barrier layer may be optionally fitted to the surface of the cellulose acylate film of the invention, if desired. The morphology and the material of the gas-barrier layer are not specifically defined. For example, $SiO_2$ may be deposited on at least one face of the cellulose acylate film of the invention, or a polymer coating layer of a vinylidene-based polymer or a vinyl alcohol-based polymer having a relatively higher gas-barrier property may be formed on the film of the invention. These techniques may be suitably selected for use in the invention.

When the film of the invention is used as a transparent substrate for sealing up liquid crystal, a transparent electrode may be fitted to it for driving liquid crystal through voltage application thereto. The transparent electrode is not specifically defined. For example, a metal film or a metal oxide film may be laminated on at least one surface of the cellulose acylate film of the invention so as to form a transparent electrode on it. Above all, a meal oxide film is preferred in view of the transparency, the electroconductivity and the mechanical characteristics of the film; and a thin film of indium oxide essentially comprising tin oxide and containing from 2 to 15% of zinc oxide is more preferred. These techniques are described in detail, for example, in JP-A 2001-125079 and 2000-22760.

EXAMPLES

Hereinafter, embodiments of the present invention will be described, and the present invention is not limited to these embodiments.

Film Formation Example 1

Formation of a Cyclic Polyolefin Film F-1

<Synthesis of a Cyclic Polyolefin Polymer P-1>

100 parts by mass of purified toluene and 100 parts by mass of methyl ester norbornenecarbonate were put into a reaction tank. Next, 25 mmol % of ethyl hexanoate-Ni (mass with respect to the monomer) dissolved in toluene, 0.225 mol % of tri(pentafluorophenyl)boron (mass with respect to the monomer), and 0.25 mol % of triethylaluminum dissolved in toluene (mass with respect to the monomer) were put into the reaction tank. These substances were reacted for 18 hours while being stirred at room temperature. After the reaction, the reaction mixture was put into excess ethanol to generate a copolymer precipitate. The precipitate was purified and the resultant copolymer (P-1) was dried in vacuum at 65° C. for 24 hours.

The following composition was put into a mixing tank and stirred to dissolve the components, and then filtered by filtering papers having an average pore diameter of 34 μm and sintered metal filters having an average pore diameter of 10 μm.

| Cyclic polyolefin solution D-1 | |
| --- | --- |
| Cyclic polyolefin P-1 | 150 parts by mass |
| Methylene chloride | 380 parts by mass |
| Methanol | 70 parts by mass |

Next, the following composition containing the cyclic polyolefin solution D-1 formed by the above-described method was put into a disperser to prepare a liquid mat agent dispersant M-1.

| Liquid mat agent dispersant M-1 | |
| --- | --- |
| Silica particles having an average particle diameter of 16 nm (Aerosil R972 produced by Nihon Aerosil Kabushiki Kaisha | 2 parts by mass |
| Methylene chloride | 73 parts by mass |
| Methanol | 10 parts by mass |
| Cyclic polyolefin solution D-1 | 10 parts by mass |

100 parts by mass of the cyclic polyolefin solution D-1 and 1.35 parts by mass of the liquid mat agent dispersant M-1 were mixed to prepare a dope for film formation.

The dope was cast using a band caster. A film which was peeled off from the band at the time when the remaining solvent amount was about 25% by mass was stretched in the width direction at a stretching ratio of 10% using a tenter and was dried by hot air of 130° C. to 140° C. while being held so that the film would not be wrinkled. After being conveyed by the tenter, the film was further conveyed by a roll, and was further dried at 120° C. to 140° C. and wound up. The resultant cyclic polyolefin film (F-1) had a thickness of 80 μm, a haze of 0.5, a retardation Re of 63 nm, and a retardation Rth of 200 nm.

Film Formation Example 2

Formation of a Cyclic Polyolefin Film F-2

The following composition was put into a pressure-resistant sealed tank and stirred, and then heated to 80° C. by warm water to dissolve the components. After being cooled, the obtained substance was filtered by filtering paper having an average pore diameter of 34 μm and a sintered metal filter having an average pore diameter of 10 μm.

| Cyclic polyolefin solution D-2 | |
| --- | --- |
| TOPAS (marketed by Polyplastics Co., Ltd.) | 150 parts by mass |
| Hexane | 600 parts by mass |

Next, the following composition containing the cyclic polyolefin solution D-2 formed by the above-described method was put into a disperser to prepare a liquid mat agent dispersant M-2.

| Liquid mat agent dispersant M-2 | |
| --- | --- |
| Silica particles having an average particle diameter of 16 nm (Aerosil R972 produced by Nihon Aerosil Kabushiki Kaisha | 2 parts by mass |
| Hexane | 80 parts by mass |
| Cyclic polyolefin solution D-2 | 10 parts by mass |

100 parts by mass of the cyclic polyolefin solution D-2 and 1.1 parts by mass of the liquid mat agent dispersant M-2 were mixed to prepare a dope for film formation.

The dope was cast using a band caster. A film which was peeled off from the band at the time when the remaining solvent amount was about 18% by mass was stretched in the width direction at a stretching ratio of 50% using a tenter and was dried by hot air (130° C. to 140° C.) while being held so that the film would not be wrinkled. After being conveyed by the tenter, the film was further conveyed by a roll, and was further dried at 120° C. to 140° C. and wound up. The resultant cyclic polyolefin film (F-2) had a thickness of 80 μm, a haze of 0.4, a retardation Re of 60 nm, and a retardation Rth of 180 nm.

Film Formation Example 3

Formation of a Cyclic Polyolefin Film F-3

The following composition was put into a mixing tank and stirred to dissolve the components. Then, the obtained substance was filtered by filtering paper having an average pore diameter of 34 μm and a sintered metal filter having an average pore diameter of 10 μm.

| Cyclic polyolefin solution D-3 | |
| --- | --- |
| ARTON (produced by JSR Corporation) | 150 parts by mass |
| Hexane | 600 parts by mass |

Next, the following composition containing the cyclic polyolefin solution D-3 formed by the above-described method was put into a disperser to prepare a liquid mat agent dispersant M-3.

| Liquid mat agent dispersant M-3 | |
| --- | --- |
| Silica particles having an average particle diameter of 16 nm (Aerosil R972 produced by Nihon Aerosil Kabushiki Kaisha | 2 parts by mass |
| Hexane | 80 parts by mass |
| Cyclic polyolefin solution D-3 | 10 parts by mass |

100 parts by mass of the cyclic polyolefin solution D-3 and 1.1 parts by mass of the liquid mat agent dispersant M-3 were mixed to prepare a dope for film formation.

The dope was cast using a band caster. A film which was peeled off from the band at the time when the remaining solvent amount was about 22% by mass was stretched in the width direction at a stretching ratio of 2% using a tenter and was dried by hot air (130° C. to 140° C.) while being held so that the film would not be wrinkled. After being conveyed by the tenter, the film was further conveyed by a roll, and was further dried at 120° C. to 140° C. and wound up. The resultant cyclic polyolefin film (F-3) had a thickness of 80 μm, a haze of 0.2, a retardation Re of 60 nm, and a retardation Rth of 190 nm.

Film Formation Example 4

Formation of Cellulose Acylate Films 001 to 003, 101 to 104

(Preparation of a Cellulose Acetate Solution)
The following composition was put into a mixing tank and stirred to dissolve the components. Thus, a cellulose acetate solution D was prepared.

| (Cellulose acetate solution D composition) | |
| --- | --- |
| Cellulose acetate having an acetification degree of 2.86 | 100.0 parts by mass |
| Methylene chloride (1st solvent) | 402.0 parts by mass |
| Methanol (2nd solvent) | 60.0 parts by mass |

(Preparation of a Mat Agent Solution)
20 parts by mass of silica particles having an average particle diameter of 16 nm (AEROSIL R972 produced by Nihon Aerosil Kabushiki Kaisha) and 80 parts by mass of methanol were stirred and mixed well for 30 minutes to form a liquid silica particle dispersion. The liquid dispersion was put to a disperser together with the following composition and stirred for 30 minutes or longer to dissolve the components. Thus, a mat agent solution was prepared.

| (Mat agent solution composition) | |
| --- | --- |
| Silica particles having an average particle diameter of 16 nm | 10.0 parts by mass |
| Methylene chloride (1st solvent) | 76.3 parts by mass |
| Methanol (2nd solvent) | 3.4 parts by mass |
| Cellulose acetate solution D | 10.3 parts by mass |

(Preparation of an Additive Solution)
The following composition was put into a mixing tank and stirred while being heated to solve the components. Thus, an additive solution was prepared.

| (Additive solution composition) | |
| --- | --- |
| Compound A-19 for lowering the optical anisotropy | 49.3 parts by mass |
| Wavelength-dependent distribution adjuster UV-102 | 7.6 parts by mass |
| Methylene chloride (1st solvent) | 58.4 parts by mass |
| Methanol (2nd solvent) | 8.7 parts by mass |
| Cellulose acetate solution D | 12.8 parts by mass |

(Formation of the Cellulose Acetate Film Sample 101)
94.6 parts by mass of the cellulose acetate solution D, 1.3 parts by mass of the mat agent solution, and 4.1 parts by mass of the additive solution were each filtered and then mixed, and cast using a band caster. In the above composition, the mass ratio of the compound A-19 for lowering the optical anisotropy with respect to the cellulose acetate was 12%, and the mass ratio of the wavelength-dependent distribution adjuster UV-102 with respect to the cellulose acetate was 1.8%. A film was peeled off from the band at the time when the remaining solvent amount was about 30% and dried at 140° C. for 40 minutes to form a cellulose acetate film. The remaining solvent amount of the resultant cellulose acetate film was 0.2%, and the thickness of the film was 80 μm.

(Formation of the Cellulose Acetate Film Samples 001 to 003, 102 to 104]

The cellulose acetate film samples 001 to 003 and 102 to 104 were formed in the same manner as above, except that the types and amounts of the compound for lowering the optical anisotropy in the additive solution and the wavelength-dependent distribution adjuster in the additive solution were changed to those shown in Table 1. Table 1 also shows the solution composition of the sample 101.

range of 0 to 30 and that the humidity dependency of the optical anisotropy was lowered. These samples were also measured for the equilibrium water content at 25° C. and 80% RH. It was confirmed that, in all the samples except for the comparative sample 001, the equilibrium water content was 4% or less and that cellulose acylate film was made hydrophobic by addition of the optical anisotropy lowering agent or the wavelength-dependent distribution adjuster. These samples were measured for the moisture permeability at 60° C. and 95% RH for 24 hours. (converted to the value at 80

TABLE 1

| | Cellulose acetate film sample | Methylene chloride (parts by mass) | Methanol (parts by mass) | Cellulose acylate substitution degree | Film thickness (μm) | Optical anisotropy lowering agent | | Wavelength-dependent distribution adjuster | | Total amount of compounds |
|---|---|---|---|---|---|---|---|---|---|---|
| | | | | | | Compound | Amount (parts by mass) | Compound | Amount (parts by mass) | (% to cellulose acylate) |
| Comparative example | 001 | 58.4 | 8.7 | 2.86 | 80 | None | — | None | — | 0 |
| Comparative example | 002 | 58.4 | 8.7 | 2.86 | 80 | None | — | UV-3 | 7.6 | 1.8 |
| Comparative example | 003 | 58.4 | 8.7 | 2.86 | 80 | BDP | 49.3 | UV-3 | 7.6 | 13.6 |
| Present invention | 101 | 58.4 | 8.7 | 2.92 | 80 | A-19 | 49.3 | UV-102 | 7.6 | 13.6 |
| Present invention | 102 | 80 | 20 | 2.92 | 80 | A-19 | 50 | UV-102 | 8 | 17.4 |
| Present invention | 103 | 80 | 20 | 2.92 | 80 | A-19 | 58 | UV-102 | 8 | 19.9 |
| Present invention | 104 | 80 | 20 | 2.92 | 80 | A-19 | 58 | UV-102 | 8 | 19.9 |

These samples were measured for the thickness-direction retardation difference $\Delta Rth$ (=Rth10% RH−Rth80% RH) between a relative humidity of 10% and a relative humidity of 80%. In the comparative samples 001 and 002 which do not contain an optical anisotropy lowering agent and the comparative sample 003 which contains biphenyl diphenyl phosphate (BDP) as a plasticizer instead of an optical anisotropy lowering agent, $\Delta Rth$ was not reduced to 30 nm or less, and the humidity dependency of the optical anisotropy was high.

By contrast, in the sample 101 containing an optical anisotropy lowering agent, it was confirmed that $\Delta Rth$ was in the μm). It was confirmed that, in all the samples except for the comparative sample 001, the moisture permeability was 400 $g/m^{20} \cdot 24$ hr or more and 2000 $g/m^{20} \cdot 24$ hr or less, and that the moisture permeability of the samples 101 to 103 containing the optical anisotropy lowering agent and the wavelength-dependent distribution adjuster was improved as compared to the comparative samples 002 and 003.

The obtained evaluation results of the cellulose acylate film samples 101 to 104 and the comparative samples 001 to 003 are shown in Table 2.

TABLE 2

| | Cellulose acetate film sample | $\Delta Rth$ (Rth10% RH−Rth80% RH) | Water content 80% RH | Moisture permeability Converted to the value at 80 μm | Re(630) (nm) | Rth(630) (nm) | \|Re(400)−Re(700)\| (nm) | \|Rth(400)−Rth(700)\| (nm) |
|---|---|---|---|---|---|---|---|---|
| Comparative Sample | 001 | 52.4 | 4.4 | 2250 | 3.3 | 27.8 | 13 | 39.8 |
| Comparative sample | 002 | 49.4 | 3.4 | 1410 | 2.5 | 26.4 | 7.8 | 22.3 |
| Comparative sample | 003 | 36.8 | 2.9 | 1317 | 3.0 | 30.4 | 10.8 | 21.4 |
| Present invention | 101 | 25.1 | 3.3 | 1060 | 0.2 | 3.1 | 1.3 | 7.4 |
| Present invention | 102 | 10.3 | 2.8 | 950 | 0.4 | −4.1 | 1.0 | 12.4 |
| Present invention | 103 | 8.5 | 2.2 | 905 | 0.3 | −6.1 | 0.8 | 11.5 |
| Present invention | 104 | 8.2 | 2.2 | 910 | 0.2 | −3.5 | 0.5 | 5.1 |

The samples 101 to 104 containing a compound for lowering the optical anisotropy are sufficiently low in terms of both $Re_{(630)}$ and $Rth_{(630)}$ and are almost optically isotropic, as compared to the comparative samples 001 and 002 containing no such compound and the comparative sample 003 containing biphenyl-diphenyl phosphate (BDP), which is a general plasticizer. The samples containing a compound for adjusting the wavelength-dependent distribution are sufficiently low in terms of both $|Re_{(400)}-Re_{(700)}|$ and $|Rth_{(400)}-Rth_{(700)}|$ and are almost close to zero in the wavelength-dependent distribution, as compared to the comparative examples.

Example 1

Exemplary structures of liquid-crystal display devices to which the present invention is applied are shown in FIGS. 1 and 2. Film A represents a commercially available cellulose acetate film, film B represents the cellulose acetate film of the samples 101 to 104 formed in the film formation example 4, PVA represents a polarization film described below, and film C represents a cyclic polyolefin film formed in the film formation examples 1 to 3.

In this example, a VA-mode liquid-crystal display device is used, but the polarizing plate and the optically-compensatory film using the film of the present invention and the uses of the structure thereof are not limited by the operation mode of the liquid-crystal display device.
(Production of a Polarizing Plate)

The cellulose acetate film sample 101 obtained in the film formation example 4 and a commercially available cellulose acetate film (TF80UL, 80 μm) were immersed in an aqueous solution of 1.5N sodium hydroxide at 55° C. for 2 minutes, were washed in a water-rinsing bath at room temperature, and were neutralized using 0.1N sulfuric acid at 30° C. The resultant substance was washed again in a water-rinsing bath at room temperature and was then dried by 100° C. air. Thus, the surface of the cellulose acylate film was saponified.

Next, a rolled polyvinyl alcohol film having a thickness of 80 μm was continuously stretched by a factor of 5 in an aqueous solution of iodine and dried to obtain a polarization film. The alkali-saponified cellulose acylate film sample 101 and TF80UL were provided and attached to both surfaces of the polarization film located therebetween using a 3% aqueous solution of polyvinyl alcohol (PVA-117H produced by Kuraray Co., Ltd.) as an adhesive. Thus, a polarizing plate, one surface of which is protected by the cellulose acylate film 10 and the other surface of which is protected by TF80UL, was obtained. The attachment was performed so that the slow axis of each of the cellulose acylate film sample 101 and TF80UL was parallel to the transmission axis of the polarization film.

The cyclic polyolefin film F-1 obtained in film formation example 1 was attached to the polarizing plate on the side of the cellulose acetate film sample 101 with a sticky agent so that the slow axis of the cyclic polyolefin film F-1 was parallel to the transmission axis of the polarization film. Thus, an upper-side polarizing plate was produced.

Next, a polarizing plate was produced as a lower-side polarizing plate in substantially the same manner using a commercially available acetate film (TF80UL, 80 μm) for both sides of the polarization film.
(Production of a VA-Mode Liquid-Crystal Cell and a VA-Mode Liquid-Crystal Display Device)

The liquid-crystal cell was produced as follows. A liquid-crystal material having a negative dielectric anisotropy ("MLC6608" produced by Merck & Co.) was dropped and injected between the substrates with an inter-substrate cell gap of 3.6 μm, and the substrates were sealed to form a liquid-crystal layer between the substrates. The retardation of the liquid-crystal layer (i.e., the product Δn·d of the thickness d (μm) and the refractive anisotropy Δn of the liquid-crystal layer) was set to be 300 nm. The liquid-crystal layer was aligned to be vertical. To the upper side of this vertical alignment liquid-crystal cell (the viewer side), the upper-side polarizing plate produced above was attached with a sticky agent so that the cyclic polyolefin film F-1 faced the liquid-crystal cell. To the lower side of the liquid-crystal cell (the backlight side), the lower-side polarizing plate produced above was attached with a sticky agent. The polarizing plates were located in a crossed Nicols state so that the transmission axis of the upper-side polarizing plate ran vertically and the transmission axis of the lower-side polarizing plate ran horizontally (structure 101 in FIG. 1).

As a result of viewing the produced liquid-crystal display device, it was found that black display which was neutral in a front direction and a viewing angle direction was realized. As a result of measuring the viewing angle (the range in which the contrast is 10 or more and the black display is not inverted) at eight stages from the black display (L1) to the white display (L8) using a measuring apparatus (EZ-Contrast 160D, produced by EDLIM S. A.), it was found that the viewing angle was satisfactory at 80° or more both in the left-right direction and the top-bottom direction.

This liquid-crystal panel was subjected to an ambient humidity change (10% RH, 80% RH). Even after 1 week, the hue of the black display and the viewing angle were both almost the same as those measured at 60% RH. No significant reduction in the liquid-crystal display visibility by the ambient humidity change was recognized:

When the cyclic polyolefin film F-2 or F-3 was used instead of the cyclic polyolefin film F-1, substantially the same result was obtained. When the cellulose acetate film samples 102 to 104 were used instead of the cellulose acetate film sample 101, a reduction in the liquid-crystal display visibility by the ambient humidity change was smaller in 102 than in 101, in 103 than in 102, and in 104 than in 103, regardless of whether F-1, F-2 or F-3 was used. This suggests that the reduction in the display visibility by an ambient humidity change of the liquid-crystal panel is smaller when the change of Rth in accordance with the humidity is smaller.

Comparative example 1

Structure 001 in FIG. 2 was obtained in exactly the same manner as in example 1, except that a commercially available cellulose acetate film (TF80UL, 80 μm) was used instead of the cellulose acetate film sample 101 for the upper-side polarizing plate.

With the resultant liquid-crystal display device, the black display was slightly bluish in the front direction and the viewing angle direction. The viewing angle was satisfactory at 80° or more both in the left-right direction and the top-bottom direction.

This liquid-crystal panel was subjected to an ambient humidity change (10% RH, 80% RH). After 1 week, the hue of the black display was more bluish; i.e., a reduction in the liquid-crystal display visibility by the ambient humidity change was recognized.

As can be seen from example 1 and comparative example 1, even where the cyclic polyolefin film F-1 and the cellulose acetate film sample 101 which have a small change in the optical characteristics by an ambient humidity change are used, the display visibility is reduced by the ambient humidity change if even one more film which is likely to be affected by the ambient humidity change and has a non-zero phase difference (Re, Rth) (such as a commercially available cellulose acetate film) is included between two polarization films.

Example 2

Structure 201 in FIG. 1 was obtained in substantially the same manner as in example 1, except that the upper-side polarizing plate was located on the lower side (the backlight side) and the lower-side polarizing plate was located on the upper side (the viewer side).

As a result of viewing the resultant liquid-crystal display device, it was found that black display which was neutral in the front direction and the viewing angle direction was realized. As a result of measuring the viewing angle (the range in which the contrast is 10 or more and the black display is not inverted) using a measuring apparatus, it was found that the viewing angle was satisfactory at 80° or more both in the left-right direction and the top-bottom direction.

This liquid-crystal panel was subjected to an ambient-humidity change (10% RH, 80% RH). Even after 1 week, the hue of the black display and the viewing angle were both almost the same as those measured at 60% RH. No significant reduction in the liquid-crystal display visibility by the ambient humidity change was recognized.

Comparative Example 2

Structure 002 in FIG. 2 was obtained in exactly the same manner as in example 2 except that a commercially available cellulose acetate film (TF80UL, 80 μm) was used instead of the cellulose acetate film sample 101 for the lower-side polarizing plate.

With the resultant liquid-crystal display device, the black display was slightly bluish in the front direction and the viewing angle direction. The viewing angle was satisfactory at 80° or more both in the left-right direction and the top-bottom direction.

This liquid-crystal panel was subjected to an ambient humidity change (10% RH, 80% RH). After 1 week, the hue of the black display was more bluish; i.e., a reduction in the liquid-crystal display visibility by the ambient humidity change was recognized.

As can be seen from examples 1 and 2 and comparative examples 1 and 2, even when the cyclic polyolefin film F-1 and the cellulose acetate film sample 101 which have a small change in the optical characteristics due to an ambient humidity change are used, the display visibility is reduced by the ambient humidity change if even one more film which is likely to be affected by the ambient humidity change and has a non-zero phase difference (Re, Rth) (such as a commercially available cellulose acetate film) is included between the two polarizing plate, either above or below the liquid-crystal cell.

Example 3

Structures 102 to 108 and 202 to 208 in FIG. 1 were each obtained by substantially the same method as that of examples 1 and 2, and the viewing angle and the hue of the black display were observed. Substantially the same results as those of examples 1 and 2 were obtained. Good display visibility was provided, and no significant reduction in the liquid-crystal display visibility was recognized even by the ambient humidity change.

Example 4

Structures 109 to 113 and 209 to 213 in FIG. 1 and FIG. 2 were also each obtained by substantially the same method as that of examples 1 to 3, and the viewing angle and the hue of the black display of each obtained liquid-crystal display device were observed. Substantially the same results as those of examples 1 to 3 were obtained. Good display visibility was provided, and a reduction in the liquid-crystal display visibility due to the ambient humidity change was less than in examples 1 to 3 and was considerably small.

It is considered that such a result was obtained for the following reason. The cyclic polyolefin film F-1 and the cellulose acetate film sample 101 which have a small change in the optical characteristics due to an ambient humidity change are used, and no film which is likely to be affected by the ambient humidity change and has a non-zero phase difference (Re, Rth) (such as a commercially available cellulose acetate film) is included between two polarization films, either above or below the liquid-crystal cell. Therefore, there was almost no reduction in the liquid-crystal display visibility due to the ambient humidity change.

Example 5

Structures 114 to 118 and 214 to 218 in FIG. 2 were also each obtained in substantially the same manner as in examples 1 to 4. In example 5, however, for the upper-side polarizing plate in structures 114 to 118 and the lower-side polarizing plate in structures 214 to 218, the polarization film and the cyclic polyolefin film C were attached to each other as follows. Each of the cyclic polyolefin films F-1, F-2, and F-3 was treated with glow discharge (a high frequency voltage of 3000 Hz and 4200 V was applied between the upper and lower electrodes; treated for 20 seconds), and the attachment was performed using a polyvinyl alcohol-based adhesive. The resultant polarizing plate was dried at 70° C. for 10 minutes or longer.

The viewing angle and the hue of the black display of each resultant liquid-crystal display device were observed. Substantially the same results as those of example 4 were obtained. Good display visibility was provided. The change by the ambient humidity change was substantially the same as that of example 4.

In this embodiment, the number of films used for a liquid-crystal display device can be reduced, which reduces the production cost. In addition, the thickness of the liquid-crystal display device can be reduced.

INDUSTRIAL APPLICABILITY

By using a cellulose acylate film having a low level of optical anisotropy and a low level of wavelength-dependent distribution of Re and Rth and a cyclic polyolefin film, optical members, such as an optically-compensatory film, a polarizing plate, and the like, which have excellent viewing angle characteristics and a small reduction in display visibility against a change in ambient humidity, and a liquid-crystal display device using the same, can be provided.

The entire disclosure of each and every foreign patent application from which the benefit of foreign priority has been claimed in the present application is incorporated herein by reference, as if fully set forth.

The invention claimed is:

1. An optically-compensatory film comprising:
a cyclic polyolefin film satisfying expression (I); and
a cellulose acylate film satisfying expressions (II) and (III):

$$35 \leq Re_{(630)} \leq 350 \text{ and } 70 \leq Rth_{(630)} \leq 400, \quad (I)$$

$$0 \leq Re_{(630)} \leq 10 \text{ and } |Rth_{(630)}| \leq 25, \text{ and} \quad (II)$$

$$|Re_{(400)} - Re_{(700)}| \leq 10 \text{ and } |Rth_{(400)} - Rth_{(700)}| \leq 35, \quad (III)$$

wherein $Re(\lambda)$ represents an in-plane retardation value (unit: nm) at a wavelength of $\lambda$ nm; and
$Rth(\lambda)$ represents a thickness-direction retardation value (unit: nm) at a wavelength of $\lambda$ nm;
wherein the cellulose acylate film contains at least one compound for lowering the thickness-direction retardation Rth in a range satisfying expressions (IV) and (V), $$(Rth(A) - Rth(0))/A \leq -1.0, \text{ and} \quad (IV)$$

$$0.01 \leq A \leq 30, \quad (V)$$

wherein Rth(A) represents Rth (nm) of a film containing a compound for lowering Rth at A%;
Rth(0) represents Rth (nm) of a film which does not contain any compound for lowering Rth (nm); and
A represents a mass (%) of a compound for lowering Rth when a mass of the polymer as a material for the film is 100;
wherein the at least one compound for lowering Rth is represented by formula (1) or formula (2):

formula (1)

wherein in formula (1), $R^1$ represents an alkyl group or an aryl group, and $R^2$ and $R^3$ each independently represents a hydrogen atom, an alkyl group or an aryl group;

formula (2)

wherein in formula (2), $R^{31}$ represents an alkyl group or an aryl group, and $R^{32}$ and $R^{33}$ each independently represents a hydrogen atom, an alkyl group or an aryl group.

2. The optically-compensatory film according to claim 1, wherein the cyclic polyolefin film comprises a copolymer comprising at least one repeating unit represented by Formula (A) and at least one repeating unit represented by Formula (B):

Formula (A)

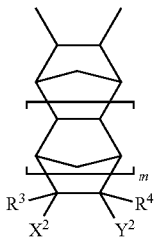

Formula (B)

wherein m represents an integer of 0 to 4;
$R^1$ to $R^4$ each independently represents a hydrogen atom or a hydrocarbon group having 1 to 10 carbon atoms;
$X^1$, $X^2$, $Y^1$ and $Y^2$ each independently represents a hydrogen atom, a hydrocarbon group having 1 to 10 carbon atoms, a halogen atom, a hydrocarbon group having 1 to 10 carbon atoms substituted with a halogen atom, $-(CH_2)_nCOOR^{11}$, $-(CH_2)_nOOCR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOCOZ$, $-(CH_2)_nOZ$, $-(CH_2)_nW$, or $(-CO)_2O$ or $(-CO)_2NR^{15}$ formed of $X^1$ and $Y^1$ or $X^2$ and $Y^2$;
$R^{11}$, $R^{12}$, $R^{13}$, $R^{14}$ and $R^{15}$ each independently represents a hydrocarbon group having 1 to 20 carbon atoms;
Z represents a hydrocarbon group or a hydrocarbon group substituted with a halogen;
W represents $SiR^{16}{}_pD_{3-p}$, provided that $R^{16}$ represents a hydrocarbon group having 1 to 10 carbon atoms; D represents a halogen atom, $-OCOR^{16}$ or $-OR^{16}$; and p represents an integer of 0 to 3; and
n represents an integer of 0 to 10.

3. The optically-compensatory film according to claim 2, wherein the cyclic polyolefin film is obtained by a method comprising:
casting an organic solvent solution containing 10% by mass to 35% by mass of the polymer or the copolymer onto an endless metal support, and drying, so as to form a dried film;
peeling the dried film off from the metal support, so as to form a peeled film;
stretching the peeled film in at least one of a width direction and a length direction, and further drying and winding up.

4. The optically-compensatory film according to claim 1, wherein the cyclic polyolefin film comprises a polymer comprising a cyclic repeating unit represented by Formula (B) or (C) or a copolymer comprising at least two cyclic repeating units represented by Formula (B) and (C),

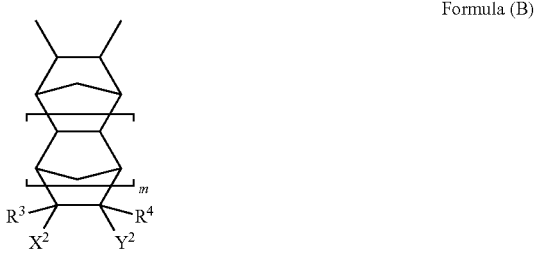

Formula (B)

-continued

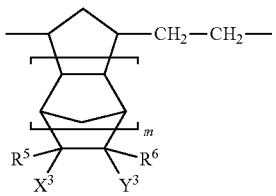

Formula (C)

where m represents an integer of 0 to 4;

$R^3$ to $R^6$ each independently represents a hydrogen atom or a hydrocarbon group having 1 to 10 carbon atoms;

$X^2$, $X^3$, $Y^2$ and $Y^3$ each independently represents a hydrogen atom, a hydrocarbon group having 1 to 10 carbon atoms, a halogen atom, a hydrocarbon group having 1 to 10 carbon atoms substituted with a halogen atom, —$(CH_2)_n COOR^{11}$, —$(CH_2)_n OOCR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OCOZ$, —$(CH_2)_n OZ$, —$(CH_2)_n W$, or (—$CO)_2 O$ or (—$CO)_2 NR^{15}$ formed of $X^2$ and $Y^3$ or $X^3$ and $Y^3$;

$R^{11}$, $R^{12}$, $R^{13}$, $R^{14}$ and $R^{15}$ each independently represents a hydrocarbon group having 1 to 20 carbon atoms;

Z represents a hydrocarbon group or a hydrocarbon group substituted with halogen;

W represents $SiR^{16}_p D_{3-p}$, provided that $R^{16}$ represents a hydrocarbon group having 1 to 10 carbon atoms; D represents a halogen atom, —$OCOR^{16}$ or —$OR^{16}$; and p represents an integer of 0 to 3; and n represents an integer of 0 to 10.

5. The optically-compensatory film according to claim 1, wherein the cellulose acylate film comprises a cellulose acylate having a degree of acyl substitution of 2.85 to 3.00.

6. The optically-compensatory film according to claim 1, wherein the cellulose acylate film comprises at least one compound for lowering $|Rth_{(400)}-Rth_{(700)}|$ in an amount of from 0.01 to 30% by mass based on a solid content of the cellulose acylate.

7. The optically-compensatory film according to claim 1, wherein the cellulose acylate film has a thickness of 10 to 120 μm.

8. A polarizing plate comprising:

a polarizer; and at least one optically-compensatory film according to claim 1 as a protective film of the polarizer.

9. The polarizing plate according to claim 8, wherein at least one of a hard-coat layer, an antiglare layer and an antireflection layer is provided on a surface of the polarizing plate.

10. A liquid-crystal display device comprising an optically-compensatory film according to claim 1.

11. A VA-mode liquid-crystal display device comprising an optically-compensatory film according to claim 1.

12. An IPS-mode liquid-crystal display device comprising an optically-compensatory film according to claim 1.

13. A liquid-crystal display device comprising:

at least two polarization films;

at least one cyclic polyolefin film satisfying expression (I) between the at least two polarization films; and at least one cellulose acylate film satisfying expressions (II) and (III) between the at least two polarization films:

$$35 \leq Re_{(630)} \leq 350 \text{ and } 70 \leq Rth_{(630)} \leq 400, \quad (I)$$

$$0 \leq Re_{(630)} \leq 10 \text{ and } |Rth_{(630)}| \leq 25, \text{ and} \quad (II)$$

$$|Re_{(400)}-Re_{(700)}| \leq 10 \text{ and } |Rth_{(400)}-Rth_{(700)}| \leq 35, \quad (III)$$

wherein Re(λ) represents an in-plane retardation value (unit: nm) at a wavelength of λ nm; and Rth(λ) represents a thickness-direction retardation value (unit: nm) at a wavelength of λ nm;

wherein the cellulose acylate film contains at least one compound for lowering the thickness-direction retardation Rth in a range satisfying expressions (IV) and (V), $$(Rth(A)-Rth(0))/A \leq -1.0, \text{ and} \quad (IV)$$

$$0.01 \leq A \leq 30, \quad (V)$$

wherein Rth(A) represents Rth (nm) of a film containing a compound for lowering Rth at A %;

Rth(0) represents Rth (nm) of a film which does not contain any compound for lowering Rth (nm); and A represents a mass (%) of a compound for lowering Rth when a mass of the polymer as a material for the film is 100;

wherein the at least one compound for lowering Rth is represented by formula (1) or formula (2):

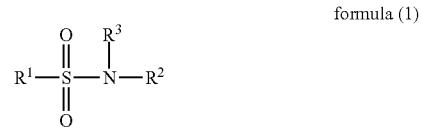

formula (1)

wherein in formula (1), $R^1$ represents an alkyl group or an aryl group, and $R^2$ and $R^3$ each independently represents a hydrogen atom, an alkyl group or an aryl group;

formula (2)

wherein in formula (2), $R^{31}$ represents an alkyl group or an aryl group, and $R^{32}$ and $R^{33}$ each independently represents a hydrogen atom, an alkyl group or an aryl group.

14. The liquid-crystal display device according to claim 13, wherein the cyclic polyolefin film comprises a copolymer comprising at least one repeating unit represented by Formula (A) and at least one repeating unit represented by Formula (B):

Formula (A)

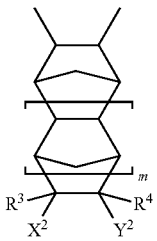

Formula (B)

wherein m represents an integer of 0 to 4;

$R^1$ to $R^4$ each independently represents a hydrogen atom or a hydrocarbon group having 1 to 10 carbon atoms;

$X^1$, $X^2$, $Y^1$ and $Y^2$ each independently represents a hydrogen atom, a hydrocarbon group having 1 to 10 carbon atoms, a halogen atom, a hydrocarbon group having 1 to 10 carbon atoms substituted with a halogen atom, —$(CH_2)_n COOR^{11}$, —$(CH_2)_n OOCR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OCOZ$, —$(CH_2)_n OZ$, —$(CH_2)_n W$, or (—$CO)_2 O$ or (—$CO)_2 NR^{15}$ formed of $X^1$ and $Y^1$ or $X^2$ and $Y^2$;

$R^{11}$, $R^{12}$, $R^{13}$, $R^{14}$ and $R^{15}$ each independently represents a hydrocarbon group having 1 to 20 carbon atoms;

Z represents a hydrocarbon group or a hydrocarbon group substituted with a halogen;

W represents $SiR^{16}_p D_{3-p}$, provided that $R^{16}$ represents a hydrocarbon group having 1 to 10 carbon atoms; D represents a halogen atom, —$OCOR^{16}$ or —$OR^{16}$; and p represents an integer of 0 to 3; and n represents an integer of 0 to 10.

15. The liquid-crystal display device according to claim 14, wherein the cyclic polyolefin film is obtained by a method comprising:

casting an organic solvent solution containing 10% by mass to 35% by mass of the polymer or the copolymer onto an endless metal support, and drying, so as to form a dried film;

peeling the dried film off from the metal support, so as to form a peeled film;

stretching the peeled film in at least one of a width direction and a length direction, and further drying and winding up.

16. The liquid-crystal display device according to claim 13, wherein the cyclic polyolefin film comprises a polymer comprising a cyclic repeating unit represented by Formula (B) or (C) or a copolymer comprising at least two cyclic repeating units represented by Formula (B) and (C),

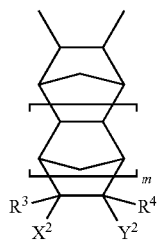

Formula (B)

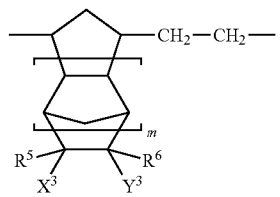

Formula (C)

where m represents an integer of 0 to 4;

$R^3$ to $R^6$ each independently represents a hydrogen atom or a hydrocarbon group having 1 to 10 carbon atoms;

$X^2$, $X^3$, $Y^2$ and $Y^3$ each independently represents a hydrogen atom, a hydrocarbon group having 1 to 10 carbon atoms, a halogen atom, a hydrocarbon group having 1 to 10 carbon atoms substituted with a halogen atom, —$(CH_2)_n COOR^{11}$, —$(CH_2)_n OOCR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OCOZ$, —$(CH_2)_n OZ$, —$(CH_2)_n W$, or (—$CO)_2 O$ or (—$CO)_2 NR^{15}$ formed of $X^2$ and $Y^3$ or $X^3$ and $Y^3$;

$R^{11}$, $R^{12}$, $R^{13}$, $R^{14}$ and $R^{15}$ each independently represents a hydrocarbon group having 1 to 20 carbon atoms;

Z represents a hydrocarbon group or a hydrocarbon group substituted with halogen;

W represents $SiR^{16}_p D_{3-p}$, provided that $R^{16}$ represents a hydrocarbon group having 1 to 10 carbon atoms; D represents a halogen atom, —$OCOR^{16}$ or —$OR^{16}$; and p represents an integer of 0 to 3; and n represents an integer of 0 to 10.

17. The liquid-crystal display device according to claim 13, wherein the cellulose acylate film comprises a cellulose acylate having a degree of acyl substitution of 2.85 to 3.00.

18. The optically-compensatory film according to claim 13, wherein the cellulose acylate film comprises at least one compound for lowering |$Rth_{(400)} - Rth_{(700)}$| in an amount of from 0.01 to 30% by mass based on a solid content of the cellulose acylate.

19. The optically-compensatory film according to claim 2, wherein the cellulose acylate film has a thickness of 10 to 120 μm.

* * * * *